United States Patent [19]
Lemke et al.

[11] Patent Number: 5,398,276
[45] Date of Patent: Mar. 14, 1995

[54] CELLULAR-SYSTEM SIGNAL-STRENGTH ANALYZER

[75] Inventors: Kurt T. Lemke, Palatine; Joseph A. Schifferdecker, Oak Lawn, both of Ill.

[73] Assignee: Safco Corporation, Chicago, Ill.

[21] Appl. No.: 15,576

[22] Filed: Feb. 9, 1993

[51] Int. Cl.$^6$ .............. H04M 1/24; H04M 3/08; H04M 3/22; H04M 11/00

[52] U.S. Cl. .................................... 379/21; 379/1; 379/32; 379/34; 379/58; 379/59; 455/33.1; 455/67.1; 455/67.3; 455/161.3; 455/226.2

[58] Field of Search ............. 379/1, 21, 27, 29, 32, 379/34, 58, 59; 455/33.1, 67.1, 67.3, 161.3, 226.2, 226.4; 375/10; 358/10, 139

[56] References Cited

U.S. PATENT DOCUMENTS

| | | | |
|---|---|---|---|
| 4,868,885 | 9/1989 | Perry | 455/226.2 X |
| 4,977,399 | 12/1990 | Price et al. | 379/59 X |
| 5,023,900 | 6/1991 | Tayloe et al. | 379/59 X |
| 5,193,216 | 3/1993 | Davis | 455/226.2 X |
| 5,239,666 | 8/1993 | Truby | 455/226.2 X |
| 5,239,684 | 8/1993 | Ishikura | 455/226.2 X |

*Primary Examiner*—Stephen Chin
*Assistant Examiner*—Paul Loomis
*Attorney, Agent, or Firm*—Augustus G. Douvas

[57] ABSTRACT

A manually-movable, portable, cellular-system signal-strength analyzer for measuring, recording and displaying geographically-located, downlink, cellular-communication-channel signal strengths in non-vehicular pedestrian areas and also inside buildings. The analyzer has a cellular-telephone scanning receiver housed within a backpack that is worn by a human operator who traverses the areas to be analyzed. A height-adjustable antenna mast formed from a set of telescoping tubes is fixed to the exterior of the backpack. This mast supports a self-resonant antenna of fixed length whose elevation height may be varied to determine signal-strengths at different pedestrian heights. The backpack also houses a controller. A laser rangefinder which has a built-in compass inputs data to the controller concerning the geographic locations of various points traversed by the analyzer. An arm-held computer is also connected to the controller. The computer has a display and a "pen" for manual writing on the display to input data and instructions to the analyzer. The computer records and displays the signal strengths of the selected cellular-communication channels for various geographically located points throughout the areas traversed.

20 Claims, 36 Drawing Sheets

| | |
|---|---|
| L1 | KNOWN STARTING LOCATION |
| W1 | DISTANT WALL |
| P1 | TARGET POINT ON DISTANT WALL |
| D1 | DISTANCE FROM L1 TO P1 |
| B1 | BEARING OF VECTOR FROM L1 TO P1 |
| L2 | NEW LOCATION |
| D2 | DISTANCE FROM L2 TO P1 |
| B2 | BEARING OF VECTOR FROM L2 TO P1 |
| D3 | DISTANCE TRAVELED = D1 - D2 |

PACE LENGTH OF HUMAN OPERATOR = 2.5 FEET

L1 KNOWN STARTING LOCATION
B1 BEARING OF TRAVEL FROM L1 TO L2
L2 NEW LOCATION
S1 STRAIGHT LINE SEGMENT WALKED
N1 NUMBER OF PACES WALKED FROM L1 TO L2
D3 DISTANCE TRAVELED = N1 * (2.5 FEET/PACE)
B2 BEARING OF TRAVEL FROM L2 TO L3

Start Test

Collection File
File Name (.SD4): HANCOCK1  — 227
                                                  225
                                                                      OK — 224
Title: Hancock building, Friday, 10:00 am, raised antenna — 228
                                                  223

Starting Location
Floor Number: 91 — 229
                                                  226
Latitude: N 41:57.87 — 230

Longitude: W 86:38.03 — 231

Description: Southwest corner near elevator — 232

FIG. 28

Initial Route Direction

Bearing
north
0
315   45
west 270    90 east
225   135
180
south
240
241
0     degrees from North

238
OK — 236
235

Distance
150.00 — 239
● feet
237

FIG. 29

Start Test

Collection File
File Name (.SD4): HANCOCK2    227    225
Title: Hancock building, Saturday, 3:00 pm, antenna lowered    228

OK    224    223

Starting Location    226
Floor Number: 47    229
Latitude: N 41:57.913    230
Longitude: W 086:38.003    231
Description: Southwest corner near elevator    232

Initial Route Direction

Bearing    240
north    285
0
315    45
west (270)        (90) east
225    135
180
south
241
0    degrees from North

OK    236    235
238

Distance    239
____ ● feet    237

FIG. 39

| TRUE DATA | COMPLEMENT DATA | TWO BIT STATE |
|---|---|---|
| 1 | 1 | WORD STATE |
| 0 | 1 | ZERO STATE |
| 1 | 0 | ONE STATE |
| 0 | 0 | BIT STATE |

CELLULAR-SYSTEM SIGNAL-STRENGTH ANALYZER

The present invention relates generally to cellular telephone systems, and more particularly to improved methods and apparatus for measuring geographically-located signal strength information of communication channels in pedestrian coverage areas of cellular telephone systems, and in other areas which cannot be easily navigated by existing mobile cellular test equipment.

BACKGROUND OF THE INVENTION

Cellular-system signal-strength analyzers are employed in the prior art to measure and report signal strength information of the communication channels which are used in cellular telephone systems. This information is used to ensure reliable operation over the cellular service provider's coverage area. One current trend in cellular system usage is that an increasing percentage of cellular customers are using portable cellular telephones rather than mobile cellular telephones due to the fact that the usage of portable telephones is not limited to within a vehicle; however, cellular system signal strength analyzers in the prior art have not kept pace principally because the analyzers have been designed for use within a vehicle.

For example, the antenna which is connected to the scanning device which has been designed into signal strength analyzers in the prior art needs to be mounted to a vehicle (window and trunk mounts are the most common), but since portable cellular telephone users can use their phones in buildings, airports, and on sidewalks and pedestrian walkways, the antenna needs to be mounted in a different manner.

Additionally, the navigation technologies that are employed in the prior art for geographic location of the measured signal strength data pertain to vehicle navigation on streets, whereas the technology for navigation in pedestrian areas is quite different. Specifically, common navigation technologies that can be deployed in a vehicle utilize vehicle wheel sensors for speed detection, satellites to determine latitude and longitude, and electronic map-matching techniques for determining a location which is on a street. However, the above-mentioned vehicular navigation technologies cannot be deployed in areas such as within buildings where portable phones may be used. Technologies that utilize range and bearing measurements are best suited to the portable phone domain.

Additionally, the user interface that has been employed in the prior art was not designed to be used in a pedestrian environment where the signal strength analyzer itself must be moved along with the operator of the analyzer. In general, the signal strength analyzers in the prior art utilize a keyboard for input and separate display for output; however, this form of user interface is not practical in a pedestrian environment in which there is no table on which to rest the keyboard and no mounting bracket on which to rest the display.

Additionally, the signal strength analyzers in the prior art were designed to be mounted in a vehicle, and were also designed to derive the power that they need to operate from the vehicle's battery. Since in the pedestrian environment there will neither be a vehicle to mount the signal strength analyzer to, nor a vehicle battery from which power can be derived to operate the signal strength analyzer, a different approach must be taken.

Due to the increasing percentage of portable cellular phone customers, providers of cellular service need to ascertain whether or not adequate cellular service is being provided to all areas in which the portable phones may be used. There are two basic methods for performing this determination. The first method is to use a mathematical model which can indirectly assume cellular system coverage by attempting to accurately predict the propagation of the radio-frequency (RF) energy which is transmitted by the cellular system into the pedestrian areas, and the second method is to empirically measure the actual RF energy in the same areas that the portable phone will be used.

Unfortunately, the first method suffers from the fact that the propagation of RF energy in pedestrian environments cannot be accurately modeled, and is the subject of current research. The main reason for the difficulty in generating an accurate propagation model is due to the many obstacles that exist in pedestrian environments, all of which have different material properties which result in differing amounts of RF energy reflection and absorption. The obstacles, such as interior and exterior walls, partitions, desks, doors, glass, etc., have not even been completely characterized with respect to RF energy interactions due to the complexity of their structures. Even if the obstacles could be completely and accurately characterized and if an accurate mathematical RF propagation model existed, the calculations involved in using the model to predict the propagation of RF energy in pedestrian areas would greatly exceed the computational power of even the fastest computers in the world today. The obstacles in the pedestrian environment are not present in the environment in which mobile phones are used. Since only the atmosphere, buildings and foliage need to be taken into account in the simpler mobile phone environment, fairly accurate RF propagation models have been created which can reliably be used.

Therefore, in the pedestrian environment, cellular service providers need to rely upon empirical, in-field, geographically-located measurements of the RF energy to either verify adequate cellular service or identify problem areas which need attention.

SUMMARY OF THE INVENTION

Accordingly, a principal object of the present invention is to provide improved methods and apparatus for measuring geographically-located signal strength information of communication channels in pedestrian coverage areas of cellular telephone systems.

It is another object of the present invention to provide improved methods and apparatus for navigating in pedestrian areas to geographically locate the measured signal strength information.

It is a further object of the present invention to provide improved methods and apparatus for measuring signal strength information of cellular communication channels in pedestrian areas using a retractable antenna that can be mounted on a backpack which is worn by a human operator.

It is an additional object of the present invention to provide improved methods and apparatus for interfacing to the pedestrian operator of a cellular system signal strength analyzer which utilizes a pen-based, arm-held computer for the input and display of data.

The principal structural features for attaining the objects of this invention are summarily outlined in the following paragraphs. Other secondary features are described in the section entitled Detailed Description of the Preferred Embodiment.

Feature 1

Navigating in Pedestrian Areas

A first novel feature of this invention relates to a Portable Signal Strength Analyzer, hereafter referred to in this specification as PSSA, for measuring and geographically-positioning cellular communication-channel signal strengths in pedestrian areas that can be located both within and outside of buildings. The PSSA is organized as a backpack which is to be worn by a human operator, and uses a laser rangefinder device which has a built-in compass to perform navigation in pedestrian areas. The rangefinder component of the device determines distances to objects, and when the distance to the same object is measured twice, each at different locations, then the distance traveled in a straight-line segment of the coverage survey can be derived by subtracting the two measurements. The compass component of the device provides a bearing measurement, relative to magnetic north. The PSSA can also navigate without the laser rangefinder device by having the human operator count the number of paces that have been walked during each segment of the coverage survey to determine the distance traveled, and by having the human operator specify the initial starting direction relative to magnetic north of the first segment of the coverage survey and then during the survey specify in which new direction the human operator will be turning.

By starting from a known location and periodically recomputing the new positions using the distance and bearing measurements, the entire route which was traveled by an operator during a coverage survey can be ascertained. When the signal strength measurements that are taken during the coverage survey are linked with this geographic position information, then any problems detected pertaining to the signal strength of a cellular communications channel can easily be associated with the correct location.

Feature 2

Utilizing a Pen-Based Arm-Held Computer for Input and Output

A second novel feature of this invention relates to the devices and programming within the PSSA for the use of an arm-held pen-based computer for the input and output of data. Since the human operator of the PSSA is actually wearing the system to be completely portable and have access to all pedestrian areas (such as elevators and stairways), a single user interface device is utilized for both the input and output of data. Additionally, the input device is pen-based and has the ability to recognize handwriting, which means that the operator merely has to write commands on the display using a single pen instead of a bulkier keyboard.

Feature 3

Using a Retractable Antenna for Measuring the Signal Strength of Cellular Communication Channels Accordingly, a third novel feature of this invention relates to the devices within the PSSA to use a retractable antenna which is used by the cellular receiver to measure signal strength data and which is part of the controller assembly worn by the human operator. By using a retractable antenna instead of a fixed-length antenna as is done in the prior art, different operating conditions at the locations where the signal strength is being measured can be emulated to verify cellular system coverage under those conditions, For example, the different heights of cellular phone customers can be emulated. Additionally, information concerning the propagation of the cellular signal while in the presence of people can be obtained by comparing the strength of the signal measured above all of the people to the strength of the signal measured below the heads of the people. This information is useful in designing cellular system coverage in areas where there might be a lot of people.

BRIEF DESCRIPTION OF THE DRAWINGS

In order that all of the structural and functional features for attaining the objects of the portable cellular-system signal-strength analyzer (PSSA) may be readily understood, detailed reference is herein made to the accompanying drawings, wherein:

FIG. 28 contains a picture of the Start Test window which is shown on the pen-based computer display after the Start Test command has been selected from the Actions pull-down menu, initiating the state of a cellular coverage survey by allowing parameters related to the survey such as the name of the data file that the geographically-positioned measurements will be stored in and the starting location of the survey to be entered by the PSSA operator;

FIG. 29 contains a picture of the Initial Route Direction window which is shown on the pen-based computer display after the OK button in the Start Test window has been selected, illustrating the initial dead-reckoning navigation parameters which have been measured by the laser rangefinder, having an initial bearing of 0 degrees and distance of 150 feet to a distant target in the direction of travel;

FIG. 3 (contains a picture of the Operator Note Entry window which is shown on the pen-based computer display during a coverage survey after the Note command was selected from the pull-down menu associated with the Actions command, allowing the PSSA operator to input a textual note into the data file that is being used to record all of the geographically-positioned signal strengths to provide additional information concerning the environment or conditions at the time of the coverage survey;

FIG. 38 contains a picture of the Start Test window which is shown on the pen-based computer display after the Start Test command has been selected from the Actions pull-down menu, initiating the start of a cellular coverage survey using the paced mode of dead-reckoning navigation without a laser rangefinder by allowing parameters related to the survey such as the name of the data file that the geographically-positioned measurements will be stored in and the starting location of the survey to be entered by the PSSA operator;

FIG. 39 contains a picture of the Initial Route Direction window which is shown on the pen-based computer display after the OK button in the Start Test window has been selected, illustrating the initial paced-mode dead-reckoning navigation parameter which has been entered by the PSSA operator, having an initial bearing of 0 degrees;

BRIEF DESCRIPTION OF THE NOVEL FEATURES

Figure 1:
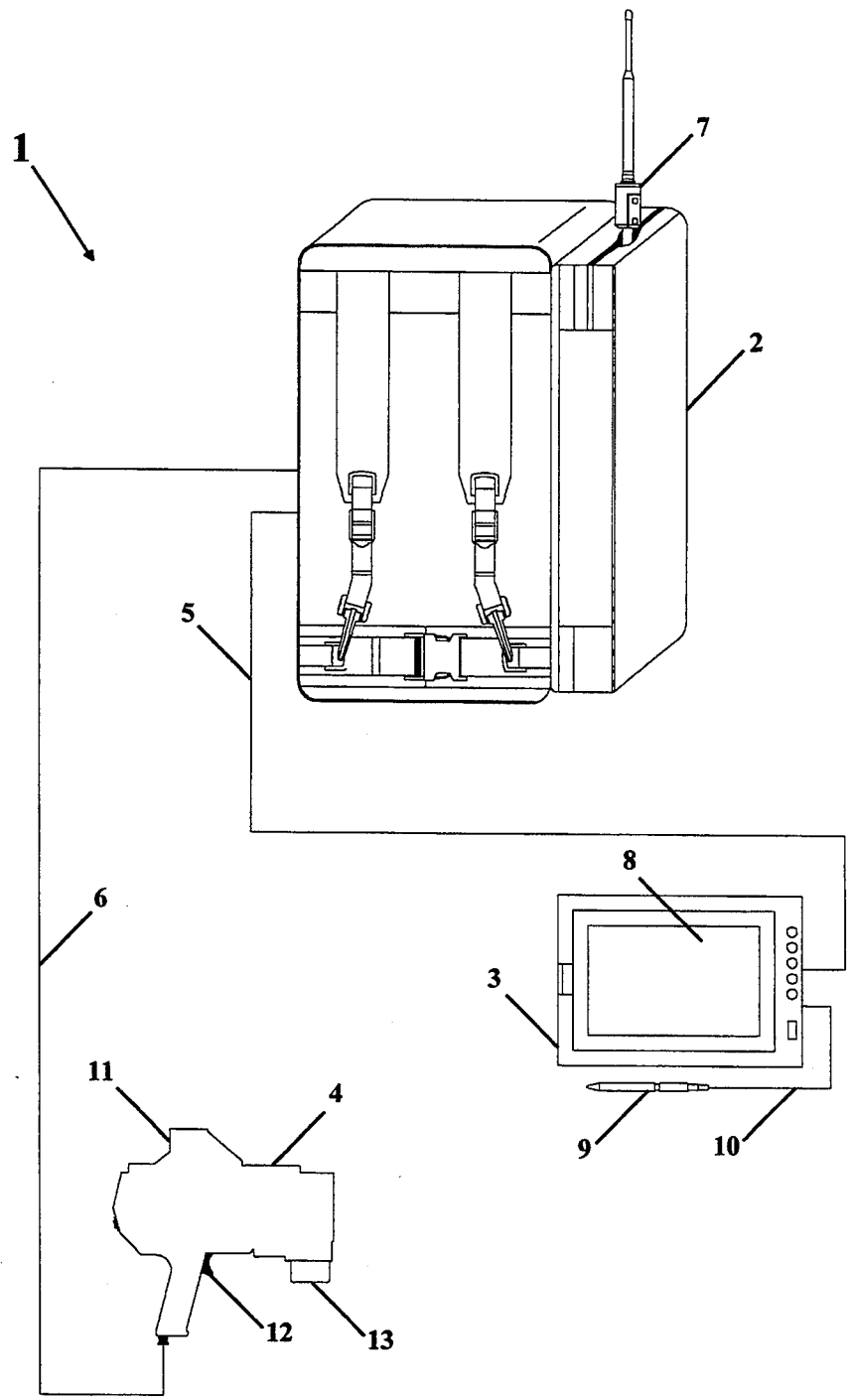
FIG. 1 shows a simplified diagram, illustrating the three principal components of the PSSA, namely, the backpack which measures the signal strength of cellular communication channels, the pen-based computer which serves as the interface to the human operator for the input and display of information to control the operation of the backpack system and to store the geographically-positioned cellular communication signal strength data which is measured by the PSSA, and the laser rangefinder which measures bearing and distance to objects.

The cellular-system signal-strength analyzer 1 (PSSA) of FIG. 1, comprising as principal components a backpack system 2, pen-based computer 3, and laser rangefinder 4, is a diagnostic tool for testing the coverage of a cellular telephone system, and is specifically designed for testing the coverage of the cellular system in pedestrian areas such as in buildings, airports, pedestrian walkways, and convention centers. A cellular telephone system is a communications system which supports the transmission and reception of voice and data signals for mobile or portable telephones using the atmosphere as a medium. The cellular telephone system employs a duplex communication scheme, in which each cellular communications channel in the system consists of an uplink frequency and a downlink frequency which are separated from each other in frequency by 45 MHz. The uplink frequency is used to send data and voice information from the mobile or portable cellular phone to the cellular system, and the downlink frequency is used to send data and voice information from the cellular system to the mobile or portable cellular phone.

Cellular telephone systems are initially designed using theoretical models for the propagation of the transmitted radio signals through the atmosphere, but due to both naturally-occurring physical phenomena and man-made structures, these theoretical models do not exactly portray the conditions that exist in the field during actual use of the system. Additionally, in the pedestrian environments in which portable cellular phones are used, there do not even exist good theoretical models to accurately portray the propagation of the radio signals due to the complex nature and obstacles encountered in these environments. The PSSA is primarily used for the purposes of measuring the signal strength of the downlink half of the cellular communication channels while they are actually operating in pedestrian areas where portable cellular phones are used. This geographically-located measurement can then used to verify the design of the cellular system, fine-tune the actual operation of the cellular system, and locate and assist in the correction of cellular system problems stemming from either natural or man-made causes which could not have been predicted using the theoretical models of the system.

The backpack system 2 of the PSSA is designed to be worn by a human operator to be able to emulate the portable cellular phone customer who will be traveling in pedestrian areas which are inaccessible to vehicle-based cellular test equipment. The PSSA measures, displays, and saves the signal strength data of cellular communication channels along with geographic position information. To be able to properly analyze and troubleshoot the cellular service in pedestrian areas, the signal strength data of the communication channels must be analyzed with respect to the location where the measurements were taken to help identify areas in which cellular service may be inadequate or non-existent.

Arm-held pen-based computer 3 of FIG. 1 serves as the user interface to control the operation of the entire PSSA system, and incorporates graphic display 8 onto which has been affixed a transparent touchscreen membrane to serve as the pen interface which has the ability to detect when and where the pen is making contact with it by responding to the force of the mechanical depression, and solid "pen" 9 which is physically attached to the computer through pen interface cable 10. The pen-based computer is used by the operator as an input device to configure the operation of the system, an output device to display the signal strength data which is measured by backpack system 2, and a storage device to save all of the geographically-positioned signal strength data.

Figure 2:
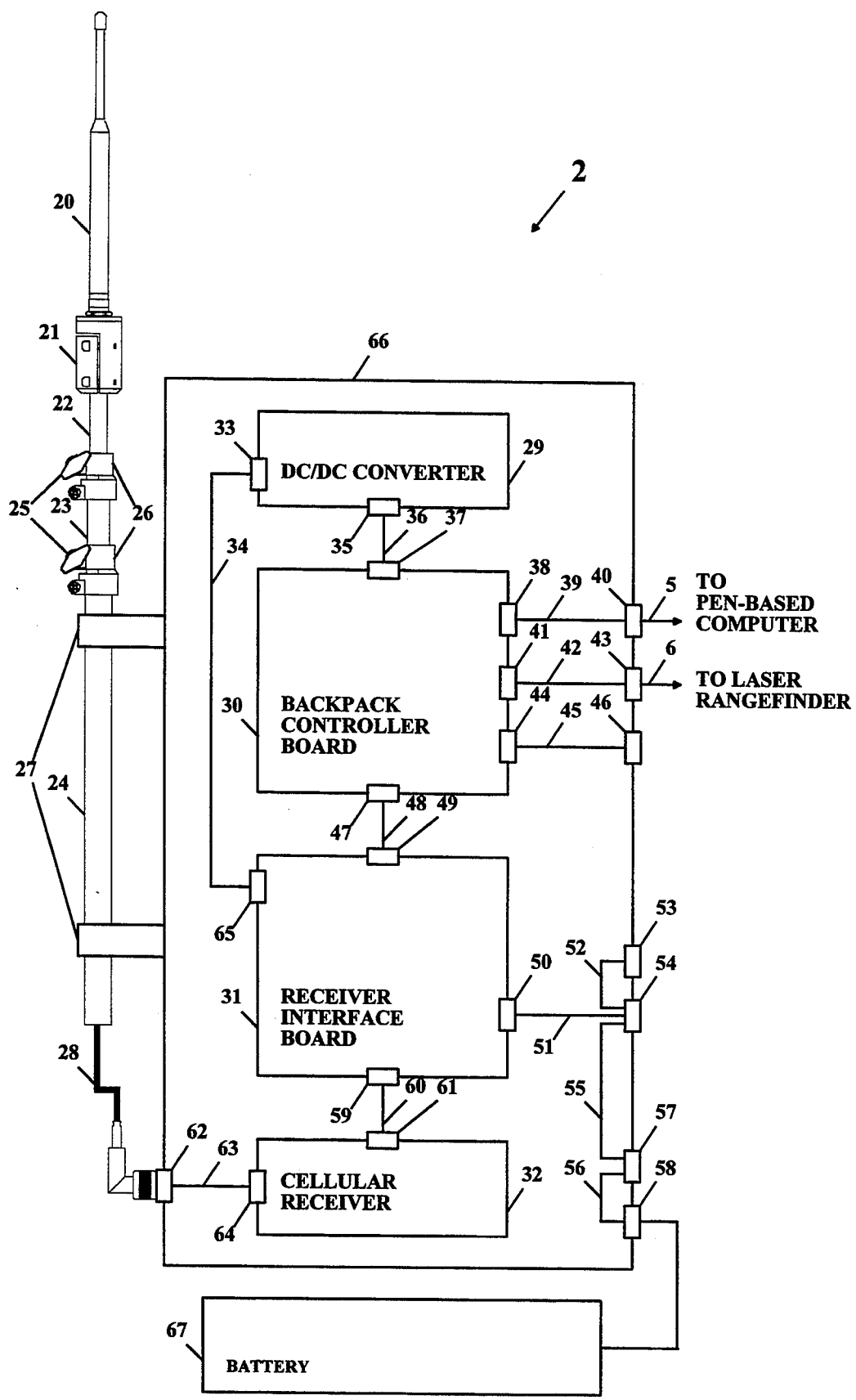
FIG. 2 shows a block diagram of the backpack system, one of the three principal components of the PSSA, which is worn by a human operator and which contains the cellular receiver and retractable antenna used to measure the cellular-communication-channel signal strengths at various heights.

Pen-based computer 3 of FIG. 1 is connected to backpack system 2 which is worn by the human PSSA operator and onto which is mounted retractable antenna assembly 7 for varying the height of the active elements of the receiving antenna. FIG. 2 contains a block diagram of backpack system 2 of FIG. 1. Backpack system 2 of FIG. 2 is controlled by backpack controller board 30, performs the cellular communication channel scanning functions using cellular receiver 32 and retractable antenna assembly components 20–28, serves as the interface to laser rangefinder 2 of FIG. 1, and supplies power from battery 67 of FIG. 2 to backpack components 29–32 and laser rangefinder 2 of FIG. 1. Cellular receiver 32 of FIG. 2 is electrically connected to active antenna 20 through coaxial cable 28 which is routed through telescopic antenna mast tubes 22–24, the largest of which 24 is mounted to backpack chassis 66 using two brackets 27.

Figure 3:
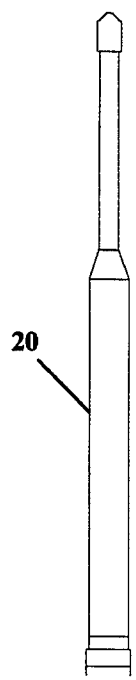
FIG. 3 shows an illustration of the self-resonating antenna which is mounted on top of the retractable mast on the backpack system, and which is used to receive the signal strengths of the cellular communication channels that are being measured.
Figure 4:
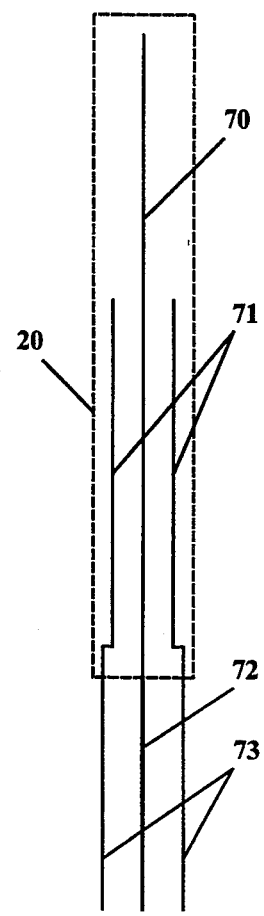
FIG. 4 shows a simplified diagram of the internal construction of the self-resonating antenna and the antenna's connection to the coaxial cable which electrically connects the antenna to the cellular receiver in the backpack system.

Antenna 20, shown alone in FIG. 3, is self-resonating, meaning that antenna 20 does not require a horizontal ground plane to receive the RF signal strengths of the cellular communication channels that are being measured. Typically, for antennas that require a horizontal ground plane, vehicle roofs and other flat metal surfaces can be used, but due to the nature of the pedestrian environment, antennas that require a ground plane are not practical. FIG. 4 contains a simplified illustration of the internal construction of self-resonating antenna 20 of FIG. 3 and the electrical connection of antenna 20 of FIG. 4 to coaxial antenna cable 28. Active element 70 in antenna 20 is electrically connected to conductor 72 of coaxial cable 28, and ground elements 71 in antenna 20 are electrically connected to shield 73 of coaxial cable 28.

Figure 5:
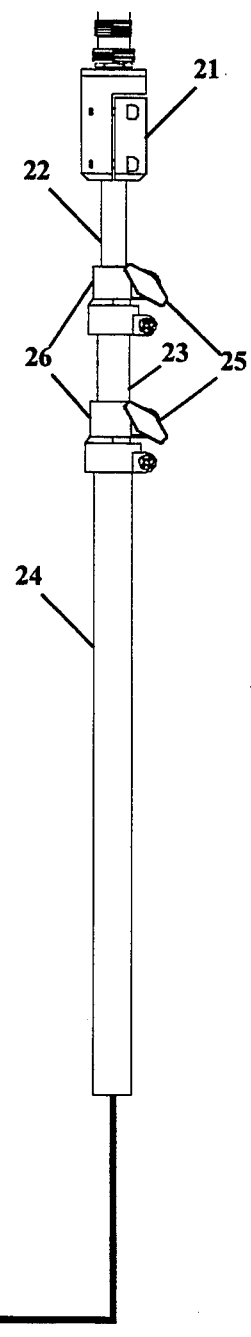
FIG. 5 contains an illustration of the retractable mast in the backpack system, showing the mechanical components which allow the mast to be raised and lowered, and also showing the coaxial cable which is routed down through the middle of the hollow mast and which connects the antenna which is mounted on top of the mast to the cellular receiver which resides and operates in the backpack system.
Figure 6:
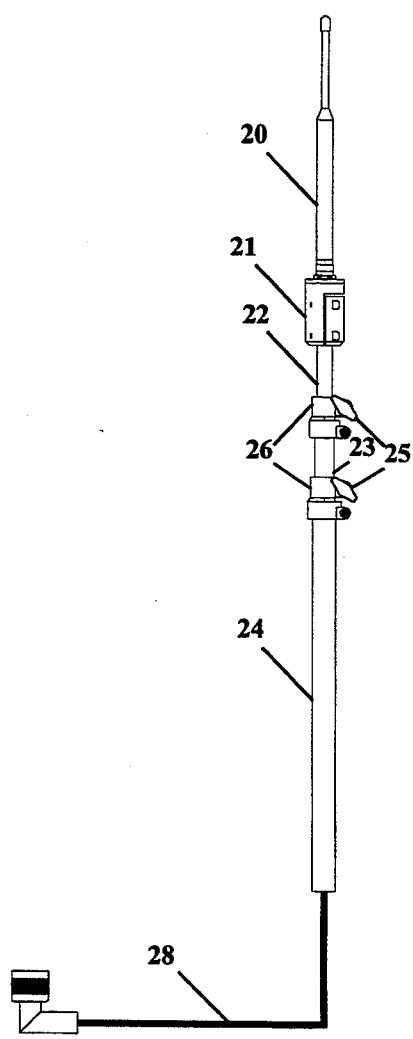
FIG. 6 shows a diagram of the antenna mast assembly in the backpack system with the mast lowered to simulate a low antenna height achievable in the PSSA.
Figure 7:
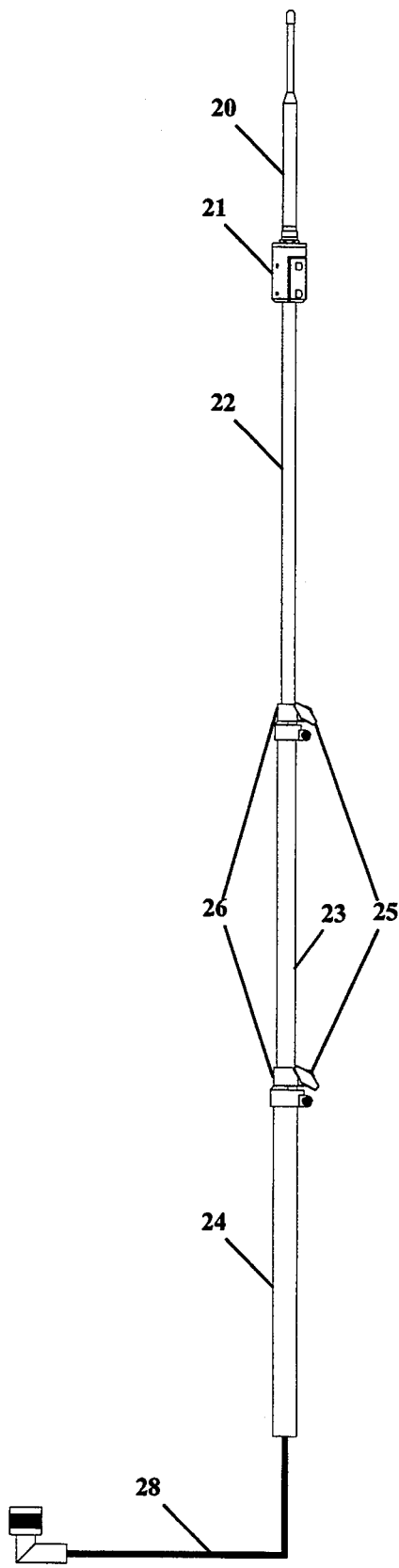
FIG. 7 shows a diagram of the antenna mast assembly in the backpack system with the mast fully extended to simulate the highest possible antenna height achievable in the PSSA.

Antenna 20 of FIG. 2 is physically mounted on retractable mast 21–26, which does not contribute electrically to the operation of the receiving antenna 20, but serves only to vary the height of the antenna 20 to simulate the differing heights at which portable cellular phones may be used (due to the different physical heights of portable phone customers, etc.). Additionally, it is desirable in the analysis of cellular service in crowded pedestrian areas to be able to measure the signal strength of the communication channels at heights which are both completely above the crowd and also below the heads of the crowd, where actual portable phones would be used. These different measurements can be analyzed to help gain an understanding into the effects of crowds on the propagation of radio signals to help improve the design of the cellular system to provide better service to the portable phone customers. Retractable mast assembly 21–26 is illustrated in FIG. 5., showing three principal telescopic, tubular components 22–24, height adjustment components 25–26, and coaxial antenna cable 28 that electrically connects the antenna 20 of FIG. 2 to cellular receiver 32 of FIG. 2. The principal components consist of three cylindrical telescoping tubes 22–24 with different diameters that fit into one another, where the largest-diameter tube 24 is mounted to backpack chassis 66 of FIG. 2 using brackets 27, and the two smaller-diameter tubes 22–23 are vertically adjustable. Two knobs 25 can be turned to tighten or loosen two corresponding brackets 26 which are each mounted around one of the two upper mast tubes 22 and 23. When brackets 26 are loosened by using knobs 25, the two uppermost mast elements 22–23 may be pulled upward or downward to vary the overall length of the mast assembly. Knobs 25 are then turned in the opposite direction to tighten brackets 26, thereby securing the upper two mast tubes in the new position. FIGS. 6 and 7 show the entire antenna mast assembly in lowered and fully-extended positions, respectively.

Geographic position information is calculated by either using laser rangefinder 4 of FIG. 1 which can accurately determine distance to objects and bearing with respect to magnetic north, or by having the PSSA operator input the number of paces walked to determine distance and also input the direction of travel for bearing. Both of these navigation techniques may be employed using the PSSA during a coverage survey to compute geographic locations relative to a known starting location; however, only one of these techniques is typically used during a coverage survey, usually depending upon the availability of the laser rangefinder device.

Figure 8:
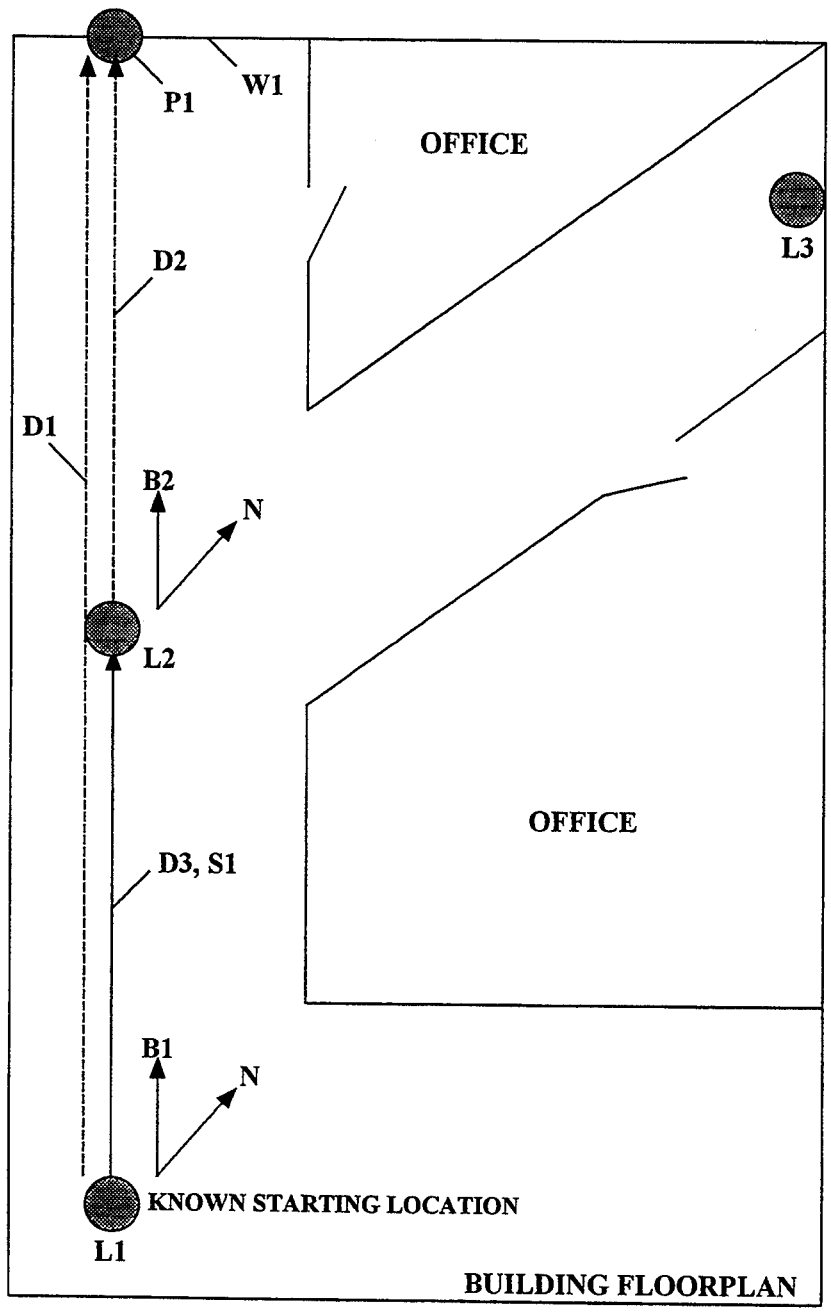
FIG. 8 shows an illustration of the scheme and algorithm employed by the PSSA for dead-reckoning navigation using the distance and bearing data which is measured by the laser rangefinder to geographically position the measured cellular communication-channel signal-strength data.

Bearing measurements are made by the laser rangefinder using built-in fluxgate compass 13. Distance measurements are made by aiming the transmitted laser light at an object using sighting mechanism 11 and measuring the total time required for the laser light to reach the targeted object and then be reflected back off the targeted object and received again by the laser rangefinder. The bearing and distance measurements made by laser rangefinder 4 are initiated by pressing and releasing trigger 12 on laser rangefinder 4. Since laser rangefinder 4 is hand-held, the navigation method utilized by the PSSA is very conducive to use by a human pedestrian operator in-pedestrian areas. FIG. 8 contains an illustration of the "dead-reckoning" navigation method and algorithm which is used by the PSSA when using the laser rangefinder 4. Dead-reckoning refers to a navigation scheme in which the starting location must be known and then all of the new locations which are traveled to are calculated based upon the known starting location and some relative (as opposed to absolute) navigation data, such as the distance from the previous location.

The operator starts at a known location L1, determines which way he will walk first in his survey (which will be to location L2 in this example), stands facing the direction of travel (toward location L2), holds-up and uses the sight 11 of FIG. 1 to aim the laser rangefinder 4 of FIG. 1 at an object (point P1 on wall W1 of FIG. 8) in his path which is beyond the location where he will stop (beyond location L2), and then pulls and releases the trigger of the laser rangefinder 4 of FIG. 1 to measure the current bearing B1 of FIG. 8 with respect to magnetic north and distance D1 to the targeted object point P1 on wall W1.

Each and every geographic position that is calculated, used, and stored in the PSSA is represented and manipulated as a pair of numbers that comprises a latitude and a longitude that represents a unique location on the earth's surface. The position of the known starting location L1 must be input by the operator into the PSSA as a latitude and a longitude, and can be either an absolute geographic location on the earth's surface, or an arbitrary geographic location. If the starting location L1 is input as an absolute geographic location, then all subsequent locations which are calculated by the PSSA will also be absolute geographic locations. If the starting location L1 is input as an arbitrary geographic location, then all subsequent locations which are calculated by the PSSA will be locations that are relative to the arbitrary starting location. Either of the above two geographic-positioning procedures will fulfill the needs of the operator.

The operator then walks in a straight line segment S1 from his starting location L1 to the next location L2, which will typically be a hallway intersection or building corner. During the course of his walk from location L1 to location L2, the PSSA will be measuring and recording downlink cellular communication-channel signal strengths. Upon arriving at the destination location L2, the operator stops and for the second time holds-up and aims the laser rangefinder 4 of FIG. 1 at the same object that was previously targeted (point P1 on wall W1 of FIG. 8) when the operator was at the previous location L1, and then pulls and releases the trigger of the laser rangefinder 4 of FIG. 1 to measure the current bearing B2 of FIG. 8 and distance D2 to the same targeted object (point P1 on wall W1). The geographic position of location L2 is then calculated by the PSSA using the following algorithm and the two sets of bearing (B1 and B2) and distance (D1 and D2) measurements taken at locations L1 and L2.

Since the segment S1 traveled was a straight line, the bearing measurement B1 which was taken at location L1 is exactly equal to the bearing measurement B2 which was taken at location L2. Additionally, due to the fact that the same object (point P1 on wall W1) was the target of both distance measurements taken at locations L1 and L2, the length D3 of the segment S1 which was traversed by the operator is calculated as the distance D2 subtracted from the distance D1. Therefore, the new current location L2 can be exactly calculated and positioned as being a distance D3 away from known location L1 at a bearing of B1. As previously mentioned, if the starting location L1 was input by the operator to the PSSA as an arbitrary geographic position, then the location L2 which was calculated by the PSSA will be with respect to the starting location L1. The geographic position of any point on the traversed segment S1 can also be similarly calculated, since the segment S1 is a straight line. The signal strengths that were measured by the PSSA on the segment S1 during the walk from locations L1 to L2 are then geographically-positioned at equal distances along the segment S1, and then the sets of signal strength measurements and corresponding geographic positions are stored on the pen-based computer 3 of FIG. 1. This algorithm can then be iteratively repeated over the entire pedestrian area that is to be surveyed by now using the current location L2 as the known location and walking in a straight line to another location on the survey path, like location L3.

Figure 9:
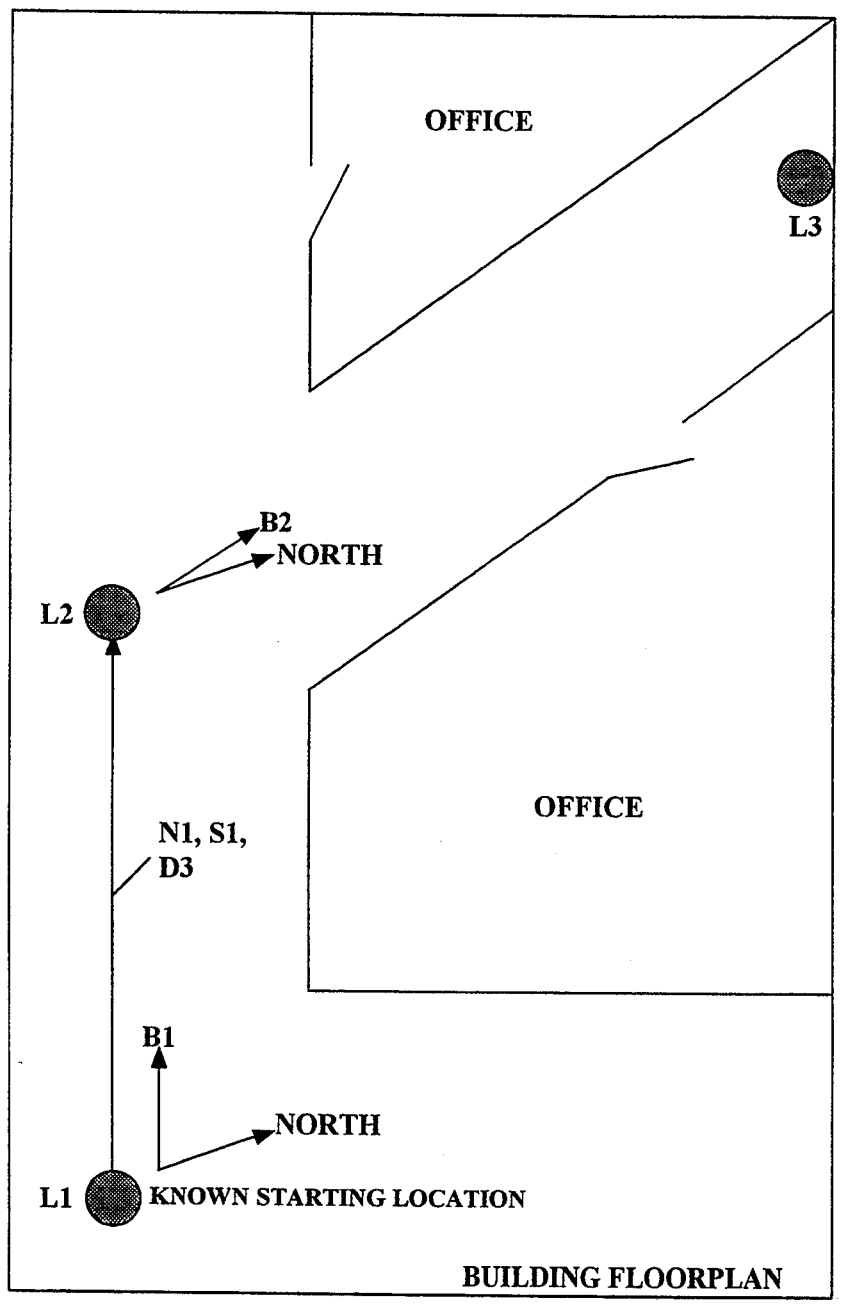
FIG. 9 shows an illustration of the scheme and algorithm employed by the PSSA for dead-reckoning navigation without the laser rangefinder using the distance and bearing data which is input by the human operator to geographically position the measured cellular communication channel signal strength data.
Figure 10:
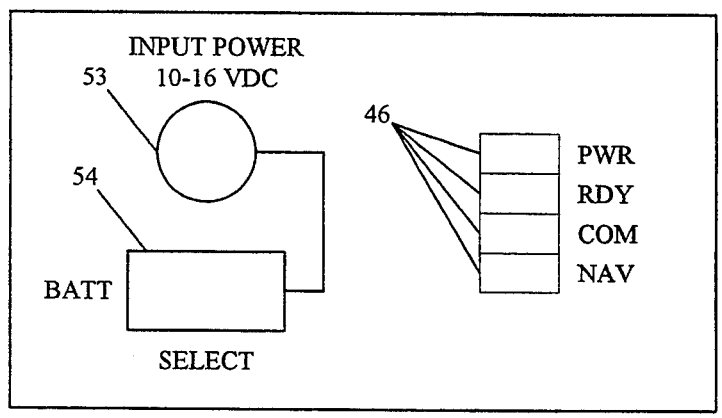
FIG. 10 shows an illustration of one of the three interface panels on the side of the backpack system opposite from the side onto which the retractable antenna assembly is mounted which provides a connector for the input of an optional power source, a switch to select the backpack source of power as being either a battery or the optional power source, and a display of four lights to indicate the current operating status of the backpack system to the human operator.

FIG. 9 contains an illustration of the dead-reckoning navigation method and algorithm which is used by the PSSA when not using the laser rangefinder 4. Bearing information is input by the PSSA operator. Distance measurements are made by having the PSSA operator count and input the number of paces walked during a straight-line segment in the coverage survey. Multiplication of the number of paces walked by the step length of the PSSA operator results in the length of the straight-line segment walked by the PSSA operator.

The PSSA operator starts at known location L1, inputs the length of his pace, and then inputs the initial direction of travel (which will be to location L2 in this example). No distance information is measured or input at this time. The PSSA operator then walks in a straight line segment S1 from starting location L1 to the next location L2, which will typically be a hallway intersection or building corner, while counting the number of paces. During the course of the walk from location L1 to location L2, the PSSA system will be measuring, displaying, and recording downlink cellular communication channel signal strengths. Upon arriving at destination location L2, the PSSA operator stops and inputs the number of paces walked N1 from L1 to L2. The geographic position of location L2 is then calculated by the PSSA using the following algorithm and bearing B1 and number of paces walked N1.

The length D3 of the segment S1 which was traversed by the operator is calculated as the number of paces walked N1 multiplied by the length of each pace which was input by the PSSA operator. Therefore, the new current location L2 can be exactly calculated and positioned as being a distance D3 away from known location L1 at a bearing of B1. As previously mentioned, if the starting location L1 was input by the operator to the PSSA as an arbitrary geographic position, then the location L2 which was calculated by the PSSA will be with respect to the starting location L1. The geographic position of any point on the traversed segment S1 will also be similarly calculated as in the previous discussion with the laser rangefinder, since the segment S1 is again a straight line. The signal strengths that were measured by the PSSA on the segment S1 during the walk from locations L1 to L2 are then geographically-positioned at equal distances along the segment S1, and then the sets of signal strength measurements and corresponding geographic positions are stored on the pen-based computer 3 of FIG. 1. This algorithm can then be iteratively repeated over the entire pedestrian area that is to be surveyed by now using the current location L2 as the known location and walking in a straight line to another location on the survey path, like location L3. Before beginning the walk from L2 to L3, the PSSA operator needs to input the change in the direction of travel either as an absolute bearing with respect to magnetic north or as a directional change relative to the previous bearing, such as "left" or "hard-right", which will be translated by the PSSA into an absolute bearing.

These two navigation procedures and positioning algorithms, both known as dead-reckoning, will result in the exact geographic determination of the complete path traversed by the operator with respect to the starting location L1. Dead-reckoning navigation is conducive to utilization in pedestrian areas where the sky is not visible for satellite-based navigation and where a vehicle's wheels cannot be used for speed detection as is done in vehicle-based signal strength analyzers in the prior art. The geographically-positioned signal strength data which is stored in the data files on pen-based computer 3 of FIG. 1 can then later be analyzed to determine the level of service that the cellular system is providing to its portable cellular phone customers in the area that was surveyed.

DETAILED DESCRIPTION OF THE PREFERRED EMBODIMENT

The following paragraphs describe in detail the procedure used to perform a cellular coverage survey in pedestrian areas using the PSSA, resulting in the measurement and geographic-placement of downlink, cellular-communication-channel signal strengths, therein describing the construction, operation, and interconnection of the three principal components, namely, backpack system 2 of FIG. 1, pen-based computer 3, and laser rangefinder 4.

Pen-based computer 3 and laser rangefinder 4 are the PSSA devices to which the operator interfaces, and are physically and electrically connected to backpack system 2 by means of interface cables 5 and 6, respectively. Backpack system 2 is worn on the back of the human PSSA operator and has a retractable antenna assembly 7 mounted on one side, and three cable interface panels which are illustrated in FIGS. 10–13 mounted on the other side. Pen-based computer interface cable 5 of FIG. 1 is attached on one end to connector 40 of FIG. 11 labeled "COMPUTER", and on the other end to connector 80 of FIG. 13 which contains a diagram of the relevant components of the interface panel on the side of pen-based computer 3 of FIG. 1. Laser rangefinder interface cable 6 of FIG. 1, which is physically attached to the rangefinder on one end, is attached on the other end to backpack connector 43 of FIG. 11 labeled "NAV INPUT".

Pen-based computer 3 of FIG. 1 is an arm-held computer which utilizes a pen for the input of data instead of the traditional keyboard approach. This allows the entry of data with one hand while resting the computer on the other arm. Pen-based computer 3 can recognize handwriting in lower- and uppercase block letter form. Specifically, pen-based computer 3 used in the PSSA is the GRiDPAD TM HD model manufactured by GRiD Systems Corporation, Mountain View, Calif., and is the subject of the following U.S. Pat. Nos. 4,894,792; 4,927,986; 4,959,511; 4,969,830; 4,979,636; 4,991,058; 4,997,103; 4,998,055; 5,002,184; 5,015,546; 5,029,982; 5,031,119; 5,041,964; 5,100,098; 5,131,089; 5,133,076; and 5,163,153 and the following U.S. Pat. Nos. 317,151; 317,910; 318,858; and 322,165.

Figure 13:
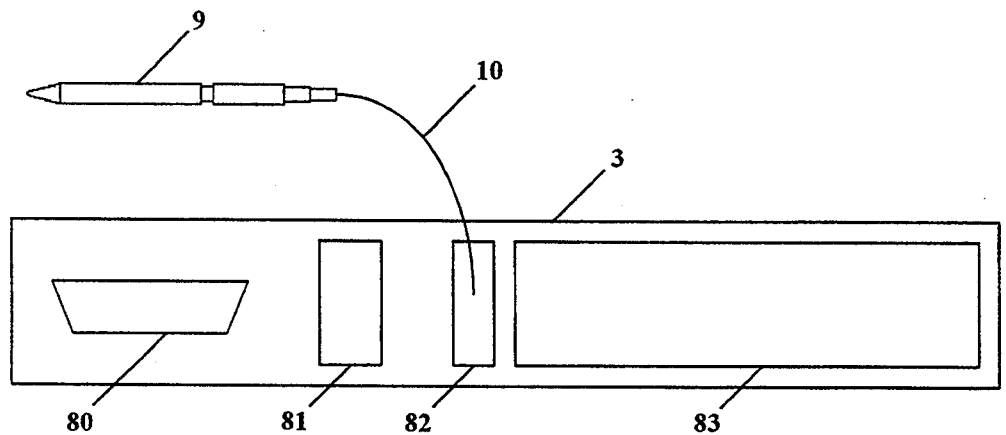
FIG. 13 contains an illustration of the interface panel on the pen-based computer, which contains the interface connector to the backpack system, the mechanical connection for the pen which is used to write on the screen of the pen-based computer, and the slot for the battery pack which provides the power for the pen-based computer to operate.

Pen-based computer 3 controls the operation of the PSSA, handles the operator interface, and serves as the storage device for the data collected by the PSSA. Pen-based computer 3 is physically and electrically connected to backpack system 2 by means of pen-based computer interface cable 5, through which data is exchanged between pen-based computer 3 and backpack system 2. As shown in FIG. 1, the relevant components of pen-based computer 3 include display 8 and solid pen 9 which is physically connected by means of pen interface cable 10, which serves only to attach pen 9 to pen-based computer 3 so that pen 9 does not get misplaced. Display 8 has affixed onto it a transparent touchscreen membrane which can detect when and where pen 9 is making contact with it. FIG. 13 shows a side-view diagram of pen-based computer 3, illustrating the interfaces which are relevant to the operation of the PSSA. Connector 80 is used to connect pen-based computer 3 of FIG. 1 to backpack system 2 using pen-based computer interface cable 5, connector 81 is a power switch used to turn the pen-based computer on and off, connector 82 is used to mechanically attach pen interface cable 10 which is connected to pen 9, and removable, rechargeable battery pack 83 is used to supply power to pen-based computer 3 and is provided with pen-based computer 3.

Figure 14:
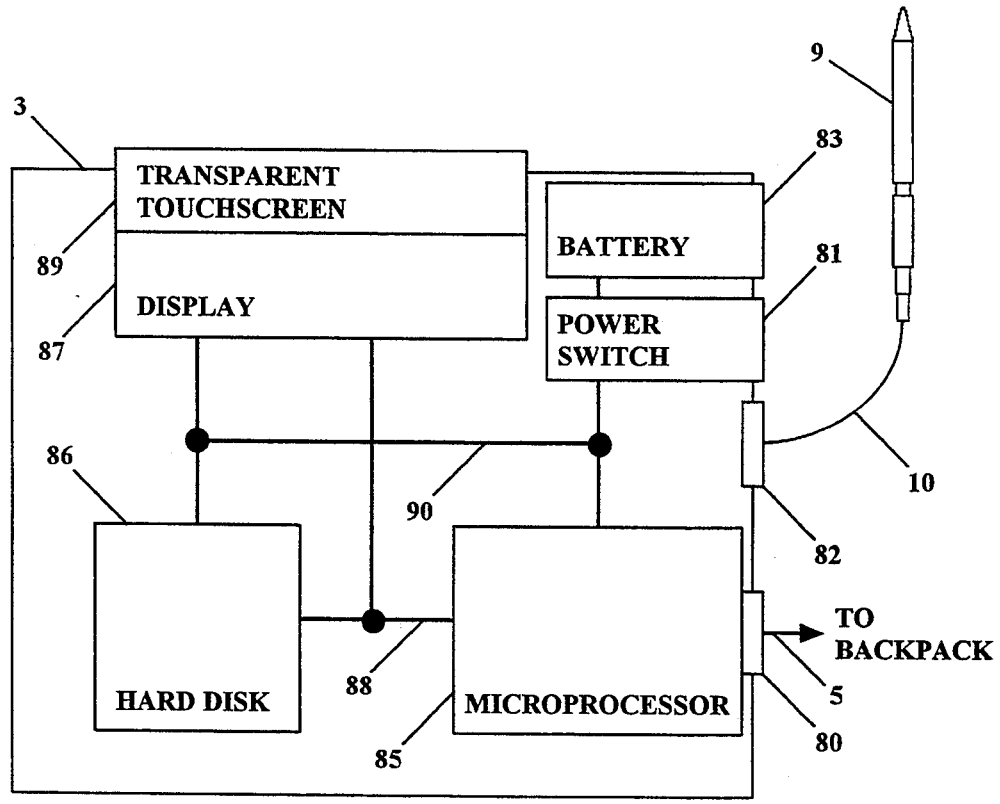
FIG. 14 shows a simplified block diagram of the pen-based computer, which illustrates the components that are relevant to the operation of the PSSA, including the mechanical pen that can write on the transparent touchscreen affixed to the top of the display to provide the human operator with the ability to easily input information without the need for a bulky keyboard or other input device.

FIG. 14 contains a block diagram of pen-based computer 3 of FIG. 1. Power switch 81 controls the routing of the power from battery 83 to the principal components, microprocessor 85, hard disk 86, and display 87. Microprocessor 85 controls the operation of pen-based computer 3, and communicates to hard disk 86 and display 87 using internal communications bus 88. Display 87 consists of a 640 by 400 picture element (pixel) backlit screen for displaying images, on top of which is adhered transparent, touchscreen membrane 89 which detects when and where pen 9 is making contact with touchscreen 89 by sensing the mechanical force which is applied to membrane 89 by pen 9. Pen 9 is physically, but not electrically, attached to connector 82 on the side of pen-based computer 3 via pen interface cable 10. Hard disk 86 stores the application software, a flowchart of which is shown in FIG. 15, that microprocessor 85 of FIG. 13 executes to control the operation of the PSSA. Hard disk 86 also serves to store the geographically-positioned downlink cellular communication channel signal strength data which is measured by the PSSA. Pen-based computer 3 is turned on by inserting battery 83 into pen-based computer 3 and moving mechanical power switch 81 to the On position, thereby allowing power to be routed from battery 83 over power bus 90 to microprocessor 85, hard disk 86 and display 87. Upon receiving power, microprocessor 85 communicates over internal bus 88 with hard disk 86 to request the application software, which is then transferred over internal bus 88 from hard disk 86 to microprocessor 85 and subsequently executed. Neither backpack system 2 of FIG. 1 nor laser rangefinder 4 receives any power from battery 83, and are not operating at this point.

The software flowchart in FIG. 15 describes the operation of the software which executes on and controls pen-based computer 3. Since the complete software flowchart is too large to fit onto a single sheet of paper, FIG. 15 describes the interconnection of the separate flowcharts FIGS. 15A–15H which comprise the entire application software flowchart. Since pen-based computer 3 controls the operation of the entire PSSA, the software flowchart in FIG. 15 also serves to describe the procedure for conducting a portable cellular coverage survey using the PSSA, consisting of the measurement of downlink cellular communication channel signal strengths, determination of geographic position via dead-reckoning navigation, and the subsequent marrying and storage of the two aforementioned data.

Figure 15A:
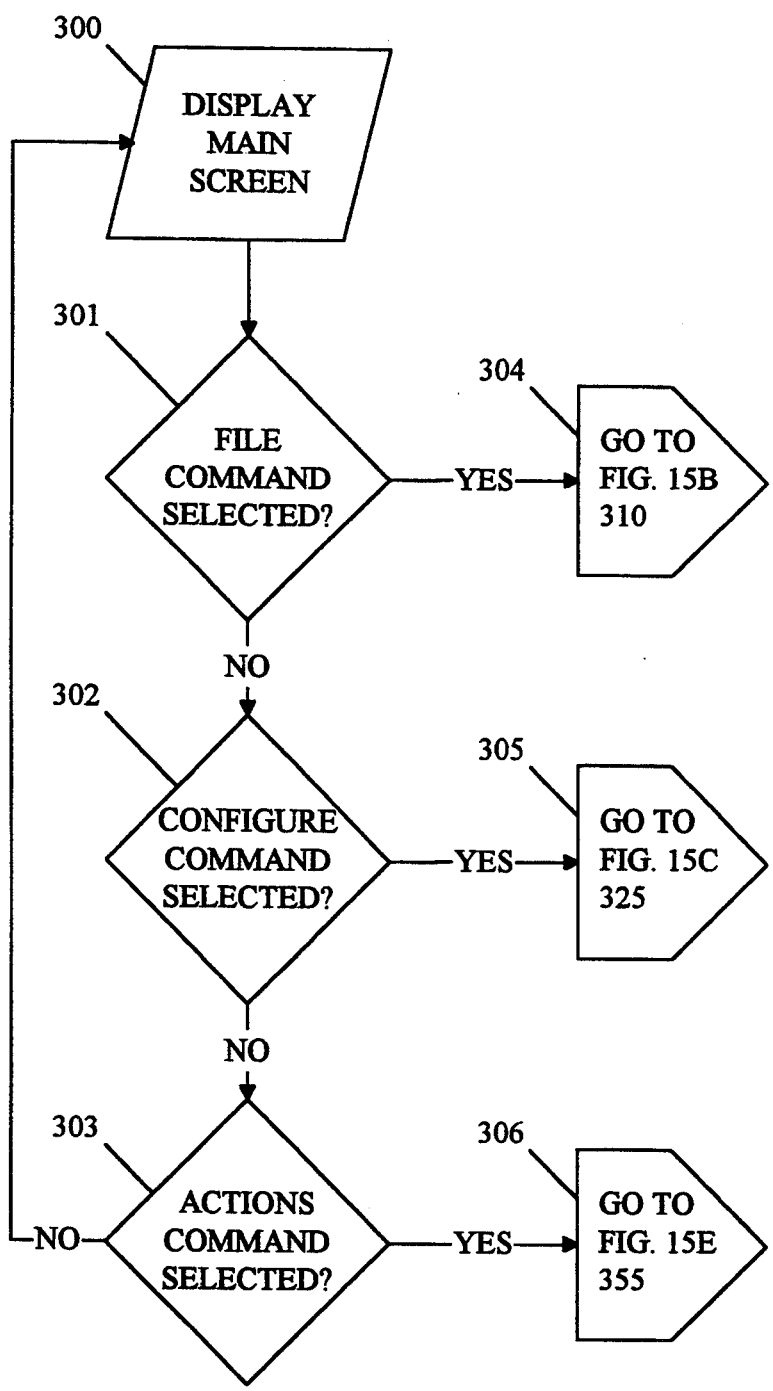
FIGS. 15 A–H contain a flowchart which describes the operation of the software which executes on the pen-based computer that provide the means for controlling the operation of the PSSA.
Figures 16, 17:
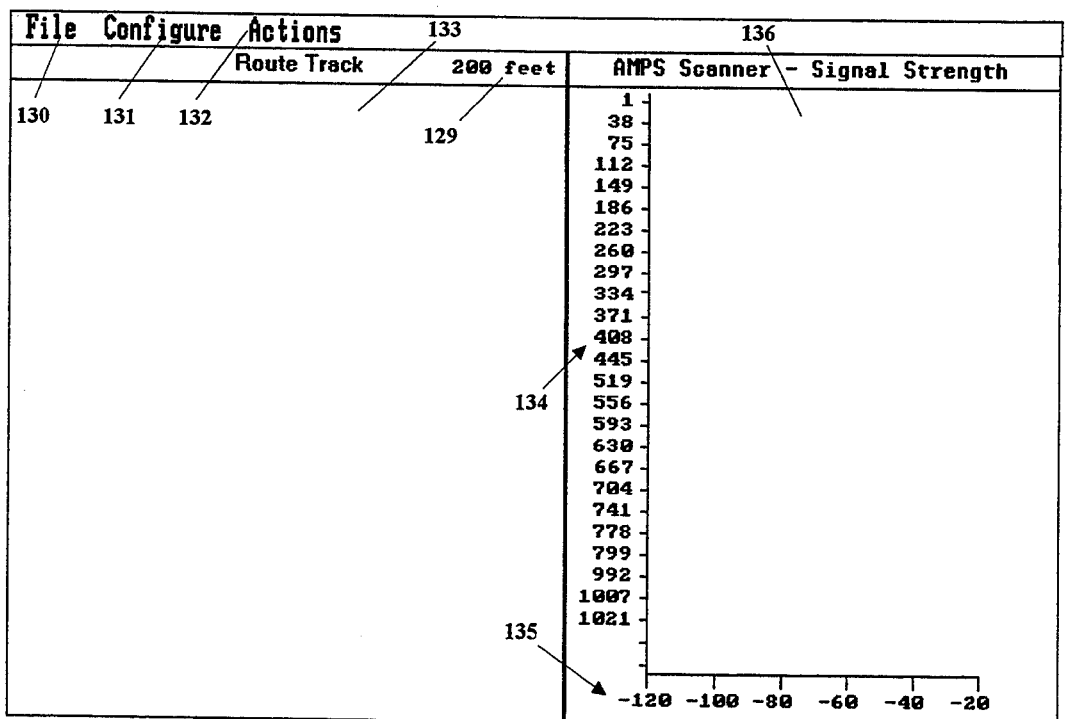
FIG. 16 contains a picture of the main screen which is shown on the pen-based computer display when the pen-based computer is first turned on, showing the command bar at the top of the screen which is used to access pull-down menus that contain all of the tasks that the PSSA can perform, the route track window on the left half of the screen which is used to display the route that has been traveled by the human operator during a coverage survey, and the signal strength scanner window on the right half of the screen which is used during a coverage survey to dynamically display the real-time signal strengths of the cellular communication channels that are being scanned.
FIG. 17 contains a picture of the main screen which is shown on the pen-based computer display after the Actions command has been selected from the command bar at the top of the screen, causing the Actions pull-down menu to appear which allows the selection of tasks that the PSSA can perform that are related to conducting a coverage survey.

Upon execution and as represented by symbol 300 of FIG. 15A, the application software sends the screenful of data comprising the main screen 137 pictured in FIG. 16 over the internal bus 88 of FIG. 14 to the display 87 for viewing by the human PSSA operator. This screen display procedure of transferring screenfulls of data over the internal bus 88 from the microprocessor 85 to the display 87 for viewing by the human PSSA operator will hereafter be referred to as "displaying". As illustrated in FIG. 16, the main screen 137 consists of the following basic screen regions: pull-down menu entitled File 130, pull-down menu entitled Configure 131, pull-down menu entitled Actions 132, Route Track window 133 occupying the left half of the display, and Signal Strength Scanner window 136 occupying the right half of the display.

The three pull-down menu general command headings 130–132 can each be selected by the PSSA operator to access other more-specific commands to perform tasks, and the other two display windows 133 and 136 are used only to display information.

Route Track window 133 occupying roughly one-half of the left side of the main screen 137 is blank when a coverage survey is not in progress and is used during a portable coverage survey to graphically display the path that is being traveled by the PSSA operator as a series of connected line segments. The top of Route Track window 133 is defined to be 0 degrees with respect to magnetic north, the right side 90 degrees, the bottom 180 degrees, and the left side 270 degrees. The scale of the window 133 is represented as the length of each side of the window 129 and initially fixed before a coverage survey, but dynamically changes by increasing during a coverage survey to always represent sufficient area to display the entire path that has been traveled by the PSSA operator so far.

The Signal Strength Scanner window 136 occupying roughly one-half of the right side of the main screen 137 is initially blank before a coverage survey, but is used during a coverage survey to graphically and dynamically display the most current signal strengths that are being measured by the PSSA of the downlink side of cellular communication channels. Each complete duplex cellular communication channel consists of two different frequencies separated by 45 MHz, representing the uplink channel from the portable phone to the cellular system and the downlink channel from the cellular system to the portable phone, but the two frequencies comprising the duplex cellular communications channel is referred to by a single channel number. The channel numbers of the downlink portions of the cellular communication channels 134 are vertically listed along the y-axis in the Scanner window 136, and the signal strength of the corresponding channel is represented graphically to the right of the channel number. The x-axis 135 represents the signal strength value for each cellular channel that is scanned, and can be represented in either arbitrary units known as RSSI units that are being reported by the cellular receiver or in absolute dBm units which are computed using the calibration profile of the cellular receiver which translates RSSI units to dBm units. For the same constant input signal strength, different cellular receivers will report different RSSI measurement units, so the calibration profile is required to convert these RSSI units to the common absolute signal strength scale in dBm units. Either of these two units may be displayed in the Scanner window 136.

Input to the pen-based computer 3 of FIG. 14 is achieved by using the pen 9 to make contact with the transparent touchscreen 89 in the desired area of the image or screen which is currently being shown on display 87. Display 87 can sense the mechanical force which is being applied by the pen 9 onto the touchscreen 89, and display 87 can detect where the depression is taking place. Selecting an item or button which is being shown on the display consists of touching pen 9 to the touchscreen 89 in the area which is directly above the desired item or button and then lifting pen 9. Entering textual information requires writing the desired information in either lower or uppercase letters or numbers using the pen 9 just like a common pencil is used to write the same information on a piece of paper.

Software execution will go from symbol 300 of FIG. 15A after the main screen has been displayed to symbols 301–303 in that order, checking if either the File 130, Configure 131 or Actions 132 headings, respectively, have been selected by the PSSA operator using pen 9 of FIG. 14. If the File heading 130 is selected, software execution will detect this event in symbol 301 and transfer execution to symbol 304 which is a connection to symbol 310 of FIG. 15B that will handle the event. If the Configure heading 131 is selected, software execution will detect this event in symbol 302 and transfer execution to symbol 305 which is a connection to symbol 325 of FIG. 15C that will handle the event. As previously mentioned, a calibration profile is used by pen-based computer 3 to translate the RSSI signal strength units reported by cellular receivers into absolute dBm signal strength units. To generate a calibration profile for the cellular receiver in the PSSA, Actions heading 132 must be selected. Symbol 303 will detect that Actions heading 132 has been selected and software execution will go from symbol 303 to symbol 306 which is a connection to symbol 355 of FIG. 15E. Symbol 355 of FIG. 15E will display the pull-down menu 138 of FIG. 17 associated with the Actions heading 132, and then wait for the pen 9 of FIG. 14 to select an area of the screen. The Actions pull-down menu 138 consists of the Start Test command 139, Update Position command 140, Note command 141, Marker command 142, Profile Phone command 143, and Profile Operator command 144. Start Test 139, Profile Phone 143, and Profile Operator 144 commands may be selected when not performing a coverage survey, and Update Position 140, Note 141, and Marker 142 commands may be selected only when performing a coverage survey. When pen 9 selects an area of the screen, software execution will go in order from symbol 355 to symbols 361, 356, 357, 358, 359, and 365 to check whether pen 9 selected one of the commands in Actions pull-down menu 138. To create a profile, Profile Phone command 143 will be selected by pen 9, which will be detected by symbol 359 which will then transfer software execution to symbol 360 which is a connection to symbol 375 of FIG. 15F.

Figure 15B:
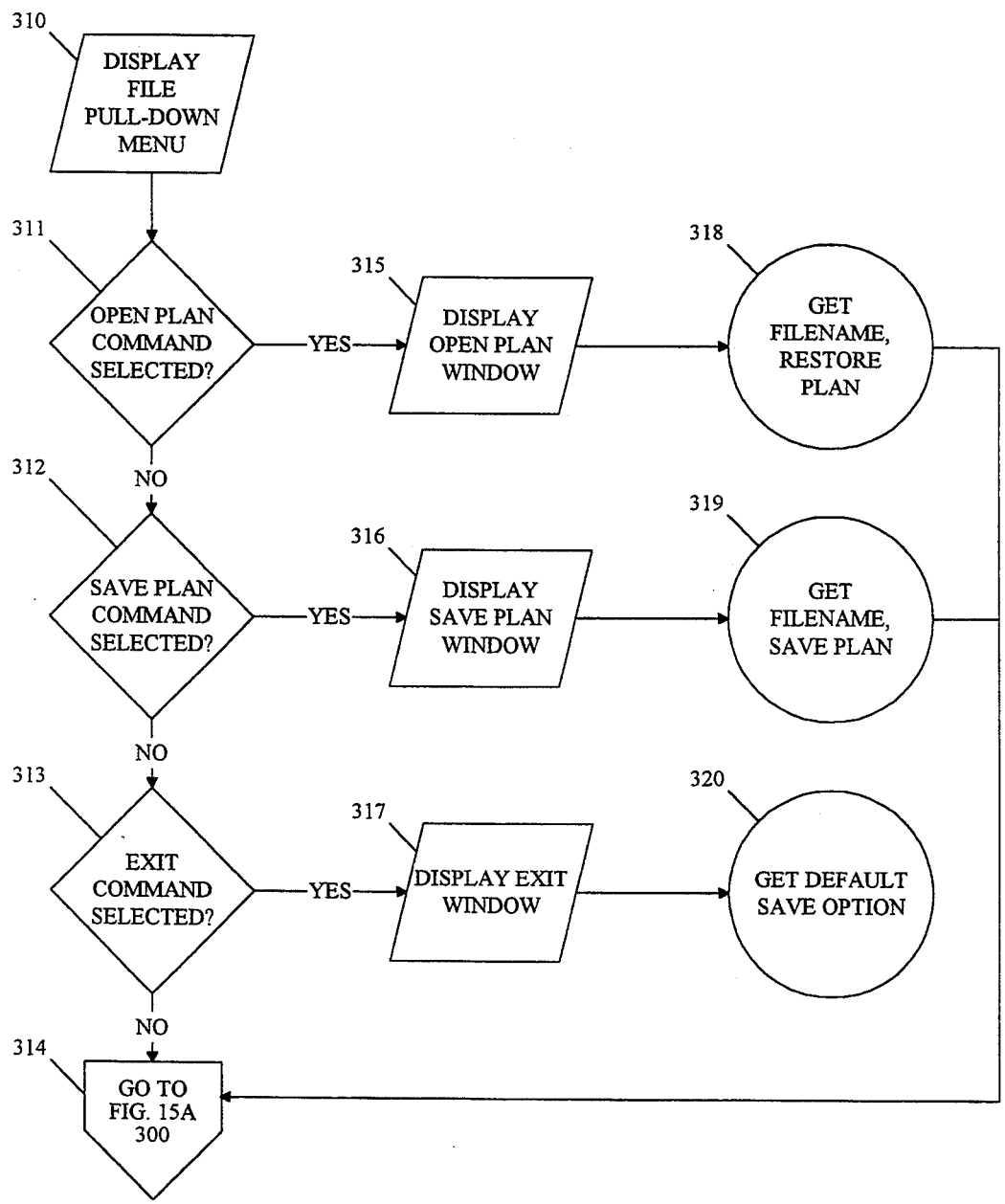
Figure 15C:
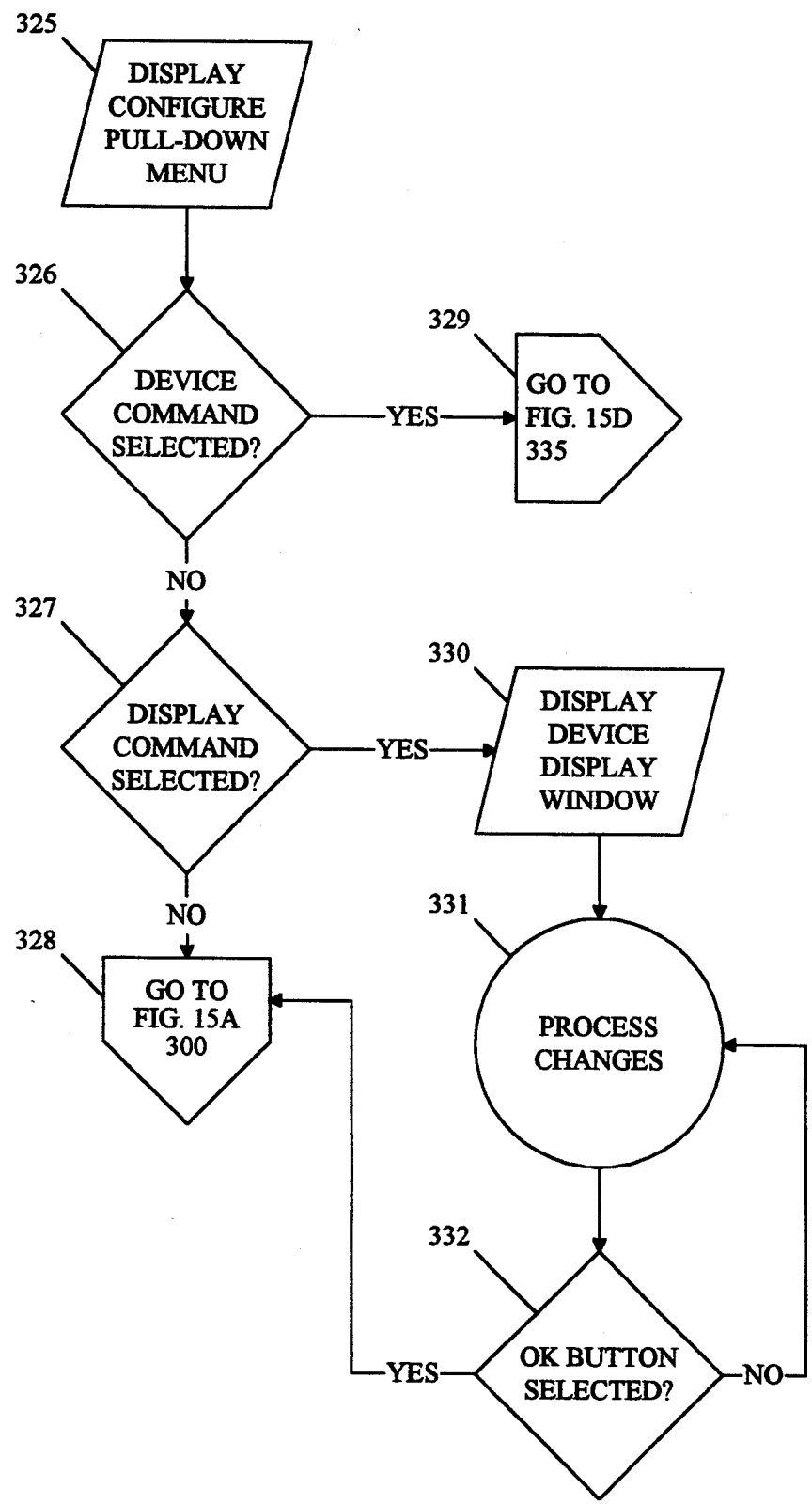
Figure 15D:
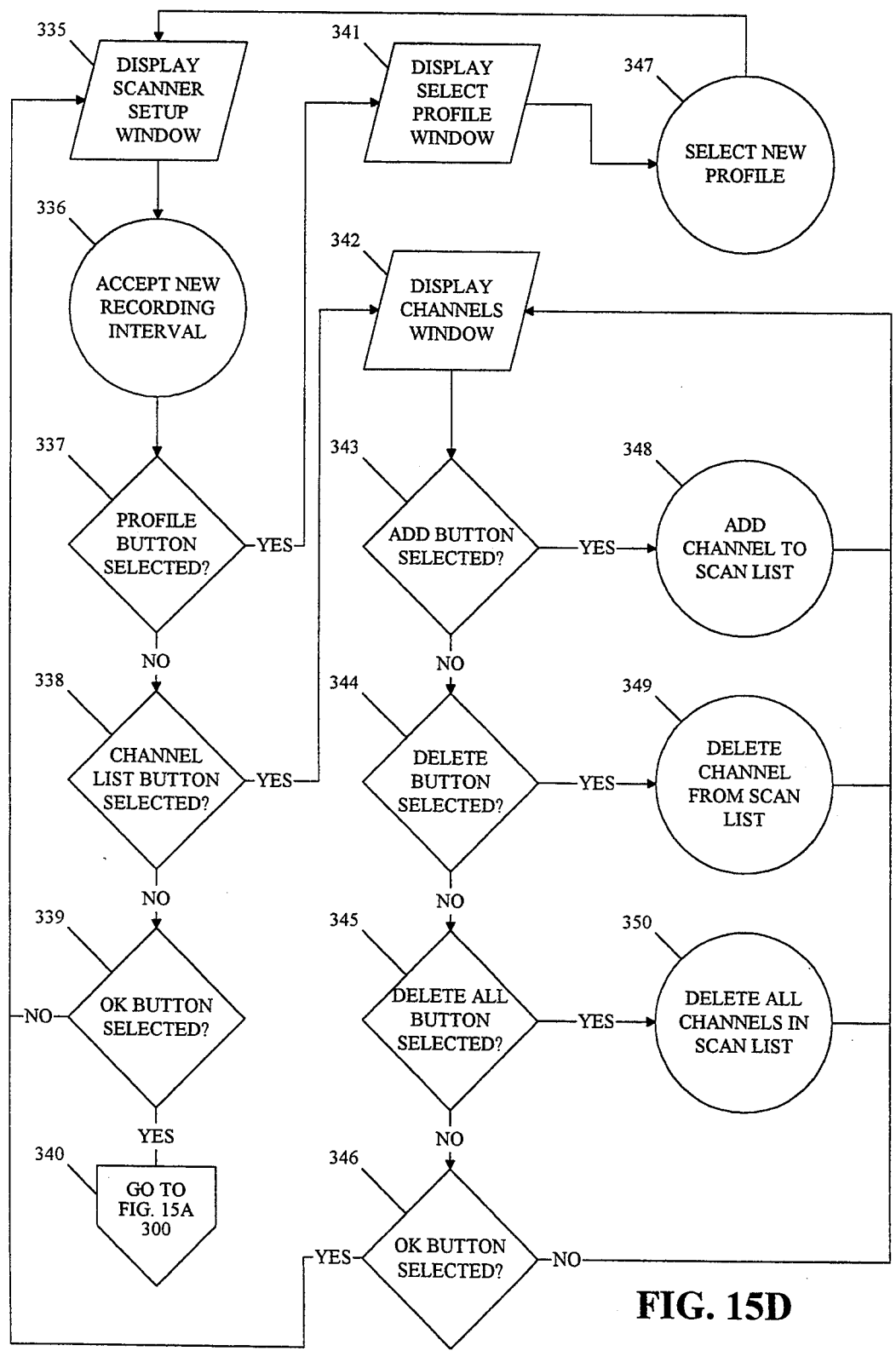
Figure 15E:
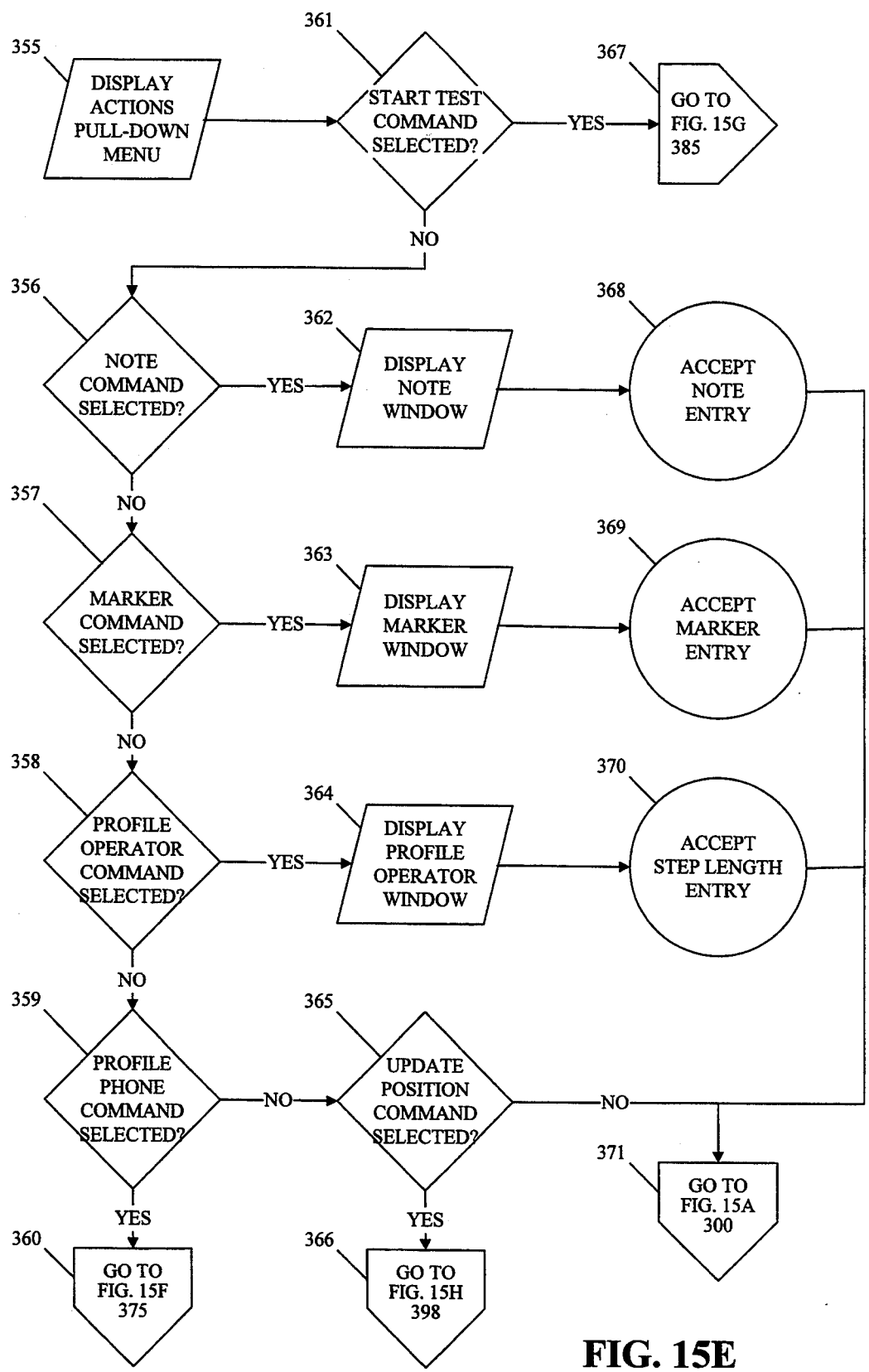
Figure 15F:
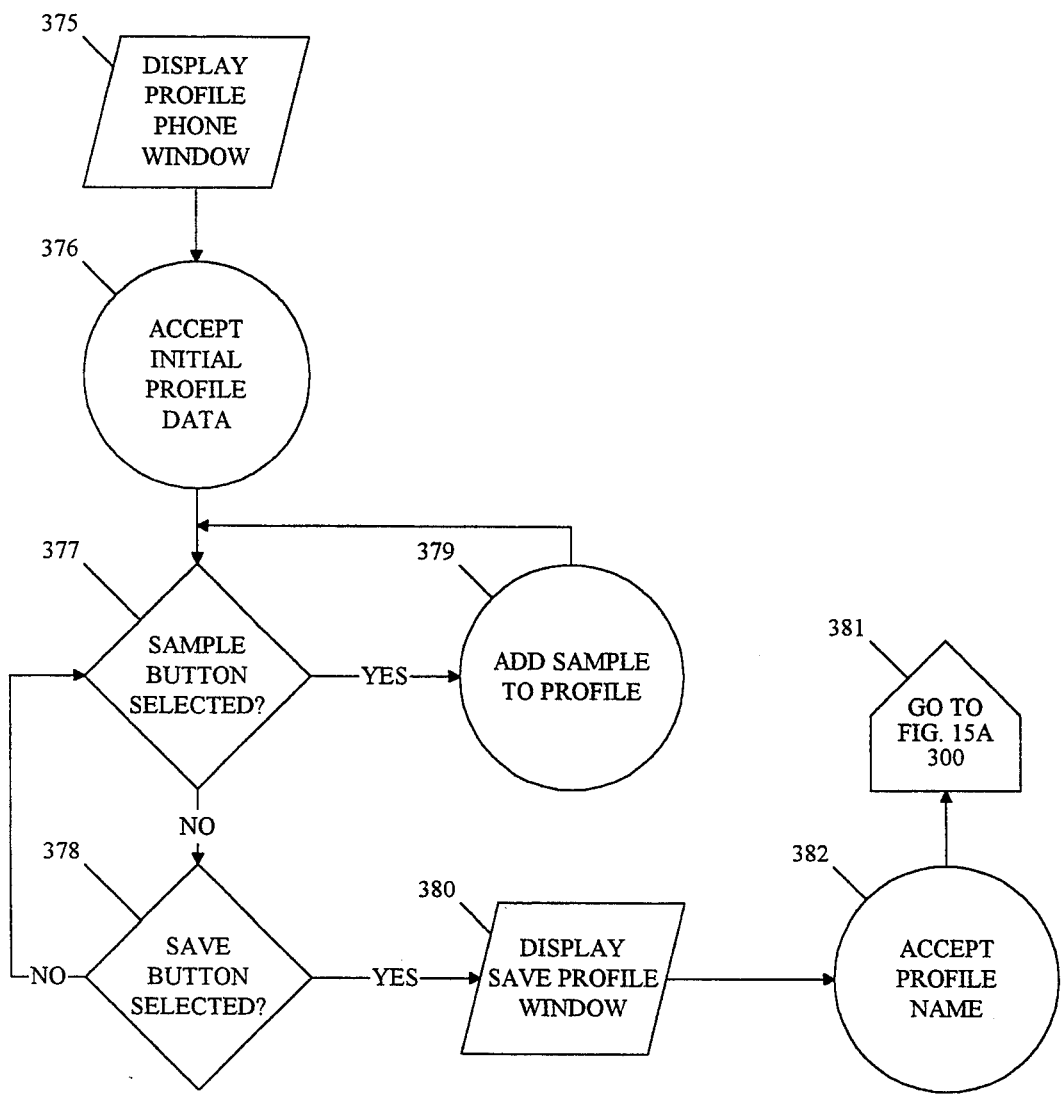
Figure 18:
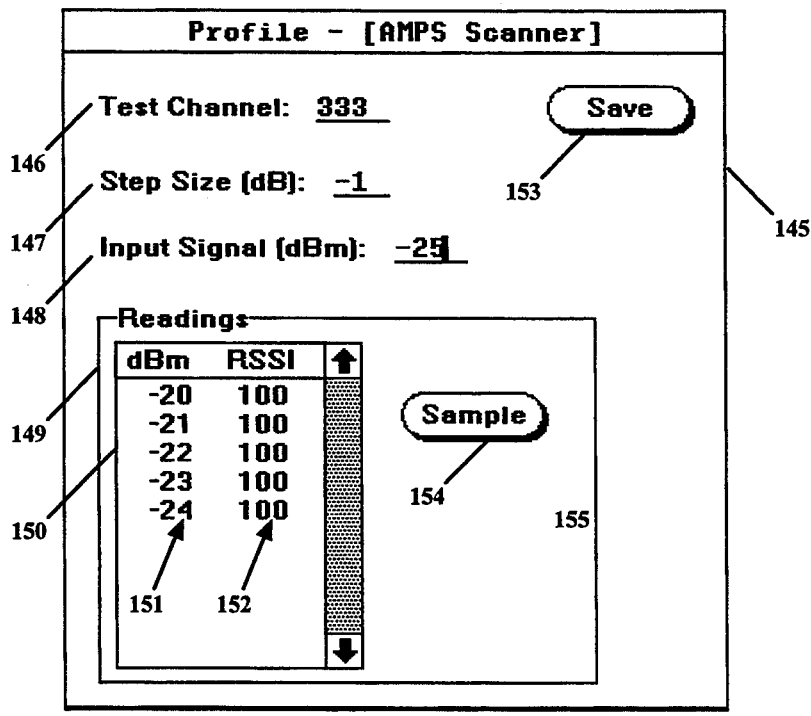
FIG. 18 contains a picture of the Profile Scanner window which is shown on the pen-based computer display after the Profile Phone command has been selected from the Actions pull-down menu, allowing a new calibration profile to be created for the cellular receiver which translates the relative signal strength measurement values that are reported by the cellular receiver into absolute signal strength measurements in dBm units.

Symbol 375 of FIG. 15F will display Profile Phone window 145 illustrated in FIG. 18. Profile Phone window 145 consists of Test Channel field 146, signal strength Step Size field 147, Input Signal strength field 148, Save profile button 153, and Readings box 149 which consists of Sample button 154 and translation table 150 containing the RSSI measurement values 152 reported by the cellular receiver along with the corresponding dBm input signal strength values 151. Software execution will then continue to symbol 376 which will allow Test Channel 146, Step Size 147, and Input Signal 148 to be modified by the PSSA operator. Test Channel field 146 may be changed by the PSSA operator to specify the cellular channel number whose downlink frequency will be used for the calibration procedure. A calibrated RF signal generator capable of providing signal strengths of −20 dBm to −120 dBm in the cellular frequency band needs to be available to provide the cellular receiver in the PSSA with a known constant input signal. The calibration procedure will start by configuring the signal generator to output the cellular downlink frequency associated with Test Channel 146 at a signal strength of the value in Input Signal field 148, removing antenna cable 28 of FIG. 2 from connector 62 on chassis 66, and connecting the signal generator to connector 62 which is routed through internal antenna cable 63 to connector 64 on cellular receiver 32.

Figure 43:
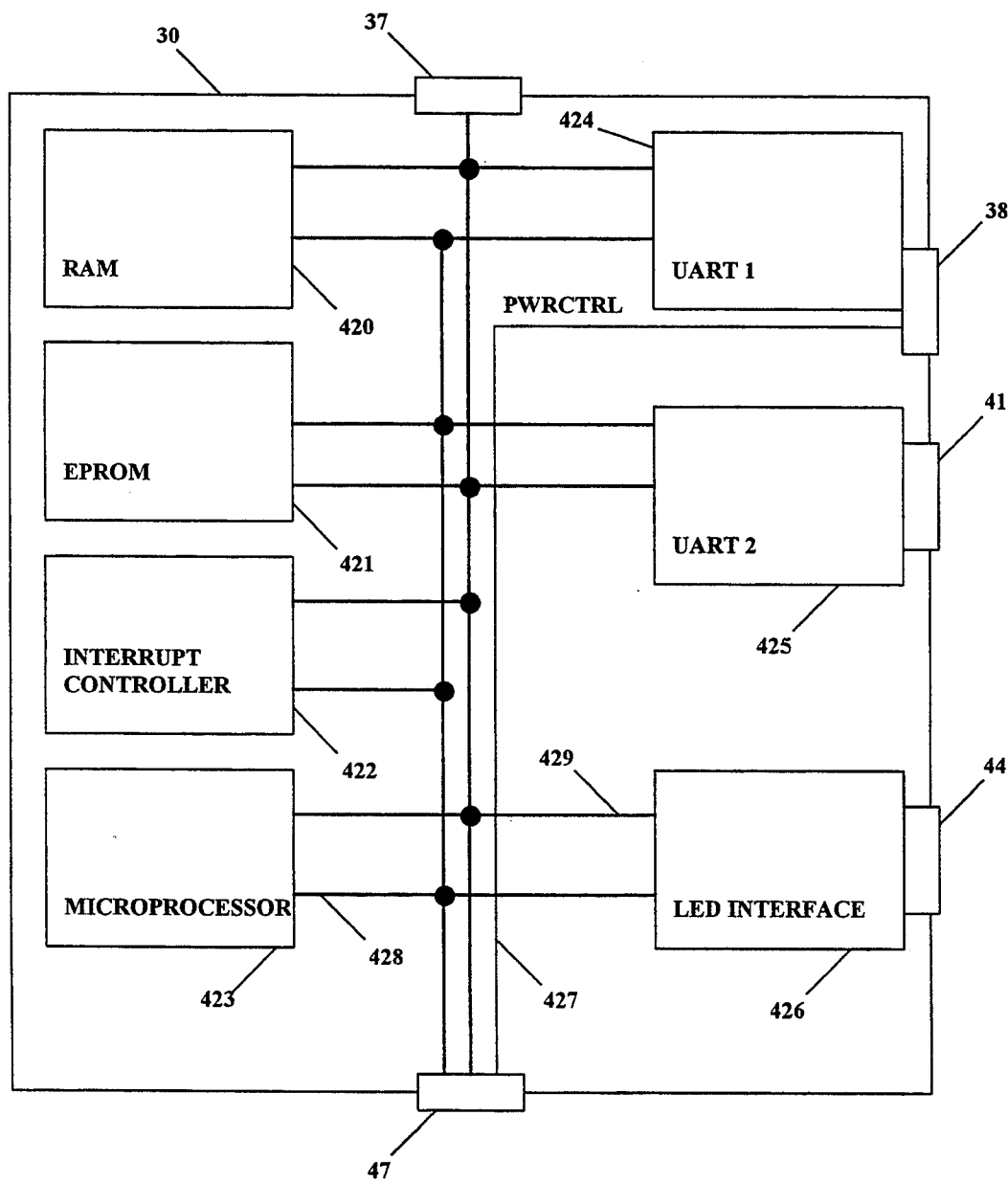
FIG. 43 contains a block diagram of the backpack controller board which operates in and controls the backpack system.

Symbol 376 of FIG. 15F then asserts a power control signal on connector 80 of FIG. 13 to turn on the power to backpack system 2 of FIG. 2 to be able to have cellular receiver 32 measure the calibration signal being provided by the signal generator. The power control signal on connector 80 of FIG. 13 is conducted through pen-based computer interface cable 5 of FIG. 2 to connector 40 on backpack chassis 66, and then through cable 39 to connector 38 on backpack controller board 30. FIG. 43 contains a block diagram of the backpack controller board, which consists of microprocessor 423, interrupt controller 422, EPROM 421, RAM 420, UART #1 424, UART #2 425, LED interface 426, power bus 429, data bus 428, and power control signal from pen-based computer 3 of FIG. 1 PWRCTRL 427. Power control signal PWRCTRL 427 is routed from connector 38, through the backpack controller board 30 to connector 47, through interface connection 48 of FIG. 2 to connector 49 on the receiver interface board 31. Power bus 429 of FIG. 43 comes from connector 37 which is connected through cable 36 of FIG. 2 to connector 35 on DC/DC converter 29, and supplies power to all of the components on backpack controller board 30. When power is later applied to backpack controller board 30, microprocessor 423 executes the software contained in EPROM 421 over the data bus 428. RAM 420 is used for temporary storage of data during software execution. LED interface 426 converts the signals on data bus 428 to control the status LED's 46 of FIG. 10 through connector 44 of FIG. 43 and cable 45. Both of the universal asynchronous receiver/transmitters (UART) 424 and 425 are responsible for accepting parallel commands from the microprocessor 423 and serially transmitting them to the pen-based computer 3 of FIG. 1 and laser rangefinder 4. UART #1 424 controls communication between microprocessor 423 and pen-based computer 3 of FIG. 1 through connector 38 of FIG. 43, cable 39 of FIG. 2, connector 40, and pen-based computer interface cable 5. UART #2 425 controls communication between microprocessor 423 and laser rangefinder 4 of FIG. 1 through connector 41 of FIG. 43, cable 42 of FIG. 2, connector 43, and laser rangefinder interface cable 6. Interrupt controller 422 is responsible for informing the microprocessor 423 of pending service requests by devices such as the UART's 424–425 and receiver interface circuitry 433 in FIG. 44.

Figure 44:
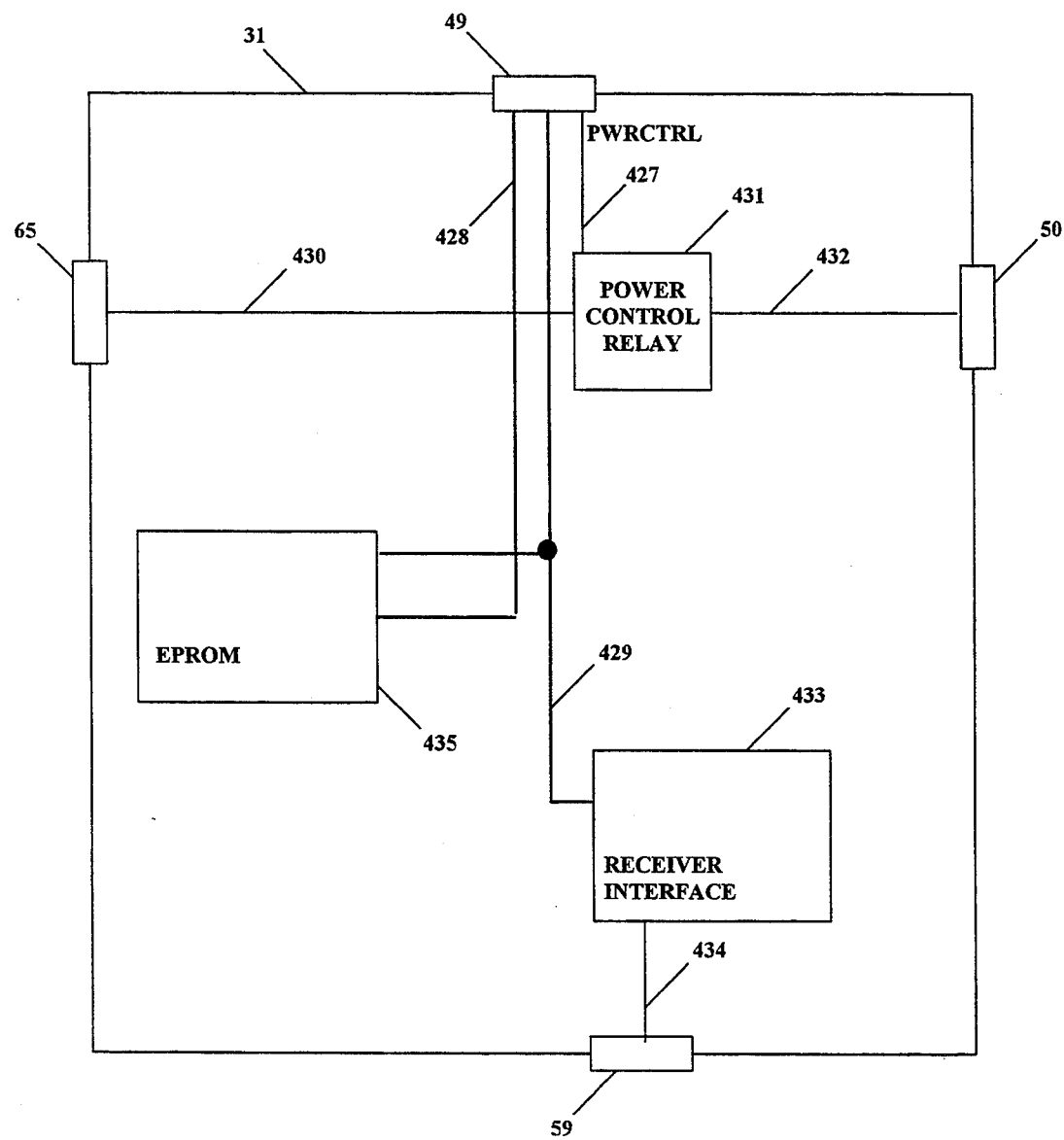
FIG. 44 contains a block diagram of the receiver interface board in the backpack system which controls the operation of the cellular receiver.

FIG. 44 contains a block diagram of receiver interface board 31 of FIG. 2 which uses power control signal PWRCTRL 427 to control relay 431 which switches power from connector 50 using wire 432 to connector 65 using wire 430. Battery 67 is the power source for the backpack system 2 of FIG. 1 and laser rangefinder 4, and is connected to connector 58 on backpack chassis 66 which is sent to fuse 57 through wire 56, and then to the input power select switch 54. Connector 53 can be used to input an alternate source of power to the power select switch through wire 52, and the power select switch 54 is used to select which power source, battery 67 or external power source from connector 53, is used by the backpack system 2. Input select switch 54 routes the selected power source through cable 51 to connector 50 on receiver interface board 31, which contains relay 431 of FIG. 44 that controls the power to the backpack system 2 and is controlled by PWRCTRL signal 427 coming from the pen-based computer 3 of FIG. 1.

The switched power from connector 65 is then sent through cable 34 of FIG. 2 to connector 33 on DC/DC converter 29 which converts the power from battery 67 (nominally +12VDC) to regulated +5VDC and then sends the +5VDC power out connector 35, through cable 36, into connector 37 on backpack controller board 30, and onto power bus 429 of FIG. 43 which supplies power to all components on backpack controller board 30. Power bus is also routed out connector 47, through interconnection 48 of FIG. 2, into connector 49 of FIG. 44, and onto power bus 429 to supply operating power to all of the components on receiver interface board 31. FIG. 44 shows the principal components of receiver interface board 31 as EPROM 435, receiver interface 433, and power control relay 431. EPROM 435 contains software that controls the cellular receiver 32 of FIG. 2 using receiver interface 433 of FIG. 44, receiver bus 434, connector 59, cable 60 of FIG. 2, and connector 61.

Figures 45, 46:
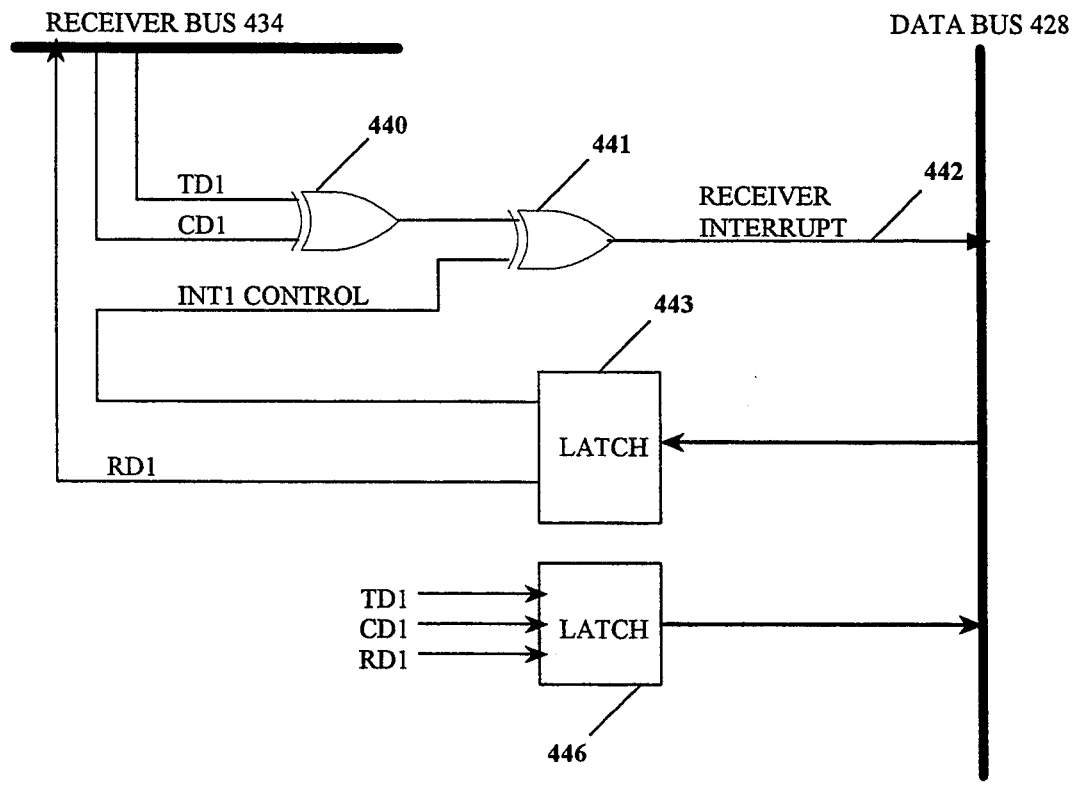
FIG. 45 contains a drawing of the components on the receiver interface board in the backpack system which are relevant to the interface to the cellular receiver.
FIG. 46 contains a table of the possible data states that are possible on the communications bus to the cellular receiver.

The receiver interface board has been designed to interface specifically to cellular receivers which support the interface bus protocol outlined in U.S. Pat. No. 4,369,516. As stated in U.S. Pat. No. 4,369,516 and repeated here for clarity, the receiver bus 434 of FIG. 44 contains three signals which control the exchange of information on the bus. These three signals are called true data (TD1 of FIG. 45), complement data (CD1), and return data (RD1). The first two signals, TD1, and CD1, are used by receiver 32 of FIG. 2 to send information onto the receiver bus 434 of FIG. 45. The states of these two signal lines along with the corresponding meaning of each state are set forth in FIG. 46. One bit of data is communicated on the receiver bus 434 of FIG. 45 each time the TD1 and CD1 signals change to either the zero state or the one state, collectively referred to as a data state, with the zero state meaning a data bit of 0 and the one state meaning a data bit of 1. The word and bit states are used during the transmission of data to indicate the time between data bits and to indicate when the transmission has completed. Due to the nature of the protocol on the receiver bus 434, only one of the two signals, TD1 or CD1, can change at a time. The XOR gate 440 is used to detect all changes on the TD1 and CD1 lines. The XOR gate 441 is used to indicate whether the TD1 and CD1 lines have just changed to a data state or if they have just changed to either the word or bit state. The exact function of XOR gate 441 is controlled by the INT1 CONTROL signal which is latched into latch 443 from the data bus 428. After XOR gate 441 activates the PHONE 1 INTERRUPT signal, the data bus 428 then reads the latch 446 which contains the states of all of the signal lines of interest to determine what specific activity on the phone bus has occurred. All three of the signals, TD1, CD1, and RD1, are used to send information onto the receiver bus 434 destined for the cellular receiver 32 of FIG. 2. Receiver 32 will continuously change the states of the TD1 and CD1 lines to clock data onto the receiver bus 434. The RD1 line is used by the phone interface circuitry in response to the TD1 and CD1 line clocking to transfer data onto the receiver bus. The RD1 line is controlled by writing its value to the latch 443 via the data bus 428, and a new value is written each time that the TD1 and CD1 lines are clocked by receiver 32 of FIG. 2.

Figure 48:
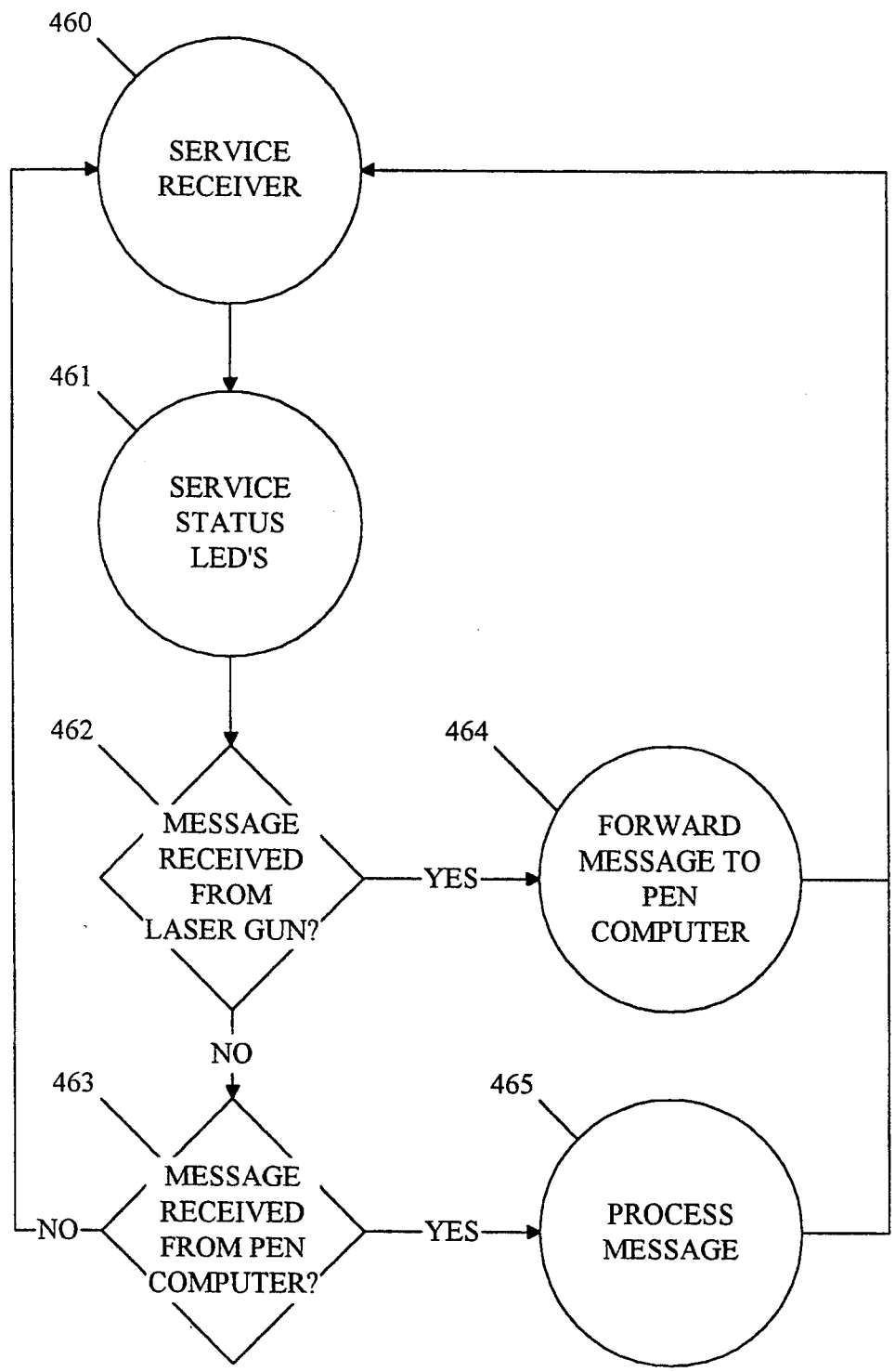
FIG. 48 contains a flowchart for the operation of the software which executes on the receiver interface board in the backpack system.

The receiver interface circuitry 433 of FIG. 44 is controlled by the receiver interface board software contained in EPROM 435, whose basic functional flowchart is shown in FIG. 48. The first basic function of the receiver interface board software is to send commands to a cellular receiver. As shown in symbol 450 of FIG. 48, if a command is to be sent to the receiver, then the software will sequence through symbols 451 to 453 continually waiting for interrupts to occur which will clock the data to be sent onto the cellular receiver bus 434 using the RD signal line on the receiver bus 434 and the method previously described. Typical commands handled by symbol 450 include instructing the cellular receiver to scan the desired list of channels and return the current signal strengths of the channels. Symbols 454 to 457 illustrate the reception of a data message from the receiver bus 434 by waiting for state changes in the TD and CD lines on the receiver bus 434, and then storing the data bits indicated by the state of the signals. The command containing the signal strengths of the cellular channels that are being scanned would be received by symbol 454. When a complete data message has been received from the receiver bus 434, a flag is then set in symbol 458 to inform the software on the backpack controller board 30 of FIG. 2 that new data from the receiver 32 is available.

Figure 47:
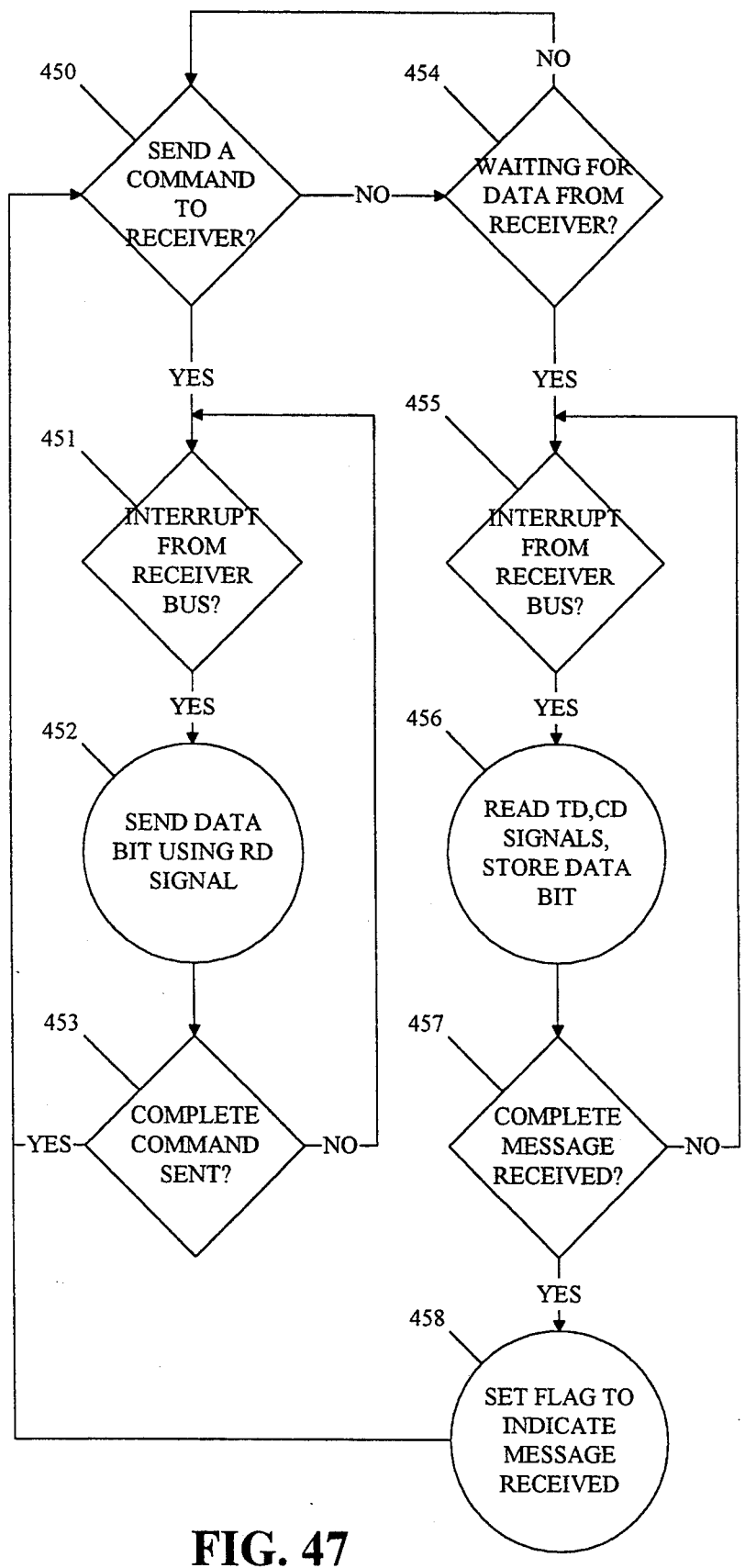
FIG. 47 contains a flowchart for the operation of the software which executes on the backpack controller board in the backpack system.

The principal functional components of the software which executes on the backpack controller board 30 of FIG. 43 are described in FIG. 47 which contains a flowchart for the operation of the software. Symbol 460 represents the execution of the software that operates on the receiver interface board 31 of FIG. 2 and is contained in EPROM 435 of FIG. 44 on the receiver interface board 31. Execution of the software on the backpack controller board 30 of FIG. 43 then continues to symbol 461 of FIG. 47, where the state of the status LED's 46 of FIG. 2 are configured according to the current operational state of the backpack system 2. Symbol 462 is then executed which checks for the reception of a message from the laser rangefinder 4 of FIG. 1 which would be sent by the laser rangefinder 4 through interface cable 6 of FIG. 2 into connector 43 on backpack chassis 66, through internal cable 42 to connector 41 on the backpack controller board 30 of FIG. 43, into UART #2 425 which then sends a signal over the data bus 428 to interrupt controller 422 to transfer the message over data bus 428 to microprocessor 423. If such a message from the laser rangefinder 4 of FIG. 1 were received, symbol 462 of FIG. 47 would transfer control to symbol 464 which handles the forwarding of the message to the pen-based computer 3 of FIG. 1. The message would be sent from microprocessor 423 of FIG. 43 to UART #1 424 over data bus 428 using interrupt controller 422. UART #1 424 would then send the message out connector 38 through internal cable 39 of FIG. 2 to connector 40 on the backpack chassis 66, and then the message would be sent through pen-based computer interface cable 5, which is attached to connector 40 on backpack chassis 66, to the pen-based computer 3 of FIG. 1. After the message has been forwarded, symbol 464 of FIG. 47 then transfers control back to symbol 460. If no message was received from the laser rangefinder 4 of FIG. 1, symbol 462 of FIG. 47 transfers control to symbol 463 which checks for a message received from the pen-based computer 2 of FIG. 1, and if so, transfers control to symbol 465 to process the message; otherwise symbol 463 transfers control back to symbol 460. Symbol 465 processes the message from pen-based computer 2 of FIG. 1 containing the list of cellular channels to scan and the message requesting the current signal strengths of the cellular channels which are being scanned.

The laser rangefinder 4 of FIG. 1 is a distance and bearing measurement device which is used by the PSSA to perform dead-reckoning navigation in pedestrian areas using the scheme illustrated in FIG. 8. Specifically, the laser rangefinder device that is used by the PSSA is Model 1000B manufactured by Laser Atlanta, Norcross, Ga., who has submitted patent application Ser. No. 07-744950, dated Aug. 14, 1992, entitled "Lidar Device with Combined Optical Sight".

Figure 11:
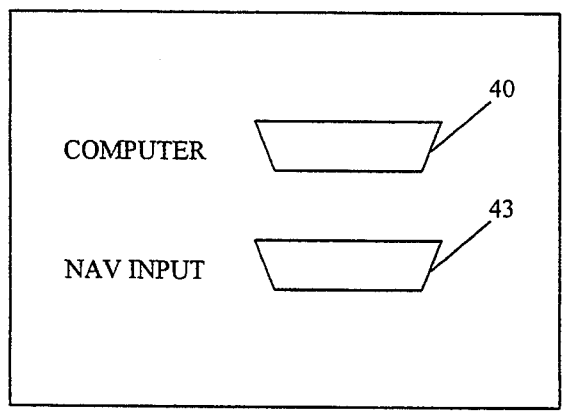
FIG. 11 shows an illustration of the second of the three interface panels on the side of the backpack system opposite from the side onto which the retractable antenna assembly is mounted which is used to provide connectors for interfacing to the pen-based computer and laser rangefinder.
Figure 12:
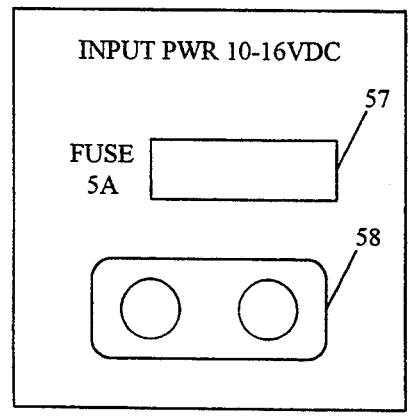
FIG. 12 shows an illustration of the third of the three interface panels on the side of the backpack system opposite from the side onto which the retractable antenna assembly is mounted which is used to provide a connector for receiving power from a battery and a fuse to protect the backpack system from an excess of received current from the battery.
Figure 49:
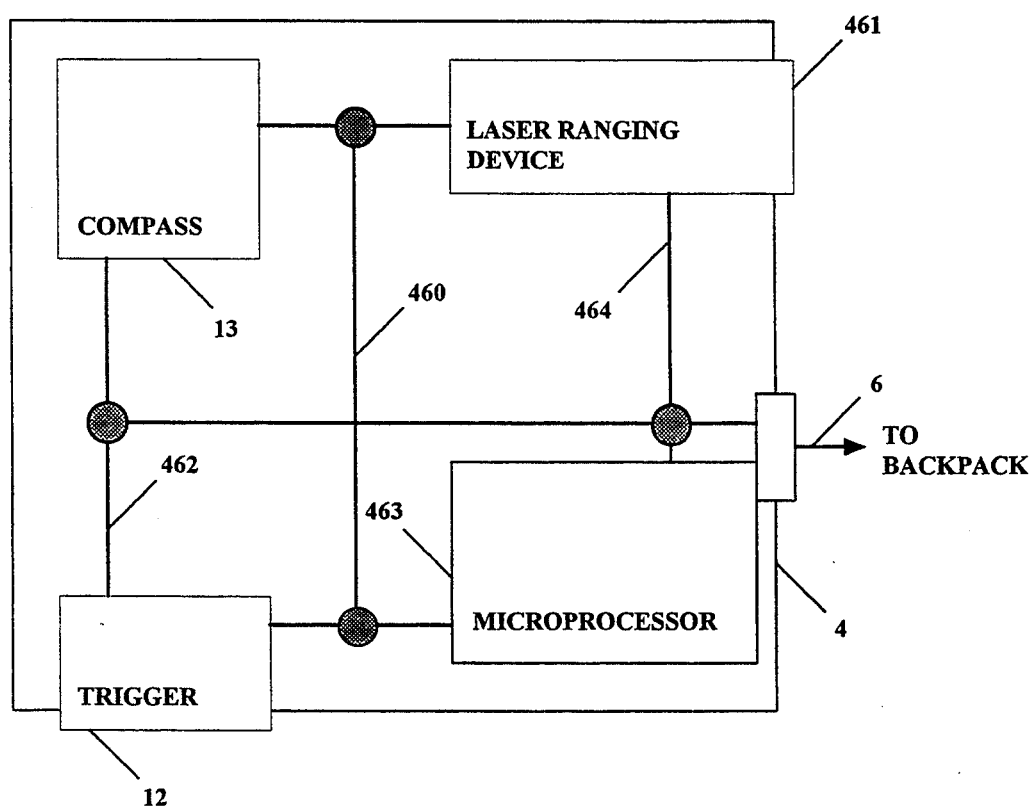
FIG. 49 contains a block diagram of the laser rangefinder, which illustrates the laser-ranging device, built-in fluxgate compass, and measurement trigger.
Figure 50:
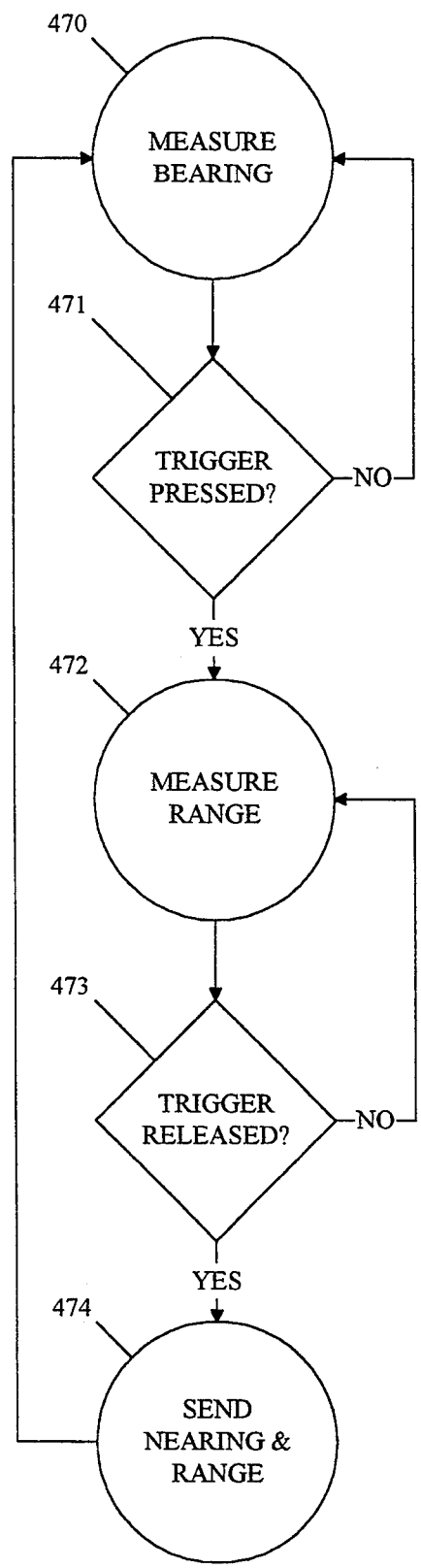
FIG. 50 contains a flowchart for the operation of the software which executes in the laser rangefinder.

Laser rangefinder 4 of FIG. 1 is physically and electrically connected to backpack system 2 by means of cable 6 which attaches to "NAV INPUT" connector 41 of FIG. 11, and which is also physically attached on the other end to laser rangefinder 4 of FIG. 1. A block diagram of the laser rangefinder 4 of FIG. 1 is shown in FIG. 49. Microprocessor 463 controls the operation of the laser rangefinder 4 through execution of the software contained within microprocessor 463, a flowchart of which is contained in FIG. 50. Internal data bus 460 connects components compass 13, laser-ranging device 461, and trigger 12 allowing them to communicate with one another, and power bus 464 provides power to the components to operate. The power contained in power bus 464 comes through cable 6 from the backpack system 2 of FIG. 2 connector 43. Symbol 470 of FIG. 50 measures the current bearing using compass 13 of FIG. 49 and transfers control of the software to symbol 471 of FIG. 50 which checks whether or not the trigger 12 of FIG. 49 has been pressed by the PSSA operator. If the trigger 12 has not been pressed, software execution continues back to symbol 470 of FIG. 50 for another bearing measurement. If the trigger 12 of FIG. 49 has been pressed, symbol 471 will transfer control to symbol 472 which will store the last bearing measurement and perform a range measurement using the laser-ranging device 461 of FIG. 49. Control then transfers to symbol 473 of FIG. 50 which checks for whether or not the trigger 12 of FIG. 49 has been released, in which event, the range measurement will be stored and control will transfer to symbol 474 of FIG. 50. If the trigger 12 of FIG. 49 has not yet been released, then software execution will return from symbol 473 of FIG. 50 back to symbol 472 for another range measurement. Symbol 474 sends the stored bearing and range measurements from microprocessor 463 of FIG. 49 in the laser rangefinder 4 through interface cable 6 to connector 43 of FIG. 2 on chassis 66 of backpack system 2.

After backpack system 2 of FIG. 1 has been turned on by pen-based computer 3, symbol 376 of FIG. 15F will then transfer execution of pen-based computer software to symbol 377 which detects if Sample button 154 of FIG. 18 has been selected by the PSSA operator. Sample button 154 must been selected for each signal strength input level, typically between −20 dBm and −120 dBm, being used in the calibration procedure. Each occurrence of selecting Sample button 154 results in the pen-based computer 3 of FIG. 1 sending a message to backpack system 2 which requests a single signal strength reading from cellular receiver 32 of FIG. 2 which corresponds to the current signal strength that is being provided to cellular receiver 32 by the external RF signal generator. Selecting Sample button 154 of FIG. 18 transfers software control from symbol 377 of FIG. 15F to symbol 379, which adds the RSSI signal strength measured by and received from cellular receiver 32 of FIG. 2 along with Input Signal value 148 of FIG. 18 to the current calibration profile 150. Input Signal 148 is then offset by Step Size 147 to calibrate at the next signal strength level. At each step during the calibration procedure, Input Signal value 148 is stored in column 151 and the corresponding RSSI value reported by cellular receiver 32 of FIG. 2 is stored in column 152. Software execution is then transferred from symbol 379 of FIG. 15F back to symbol 377.

Figure 19:
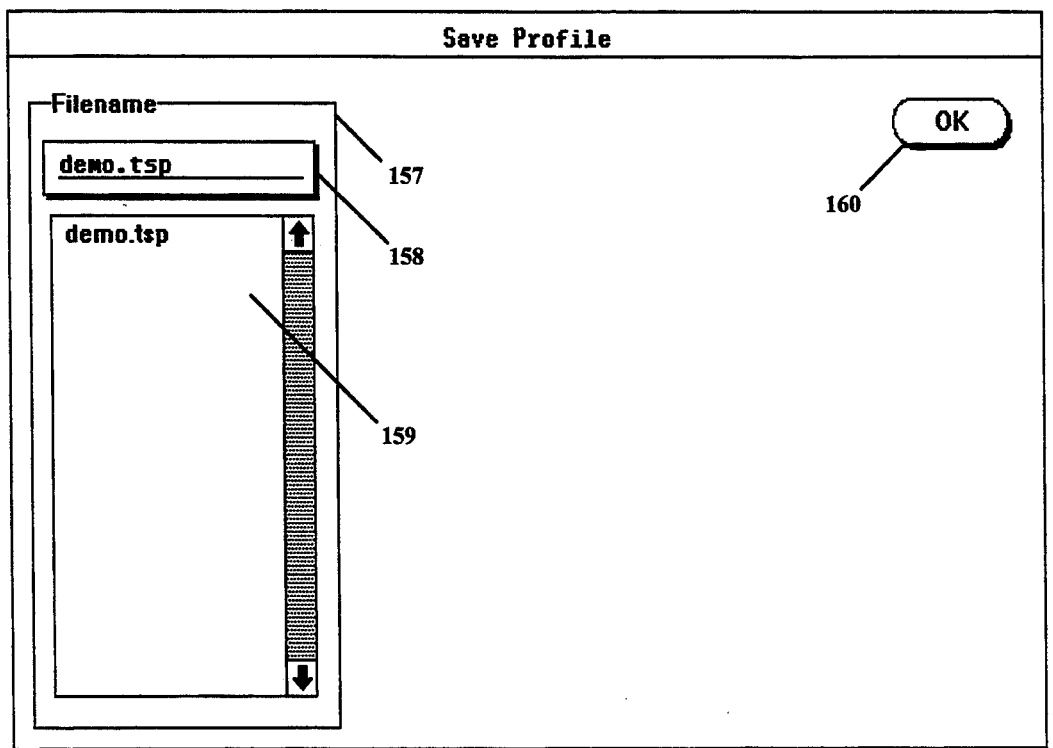
FIG. 19 contains a picture of the Save Profile window which is shown on the pen-based computer after the Save button is selected from the Profile Scanner window, which allows the calibration profile that was created in the Profile Scanner window to be saved into a data file on the computer for subsequent use during a coverage survey when the measured cellular channel signal strengths are desired to be displayed in absolute dBm units.

If symbol 377 does not detect the selection of Sample button 154, control transfers from symbol 377 to symbol 378 which checks for the selection of Save button 153. If Save button 153 is not selected, control transfers back to symbol 377. After the complete calibration profile 150 has been created, the profile 150 must be saved for subsequent use during a coverage survey by selecting Save button 153, which transfers control from symbol 378 of FIG. 15F to symbol 380 which displays the Save Profile window 156 shown in FIG. 19. Save Profile window 156 contains OK button 160 and Filename selection box 157, which contains existing filename list 159 and selected filename box 158. A filename must be selected to store the calibration profile 150 of FIG. 18 in, and existing filename list 159 of FIG. 19 provides a list of the existing files already on the hard disk 86 of FIG. 14 in pen-based computer 3. Symbol 380 of FIG. 15F then transfers control to symbol 382 which accepts a filename. Either one of the filenames in the existing filename list 159 of FIG. 19 may be selected in which case the filename will be transferred to the filename box 158, or a filename may be written into the filename box 158 by the PSSA operator. When the desired filename is correctly shown in filename box 158, OK button 160 is selected which causes software execution to transfer from symbol 382 of FIG. 15F to symbol 381. Symbol 381 is a connection to symbol 300 of FIG. 15A which displays the main screen again.

Figure 20:
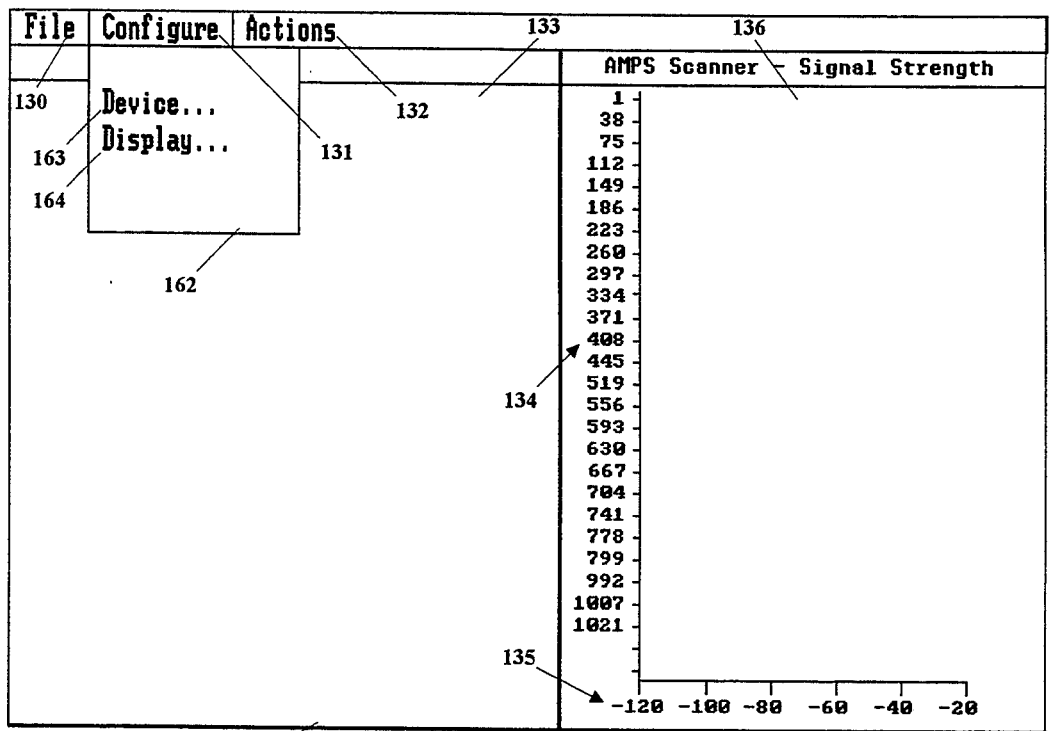
FIG. 20 contains a picture of the main screen which is shown on the pen-based computer display after the Configure command has been selected from the command bar at the top of the screen, causing the Configure pull-down menu to appear which allows the selection of tasks that the PSSA can perform that are related to the operation of the cellular receiver scanning device and the appearance of the signal strength scanner window in the main screen.
Figure 21:
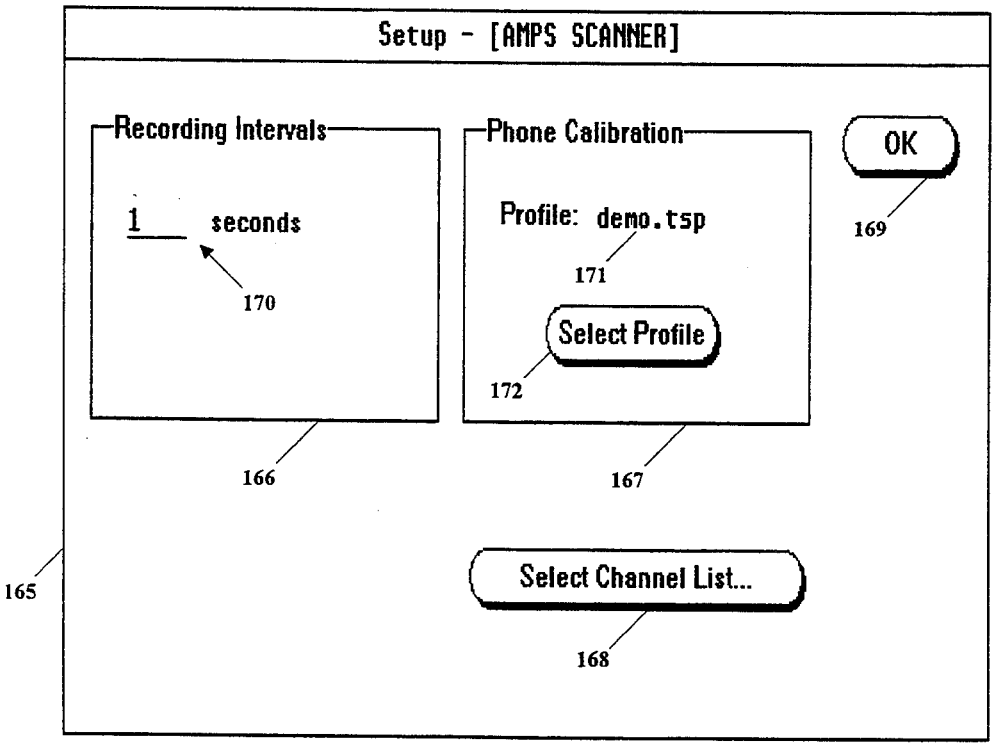
FIG. 21 contains a picture of the Scanner Setup window which is shown on the pen-based computer display after the Device command has been selected from the Configure pull-down menu, allowing the PSSA operator to input the list of channels that the cellular receiver will scan during a coverage survey, select the calibration profile for the cellular receiver that will be used during a coverage survey to translate the relative signal strength measurements reported by the cellular receiver into absolute dBm measurement units, and input the time interval that will be used during a coverage survey between the recordings of the signal strength measurements.

The next step in the coverage survey is to select a calibration profile to be used to translate RSSI units reported by cellular receiver 32 of FIG. 2 into absolute dBm units, define the list of cellular channels that will be scanned, and define how often the signal strengths scanned by cellular receiver 32 will be requested by pen-based computer 3 of FIG. 1. Configure heading 131 is selected causing symbol 302 of FIG. 15A to detect this event and transfer control to symbol 305 which is a connection to symbol 325 of FIG. 15C. Symbol 325 displays the pull-down menu 162 of FIG. 20 associated with the Configure heading 131, which consists of Device command 163 and Display command 164. Symbol 325 of FIG. 15C waits for the selection of an area on the main screen 137 of FIG. 20, and then transfers control to symbol 326 of FIG. 15C which checks for the selection of Device command 163 of FIG. 20. Selecting Device command 163 causes symbol 326 of FIG. 15C to transfer control to symbol 329 which is a connection to symbol 335 of FIG. 15D. Symbol 335 displays Scanner Setup window 165 which is illustrated in FIG. 21 and which contains Recording Interval box 166, Phone Calibration box 167, Select Channel List button 168, and OK button 169. Symbol 335 of FIG. 15D then transfers control to symbol 336 which accepts the entry of a new recording interval 170 of FIG. 21. Recording Interval field 170 is used to define the time interval in seconds between requests for the current signal strengths of the scanned cellular channels. Software execution is then transferred in sequence from symbol 336 of FIG. 15D to symbols 337 to 339 which check for the selection of Select Profile button 172 of FIG. 21, Select Channel List button 168 and OK button 169, respectively, and if none are selected, control is transferred from symbol 339 of FIG. 15D back to symbol 335.

Figure 22:
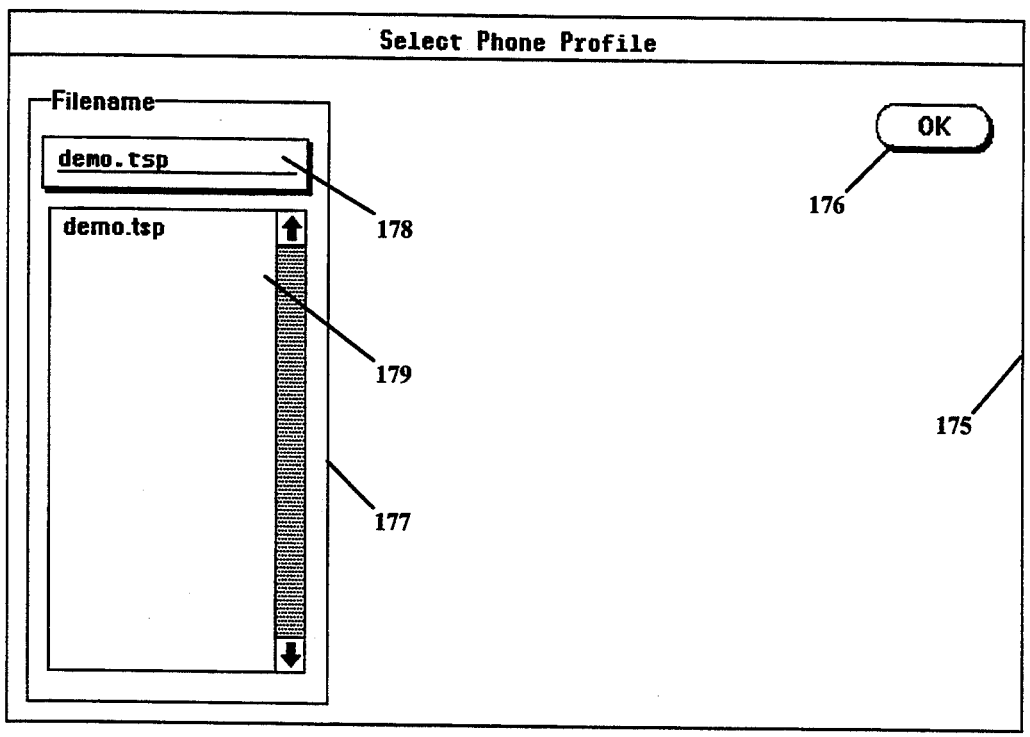
FIG. 22 contains a picture of the Select Profile window which is shown on the pen-based computer display after the Select Profile button has been selected from the Scanner Setup window, allowing the PSSA operator to select the calibration profile for the cellular receiver that will be used during a coverage survey to translate the relative signal strength measurements reported by the cellular receiver into absolute dBm measurement units.

Phone Calibration box 167 of FIG. 21 contains the name of the file 171 containing the calibration profile which is to be used. Selecting Select Profile button 172 of FIG. 21 transfers control from symbol 337 of FIG. 15D to symbol 341 which displays the Select Phone Profile window 175 illustrated in FIG. 22, which contains OK button 176 and Filename box 177 containing existing filename list 179 and selected filename box 178. A filename must be selected to define a calibration profile to use, and existing filename list 179 provides a list of the existing files already on hard disk 86 of FIG. 14 in pen-based computer 3. Symbol 341 of FIG. 15D then transfers control to symbol 347 which accepts a filename. Either one of the filenames in the existing filename list 179 of FIG. 22 may be selected in which case the filename will be transferred to the filename box 178, or a filename may be written into the filename box 178 by the PSSA operator. When the desired filename is correctly shown in filename box 178, OK button 176 is selected which causes software execution to transfer from symbol 347 of FIG. 15D to symbol 335 which displays the Scanner Setup window shown in FIG. 21 containing the filename 171 of the calibration profile that was just selected from the Select Phone Profile window 175 shown in FIG. 22.

Figure 23:
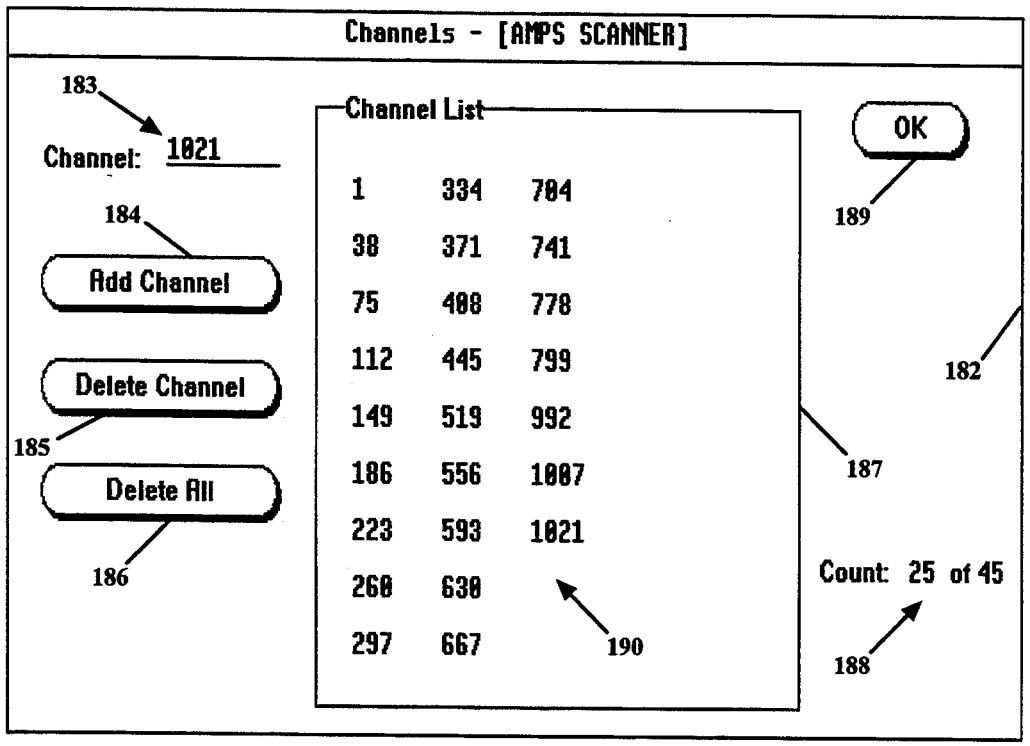
FIG. 23 contains a picture of the Channels window which is shown on the pen-based computer display after the Select Channels button has been selected from the Scanner Setup window, allowing the PSSA operator to specify the cellular communication channels that are to be scanned by the cellular receiver scanning device during a coverage survey.

The next step in the coverage survey is to select the cellular channels that are to be scanned. Selecting Select Channel List button 168 of FIG. 21 causes software execution to transfer from symbol 338 of FIG. 15D to symbol 342 which displays Channels window 182 illustrated in FIG. 23, which contains Channel List box 187 containing the currently-defined list of channels to scan 190, Count field 188 enumerating the quantity of defined scan channels 190, Channel entry field 183 for specifying the channel number to act upon, Add Channel button 184 for adding the channel number contained in Channel field 183 to channel scan list 190, Delete Channel button 185 for deleting the channel number contained in Channel field 183 from channel scan list 190, Delete All button 186 for deleting all the channel numbers in channel scan list 190, and OK button 189 for exiting this window. Symbol 342 of FIG. 15D then allows the entry of a channel number into Channel field 183 and transfers control to symbols 343 to 346 which check for the selection of Add Channel button 184, Delete Channel button 185, and Delete All button 186, respectively, and if none are selected, control is transferred back to symbol 342. Add a new channel to scan list 190 of FIG. 23 by entering the new channel number into Channel field 183, and selecting Add Channel button 184. Software execution goes from symbol 343 of FIG. 15D to symbol 348 which appends the new channel number contained in Channel field 183 of FIG. 23 to the end of scan list 190, and then returns control to symbol 342 of FIG. 15D. Delete a new channel from scan list 190 of FIG. 23 by entering the channel number into Channel field 183, and selecting Delete Channel button 185. Software execution goes from symbol 344 of FIG. 15D to symbol 349 which deletes the channel number contained in Channel field 183 of FIG. 23 from scan list 190, and then returns control to symbol 342 of FIG. 15D. Delete all channels from scan list 190 of FIG. 23 by selecting Delete All button 186. Software execution goes from symbol 345 of FIG. 15D to symbol 350 which deletes all channel numbers from scan list 190, and then returns control to symbol 342 of FIG. 15D. When scan list 190 of FIG. 23 contains the desired channel numbers that are to be scanned, selecting OK button 189 transfers control from symbol 346 of FIG. 15D back to symbol 335 which displays the Scanner Setup window 165 shown in FIG. 21. Selecting OK button 169 is then detected by symbol 339 of FIG. 15D which transfers control to symbol 340 which is a connection to symbol 300 of FIG. 15A, which displays main screen 137 shown in FIG. 16.

Figure 24:
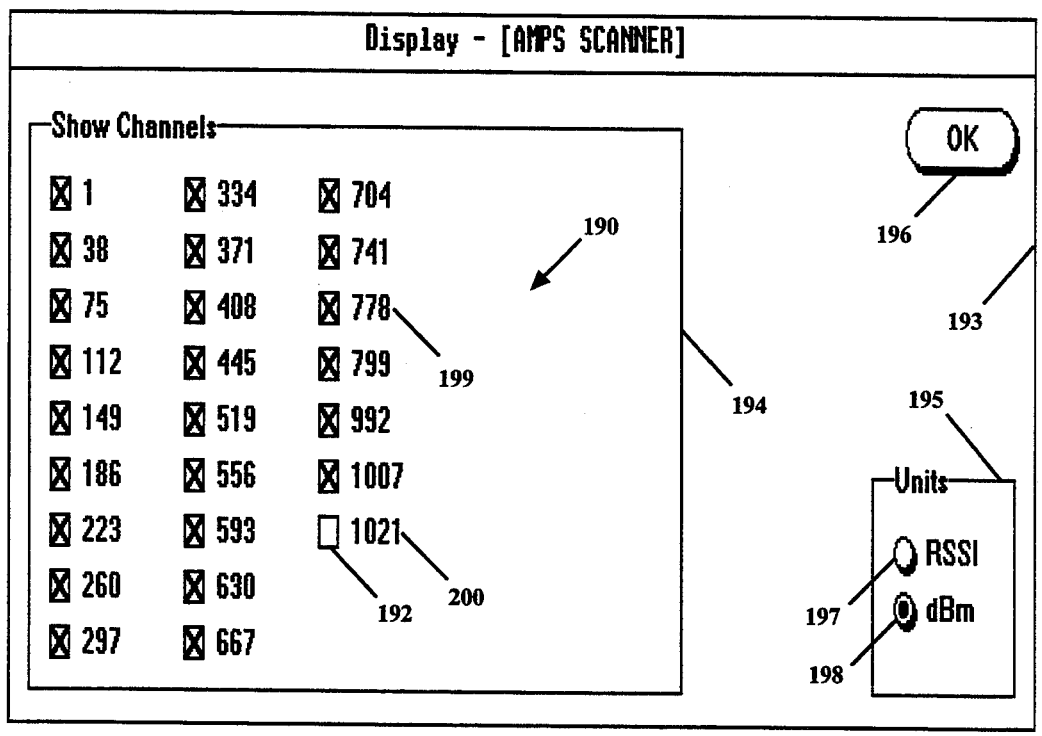
FIG. 24 contains a picture of the Scanner Display window which is shown on the pen-based computer display after the Display command has been selected from the Configure pull-down menu, allowing the PSSA operator to specify which channels will be displayed in the Scanner Signal Strength window from the list of cellular channels that will be scanned by the cellular receiver during a coverage survey.

The next step in a coverage survey is to configure the appearance of Scanner Signal Strength window 136 of FIG. 16. Selecting Configure heading 131 again transfers control from symbol 302 of FIG. 15A through symbol 305 to symbol 325 of FIG. 15C which displays Configure pull-down menu 162 of FIG. 20. Selecting Display command 164 transfers control from symbol 327 of FIG. 15C to symbol 330 which displays the Display Scanner window 193 shown in FIG. 24, which contains Show Channels box 194 containing all of the channel numbers 190 in the defined scan list each with an associated check box 192 that indicates if the signal strength of the associated scanned channel will be displayed in the Scanner Signal Strength window 136 of FIG. 16, Units box 195 of FIG. 24 containing mutually-exclusive selections of RSSI units 197 or dBm units 198 used to display the signal strengths of the scanned channels, and OK button 196. Control is transferred from symbol 330 of FIG. 15C to symbol 331 which waits for a selection in the Display Scanner window 193. If a check box 192 for one of the scanned channel numbers 190 is selected, symbol 331 changes the appearance of the selected check box 192 of FIG. 24 to either empty 200 or filled 199 to correspond to whether or not the signal strength of the channel associated with the selected check box 192 will be displayed whose state of being displayed or not is also toggled. If RSSI units 197 is selected, symbol 331 defines that all signal strengths will be displayed in RSSI units which are reported directly by cellular receiver 32 of FIG. 2. If dBm units 198 is selected, symbol 331 defines that all signal strengths will be displayed in dBm units which represent the translation of the RSSI units reported directly by cellular receiver 32 of FIG. 2 into absolute dBm units using the calibration profile contained in the selected profile filename 171 of FIG. 21. Symbol 331 of FIG. 15C indicates either RSSI units 197 or dBm units 198 as being the selected display units with a filled selection circle as shown in dBm units 198. If neither of the aforementioned selections were made in the Display window 193 of FIG. 24, control is transferred from symbol 331 of FIG. 15C to symbol 332 which checks for the selection of OK button 196 of FIG. 24. If OK button 196 is not selected, control is transferred from symbol 332 of FIG. 15C back to symbol 331. If OK button 196 of FIG. 24 is selected, control is transferred from symbol 332 of FIG. 15C to symbol 328 which is a connection to symbol 300 of FIG. 15 A which displays the main screen.

Figure 25:
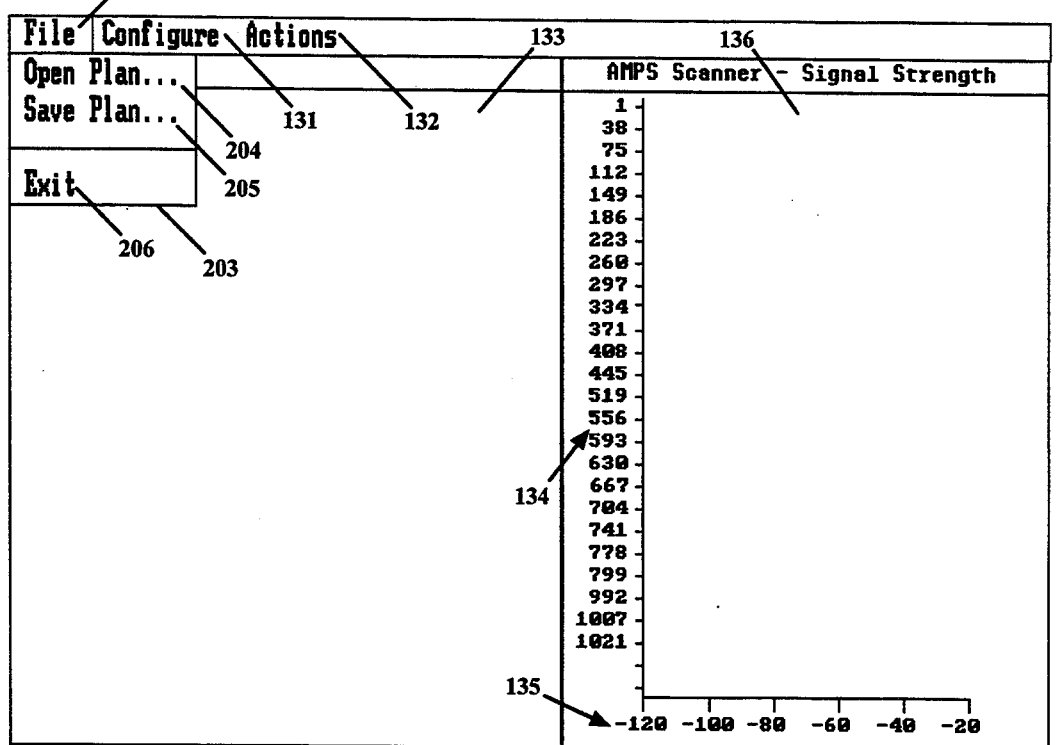
FIG. 25 contains a picture of the main screen which is shown on the pen-based computer display after the File command has been selected from the command bar at the top of the screen, causing the File pull-down menu to appear which allows the PSSA operator to exit from the software and also either load or save a test plan which contains all of the operational modifiable parameters in the PSSA.
Figure 26:
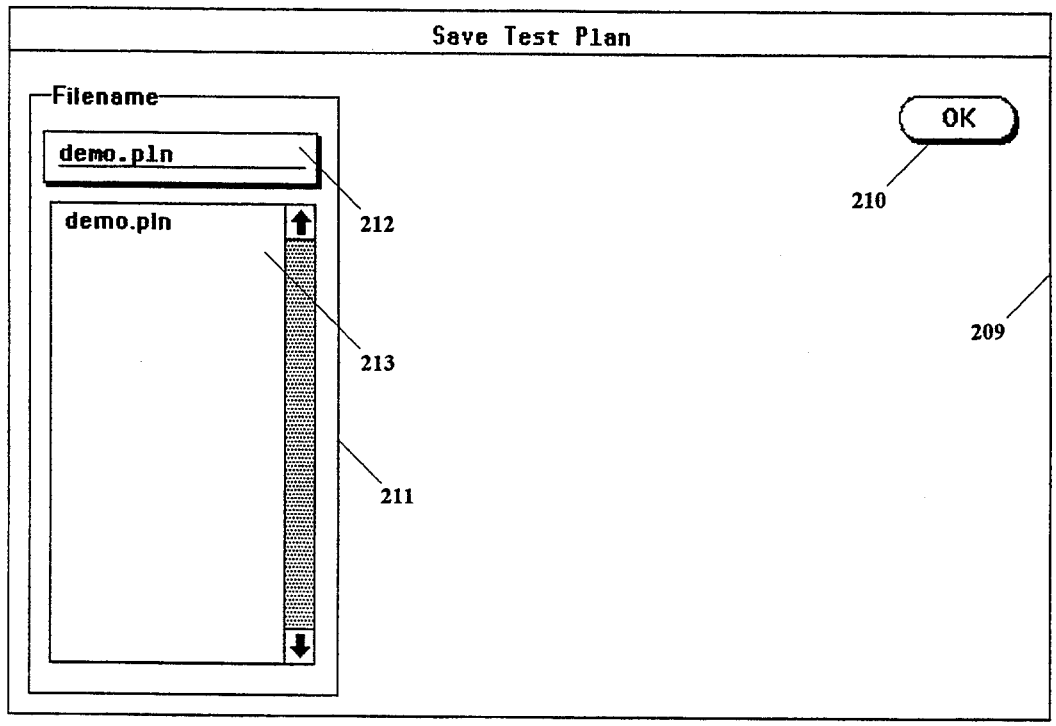
FIG. 26 contains a picture of the Save Test Plan window which is shown on the pen-based computer display after the Save Plan command has been selected from the File pull-down menu, allowing the PSSA operator to save the configuration parameters which are displayed and modifiable in all of the windows in the application software so that certain important sets of parameters can be retrieved later instead of having to be re-input by the PSSA operator.

The next step in the coverage survey is to save the current configuration parameters that have been selected by the PSSA operator so far in a test plan file so that these parameters can be easily restored in the future without having to re-enter all of them. File heading 130 is selected causing symbol 301 of FIG. 15A to detect this event and transfer control to symbol 304 which is a connection to symbol 310 of FIG. 15B. Symbol 310 displays the pull-down menu 203 of FIG. 25 associated with the Files heading 130, which consists of Open Plan command 204, Save Plan command 205, and Exit command 206. Symbol 310 of FIG. 15B waits for the selection of an area on the main screen 137 of FIG. 25, and then transfers control to symbols 311 to 313 of FIG. 15C which check for the selection of Open Plan command 204 of FIG. 25, Save Plan command 205, and Exit command 206, respectively, and if neither of the three aforementioned commands in File pull-down menu 203 are selected, control is transferred to symbol 314 of FIG. 15B which is a connection to symbol 300 of FIG. 15A. Selecting Save Plan command 205 causes symbol 312 of FIG. 15B to transfer control to symbol 316 which displays Save Test Plan window 209 shown in FIG. 26 which contains OK button 210 and Filename box 211 containing existing filename list 213 and selected filename box 212. A filename must be selected to specify a file to use for the storage of the test plan containing the system configuration parameters, and existing filename list 213 provides a list of the existing files already on hard disk 86 of FIG. 14 in pen-based computer 3. Symbol 316 of FIG. 15B then transfers control to symbol 319 which accepts a filename. Either one of the filenames in the existing filename list 213 of FIG. 26 may be selected in which case the filename will be transferred to the filename box 212, or a filename may be written into the filename box 212 by the PSSA operator. When the desired filename is correctly shown in filename box 212, OK button 210 is selected which causes software execution to transfer from symbol 319 of FIG. 15B to symbol 314 which is a connection to symbol 300 of FIG. 15A which displays the main screen 137 of FIG. 16.

Figure 27:
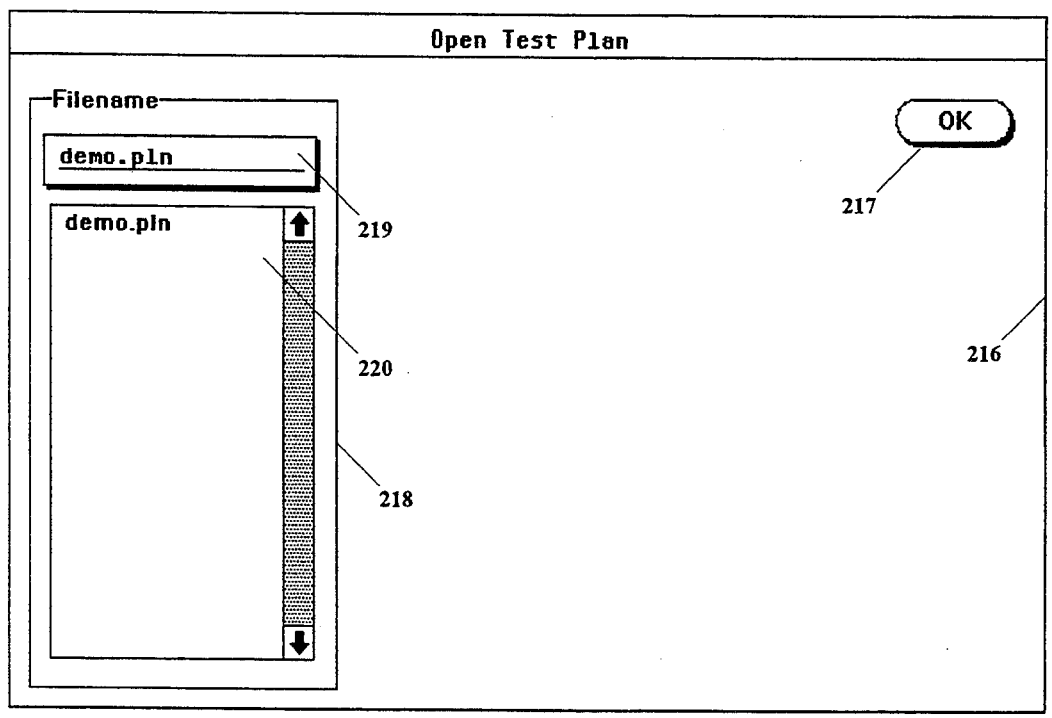
FIG. 27 contains a picture of the Open Test Plan window which is shown on the pen-based computer display after the Open Plan command has been selected from the File pull-down menu, allowing the PSSA operator to retrieve a complete set of configuration parameters that will be subsequently used in all of the windows in the application software, instead of having to re-input all of the parameters into each window.

If a test plan is already available on hard disk 86 of FIG. 14 in pen-based computer 3, then the configuration parameters in the test plan file may be restored for use. Selecting Open Plan command 204 of FIG. 25 causes symbol 311 of FIG. 15B to transfer control to symbol 315 which displays Open Test Plan window 216 shown in FIG. 27 which contains OK button 217 and Filename box 218 containing existing filename list 220 and selected filename box 219. A filename must be selected to specify a file to use for the restoration of the test plan containing the system configuration parameters, and existing filename list 220 provides a list of the existing files already on hard disk 86 of FIG. 14 in pen-based computer 3. Symbol 315 of FIG. 15B then transfers control to symbol 318 which accepts a filename. Either one of the filenames in the existing filename list 220 of FIG. 27 may be selected in which case the filename will be transferred to the filename box 219, or a filename may be written into the filename box 219 by the PSSA operator. When the desired filename is correctly shown in filename box 219, 0K button 217 is selected which causes software execution to transfer from symbol 318 of FIG. 15B to symbol 314 which is a connection to symbol 300 of FIG. 15 A which displays the main screen 137 of FIG. 16.

To start a test coverage survey using the PSSA with laser rangefinder 4 of FIG. 1, Actions heading 32 of FIG. 16 must be selected. Symbol 303 of FIG. 15A will detect that Actions heading 132 has been selected and software execution will go from symbol 303 to symbol 306 which is a connection to symbol 355 of FIG. 15E. Symbol 355 of FIG. 15E will display pull-down menu 138 of FIG. 17 associated with Actions heading 132, and then wait for pen 9 of FIG. 14 to select an area of the screen 137 of FIG. 17. Selecting Start Test command 139 will cause software execution to transfer from symbol 361 of FIG. 15E to symbol 367 which is a connection to symbol 385 of FIG. 15G which displays Start Test window 223 shown in FIG. 28 which consists of Collection File box 225 containing File Name field 227 and Title field 228, Starting Location box 226 containing Floor Number field 229, Latitude field 230, Longitude field 231, and Description field 232, and OK button 224. Software execution transfers from symbol 385 of FIG. 15G to symbol 386 which accepts the entry of each of the aforementioned fields in Start Test window 223 of FIG. 28. Collection File box 225 contains fields that allow the PSSA operator to input parameters relating to the data file that will be used to store all of the geographically-positioned signal strength data, namely, File Name field 227 which is used to input the name of the data file that will be used to store all of the geographically-positioned signal strength data, and Title field 228 which is used to input a descriptive title for the coverage survey. Starting Location box 226 contains fields that allow the PSSA operator to input parameters relating to the known starting location of the coverage survey, namely, Floor Number field 229 which is used to input the number of the floor of-the building on which the coverage survey will be conducted, Latitude field 230 which is used to input the latitude of the starting location, Longitude field 231 which is used to input the longitude of the starting location, and Description field 232 which is used to input additional information relating to the starting location, such as the starting location's locality to an object in the building.

Figure 15G:
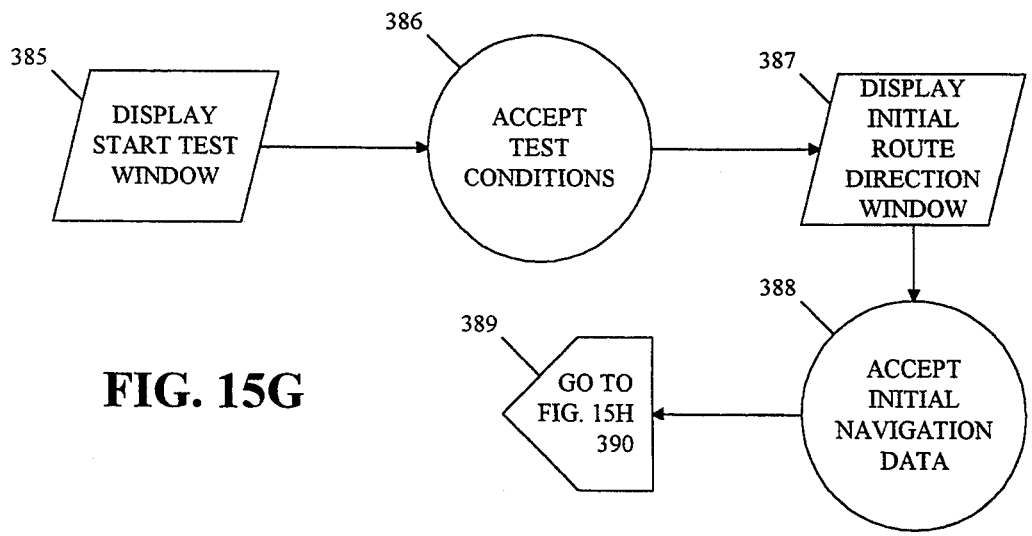
Figure 30:
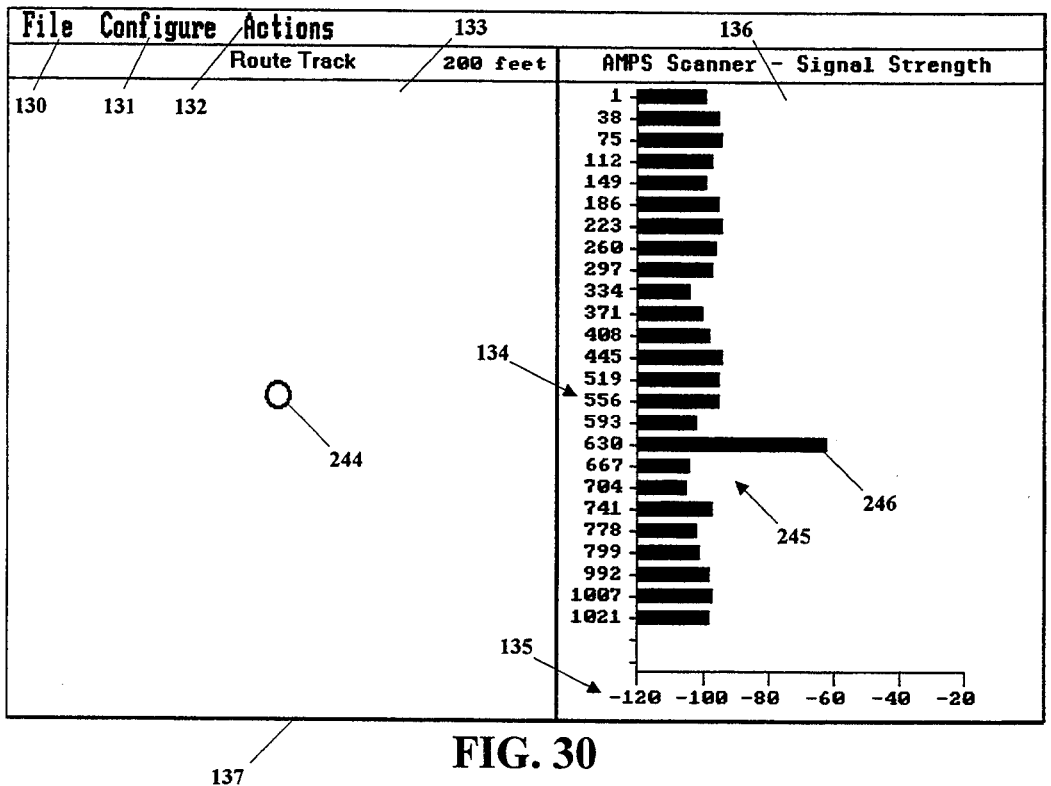
FIG. 30 contains a picture of the main screen which is shown on the pen-based computer display after the OK button in the Initial Route Direction window had been selected which caused the cellular receiver to begin continuously scanning the cellular communication channels while the PSSA operator started walking at a constant speed in a straight line, illustrating the most-current signal strengths as horizontal lines for each of the cellular communication channels which are being scanned.

After the aforementioned fields in Start Test window 223 are entered by the PSSA operator, selecting OK button 224 transfers software execution from symbol 386 of FIG. 15G to symbol 387 which displays Initial Route Direction window 235 shown in FIG. 29, which consists of Bearing box 238 containing compass rose 240 which is used to input the starting direction in radial increments of 45 degrees and bearing entry field 241 which is alternatively used to input the starting direction with a finer resolution of 1 degree units, Distance box 237 containing distance entry field 239 which is used to input the distance to a distant object in the direction of travel, and OK button 236. Software execution transfers from symbol 387 of FIG. 15G to symbol 388 which accepts input from laser rangefinder 4 of FIG. 1 and displays the received bearing and range in bearing entry field 241 and distance entry field 239, respectively. Referring to FIG. 8 concerning the method to navigate during a coverage survey using laser rangefinder 4 of FIG. 1, the PSSA operator stands at the known starting location L1 defined by Starting Location box 226 of FIG. 28 facing the direction of travel, points laser rangefinder 4 of FIG. 1 at an object P1 of FIG. 8 in the distance, and then pulls and releases trigger 12 of FIG. 1 which causes laser rangefinder 4 to transmit a message containing the measured bearing and range data to backpack system 2 which forwards the message to pen-based-computer 2 symbol 388 of FIG. 15G which displays the measured bearing data in bearing field 241 of FIG. 29 and measured range data in Distance field 239. OK button 236 is then selected to transfer software execution from symbol 388 of FIG. 15G to symbol 389 which is a connection to symbol 390 of FIG. 15H which displays the main screen 137 shown in FIG. 30 with current PSSA operator location 244 illustrated in the center of Route Track window 133.

The PSSA operator then begins to walk at a constant speed in the measured direction.

Figure 15H:
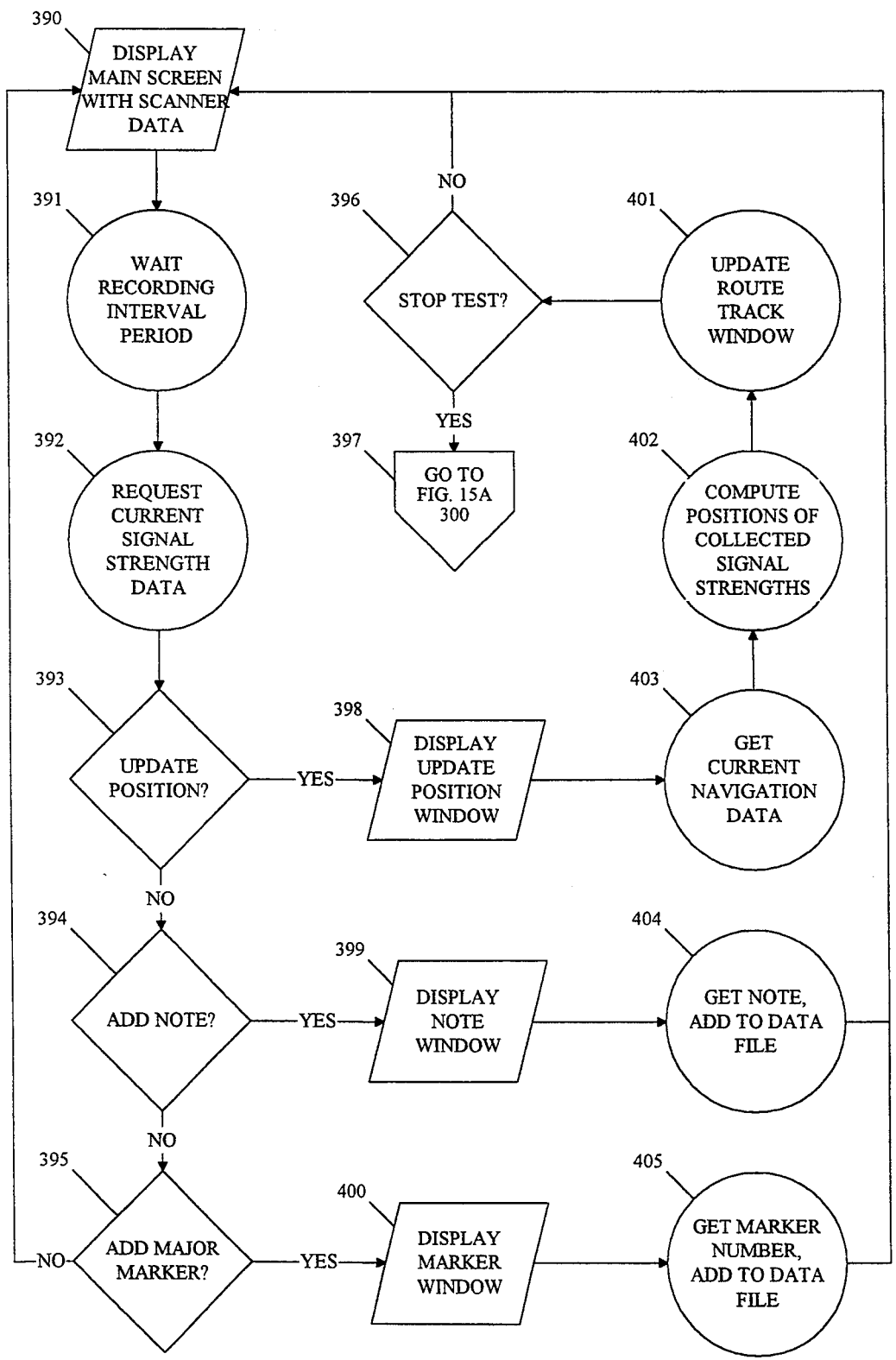

Control transfers from symbol 390 of FIG. 15H to symbol 391 which waits until the time period defined by Recording Interval 170 of FIG. 21 expires, at which time control will be transferred from symbol 391 of FIG. 15H to symbol 392. Symbol 392 sends a message to backpack system 2 of FIG. 2 requesting the most current signal strengths of the channels that are being scanned 190 of FIG. 23 by cellular receiver 32 of FIG. 2, and then receives a message from backpack system 2 of FIG. 2 containing the most current signal strengths of the scanned channels. Symbol 392 of FIG. 15H saves the measured signal strengths until they can be geographically-located in retrospect at the next location L2 of FIG. 8. Software execution continues through symbols 393 of FIG. 15H, 394, and 395 which check for the selection of Actions pull-down menu 138 of FIG. 17 Update Position command 140, Note command 141, and Marker command 142, respectively, and if neither of these commands were selected, software execution transfers back to symbol 390 of FIG. 15H. Due to the receipt of scanned channel signal strengths, symbol 390 now displays the signal strengths 245 of FIG. 30 in Scanner Signal Strength window 136 by plotting the measured signal strength associated with each scanned cellular channel listed along the y-axis 134 along the x-axis 135 in the display units selected from Units box 195 of FIG. 24. If dBm units 198 are selected, the measured RSSI signal strengths are first converted to dBm units using the calibration profile contained in the file named in field Profile 171 of FIG. 21 before being displayed. The signal strength measurement, storage and display process involving the cyclic execution of software represented by symbols 390 to 395 of FIG. 15H continues until the PSSA operator reaches the current destination location L2 of FIG. 8.

Figure 31:
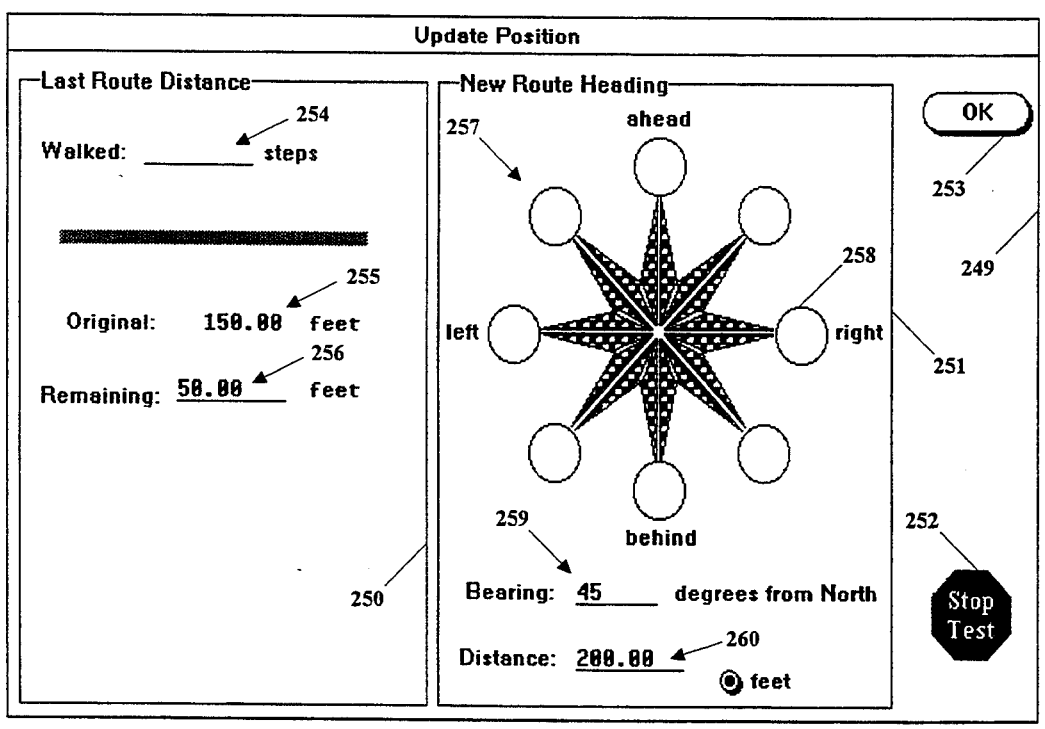
FIG. 31 contains a picture of the Update Position window which is shown on the pen-based computer display after the Update command was selected for the first time during a survey from the pull-down menu associated with the Actions command, and which is used in the dead-reckoning navigation algorithm using the laser rangefinder at the end of the first traveled straight-line segment to determine the new location of the PSSA operator, to geographically-position all of the signal strengths that were collected during the last straight-line segment traveled, and to input the new direction of travel and distance to a distant object in the direction of travel.

Upon arriving at destination location L2, the PSSA operator stops walking and selects Actions heading 132 of FIG. 17 followed by Update Position command 140, which is detected by symbol 393 of FIG. 15H which transfers control to symbol 398 which displays Update Position window 249 shown in FIG. 31. Update Position window 249 consists of Last Route Distance box 250 containing Walked field 254 which is used during paced navigation, Original distance field 255 which shows the distance that was measured from the beginning of the segment at location L1 of FIG. 8 to distant point P1, and Remaining distance field 256 of FIG. 31 which is initially blank but will show the distance from the current location L2 of FIG. 8 to not-as-distant point P1, New Route Heading box 251 of FIG. 31 containing compass rose 257 which is used during paced navigation, new Bearing field 259 which is initially blank but will contain the bearing of the next segment that will be traveled to location L3 of FIG. 8, and Distance field 260 which is also initially blank but will contain the distance along the next segment to another distant point. Software execution transfers from symbol 398 of FIG. 15H to symbol 403, where two new sets of bearing and range measurements are made. The PSSA operator stands at the new location L2 of FIG. 8 facing the same direction of travel B1, points laser rangefinder 4 of FIG. 1 at the same object P1 of FIG. 8, and then pulls and releases trigger 12 of FIG. 1 which causes laser rangefinder 4 to transmit a message containing the measured bearing and range data to backpack system 2 which forwards the message to pen-based-computer 2 symbol 403 of FIG. 15H which displays the measured range data in Remaining distance field 256. The PSSA operator then turns facing the new destination L3 of FIG. 8, points laser rangefinder 4 of FIG. 1 at a distant object in the new direction of travel, and then pulls and releases trigger 12 of FIG. 1 which causes laser rangefinder 4 to transmit a message containing the measured bearing and range data to backpack system 2 which forwards the message to pen-based computer 2 symbol 403 of. FIG. 15H which displays the measured bearing data in Bearing field 259 and measured range data in Distance field 260.

Figure 32:
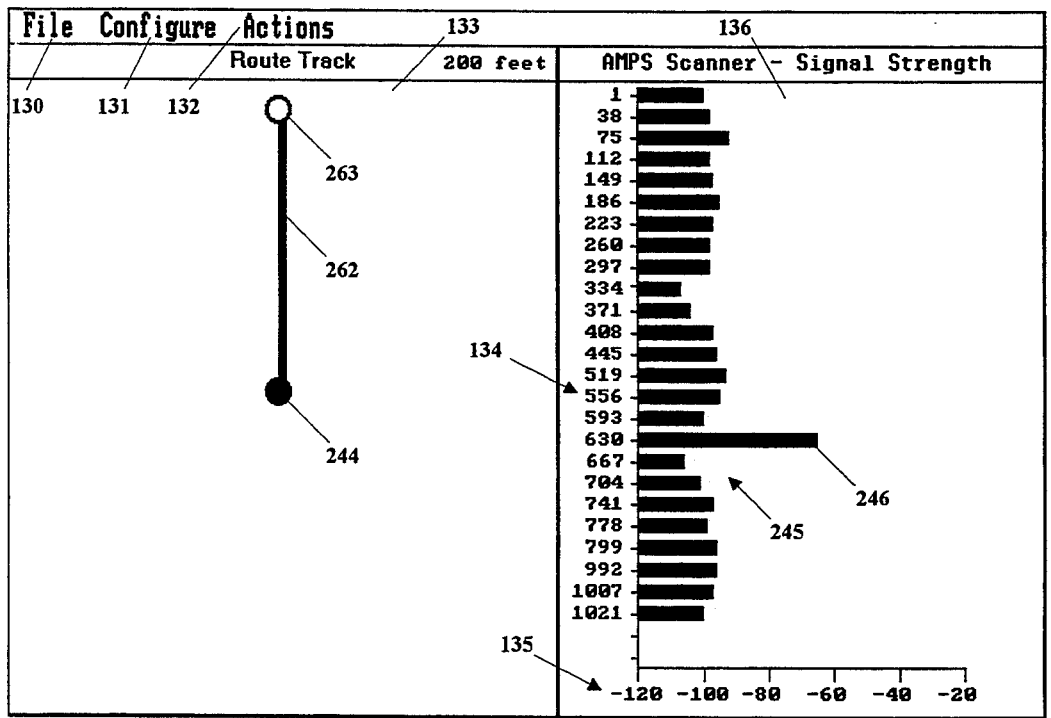
FIG. 32 contains a picture of the main screen which is shown on the pen-based computer display after the OK button in the Update Position window has been selected, showing in the Route Track window on the left half of the screen the first straight line segment that was traveled by the PSSA operator and also dynamically showing in the Signal Strength Scanner window on the right half of the screen the most-current signal strengths of all of the cellular channels being scanned.

Software execution then transfers from symbol 403 of FIG. 15H to symbol 402 which calculates the geographic positions of all of the signal strength measurements that were taken during the last segment of travel S1 of FIG. 8, and stores all of the geographically-located signal strength measurements in the data file specified by File field 227 of FIG. 28. Distance D3 of the segment is calculated as the difference between range measurement D1 taken at location L1 and range measurement D2 taken at current location L2, and using measured bearing B1, the geographic position of current location L2 is calculated. Since signal strength measurements were taken on segment S1 at constant Recording Interval 170 of FIG. 21, the distance between measured signal strengths is also a constant. Control is then transferred from symbol 402 of FIG. 15H to symbol 401 which graphically displays the last segment traveled S1 of FIG. 8 on Route Track window 133 of FIG. 32 which is currently hidden under Update Position window 249 of FIG. 31, and then control is transferred to symbol 396 of FIG. 15H which checks for the selection of STOP button 252 of FIG. 31. Selecting OK button 253 transfers control from symbol 396 of FIG. 15H to symbol 390 which displays the main screen shown in FIG. 32 with newly-added segment 262 and current location 263 in Route Track window 133.

Figure 33:
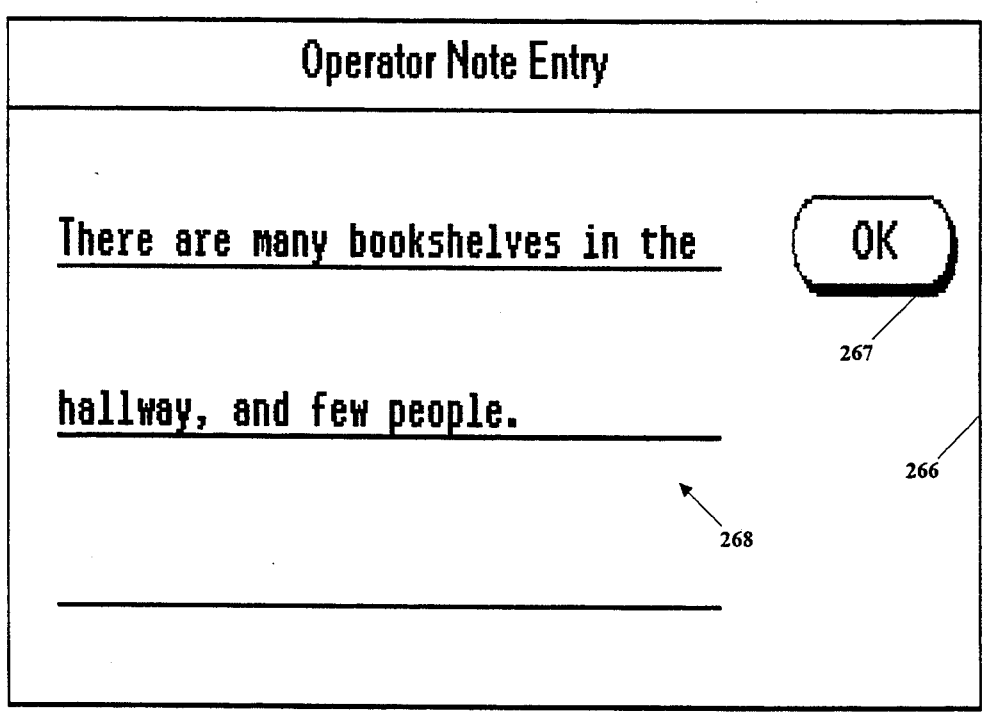

A textual note may be added to the data file specified in File field 227 of FIG. 28 by selecting Actions heading 132 of FIG. 17 followed by Note command 141, which is detected by symbol 394 of FIG. 15H which transfers control to symbol 399 which displays Operator Note Entry window 266 shown in FIG. 33. Operator Note Entry window 266 consists of notepad area 268 and OK button 267. Control is transferred from symbol 399 of FIG. 15H to symbol 404 which allows the PSSA operator to write text in notepad area 268 of FIG. 33. Selecting OK button 267 causes symbol 404 of FIG. 15H to store the text contained in notepad area 268 into the data file specified by File field 227 of FIG. 28, and then transfer control back to symbol 390 of FIG. 15H.

Figure 34:
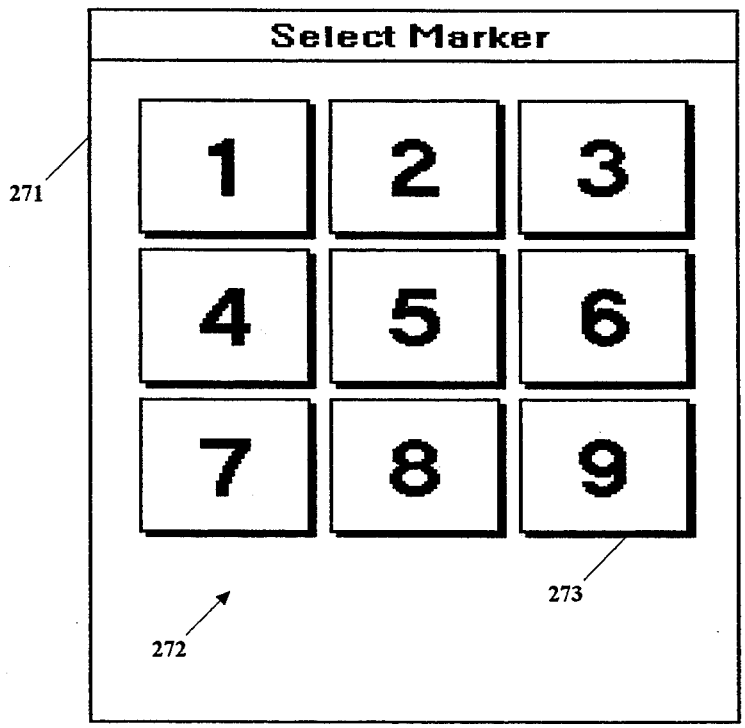
FIG. 34 contains a picture of the Select Marker window which is shown on the pen-based computer display during a coverage survey after the Marker command was selected from the pull-down menu associated with the Actions command, allowing the PSSA operator to input a numerical marker into the data file that is being used to record all of the geographically-positioned signal strengths to provide additional information concerning the environment or conditions at the time of the coverage survey.

A numeric note may be also added to the data file specified in File field 227 of FIG. 28 by selecting Actions heading 132 of FIG. 17 followed by Marker command 142, which is detected by symbol 395 of FIG. 15H which transfers control to symbol 400 which displays Select Marker window 271 shown in FIG. 34. Select Marker window 271 consists of numeric buttons 272 labeled 1 to 9, which are each typically defined to represent a common event or condition which is encountered during the coverage survey. Control is transferred from symbol 400 of FIG. 15H to symbol 405 which allows the PSSA operator to select one of the numeric buttons 272 which then causes symbol 405 of FIG. 15H to store the selected numeric marker into the data file specified by File field 227 of FIG. 28, and then transfer control back to symbol 390 of FIG. 15H.

Figure 35:
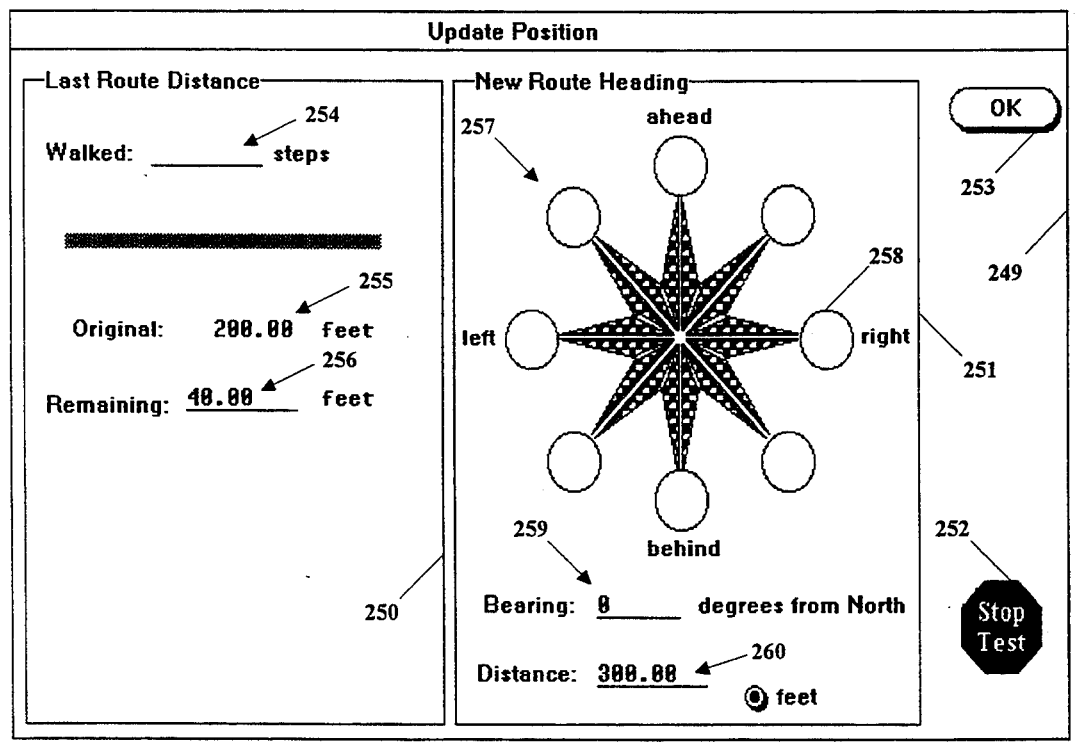
FIG. 35 contains a picture of the Update Position window which is shown on the pen-based computer display after the Update command was selected for the second time during a survey from the pull-down menu associated with the Actions command, and which is used in the dead-reckoning navigation algorithm using the laser rangefinder at the end of the second traveled straight-line segment to determine the new location of the PSSA operator, to geographically-position all of the signal strengths that were collected during the last straight-line segment traveled, and to input the new direction of travel and distance to a distant object in the direction of travel.

Upon arriving at destination location L3, the PSSA operator stops walking and selects Actions heading 132 of FIG. 17 followed by Update Position command 140, which is detected by symbol 393 of FIG. 15H which transfers control to symbol 398 which displays Update Position window 249 shown in FIG. 35. Update Position window 249 consists of Last Route Distance box 250 containing Walked field 254 which is used during paced navigation, Original distance field 255 which shows the distance that was measured from the beginning of the segment at location L2 of FIG. 8, and Remaining distance field 256 of FIG. 35 which is initially blank but will show the distance from the current location L3 of FIG. 8 to the point measured from location L2, New Route Heading box 251 of FIG. 35 containing compass rose 257 which is used during paced navigation, new Bearing field 259 which is initially blank, and Distance field 260 which is also initially blank. Software execution transfers from symbol 398 of FIG. 15H to symbol 403, where one new set of bearing and range measurements are made. The PSSA operator stands at the new location L3 of FIG. 8 facing the same direction of travel, points laser rangefinder 4 of FIG. 1 at the same object pointed to at the start of the walk from L2 to L3 of FIG. 8, and then pulls and releases trigger 12 of FIG. 1 which causes laser rangefinder 4 to transmit a message containing the measured bearing and range data to backpack system 2 which forwards the message to pen-based-computer 2 symbol 403 of FIG. 15H which displays the measured range data in Remaining distance field 256.

Figure 36:
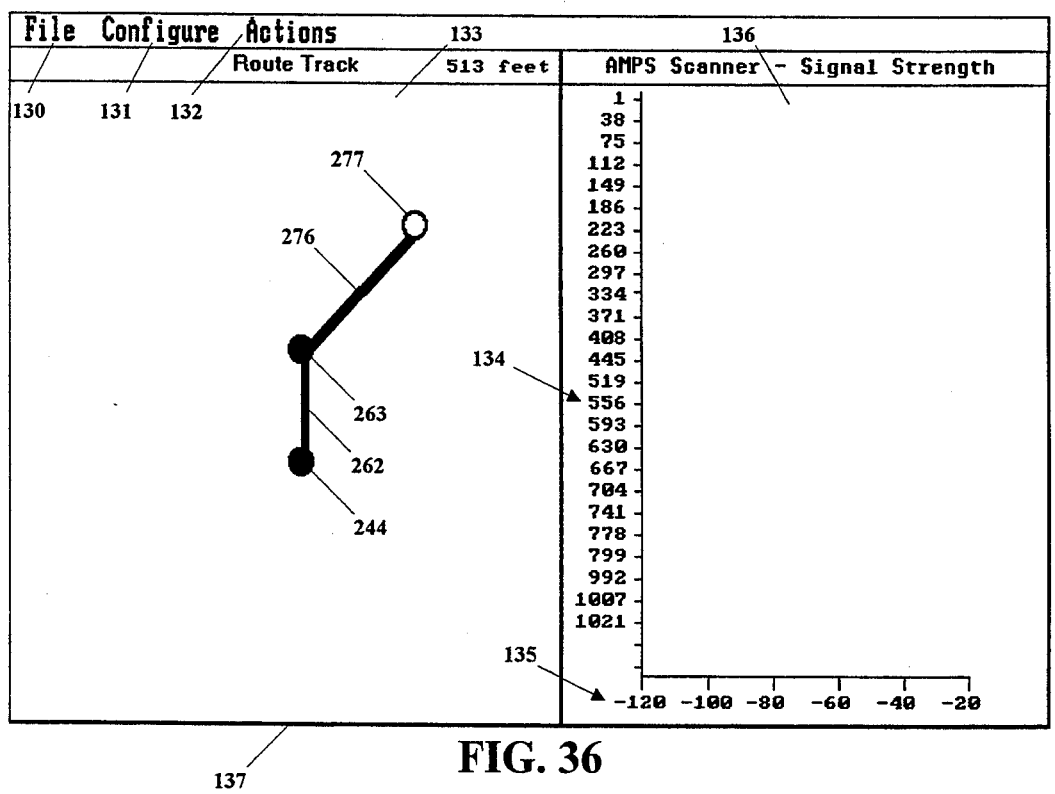
FIG. 36 contains a picture of the main screen which is shown on the pen-based computer display after the STOP button in the Update Position window has been selected, instructing the PSSA to stop scanning the cellular channels and geographically-position the signal strengths measured during the second straight-line segment traveled, and showing in the Route Track window on the left half of the screen the newly-computed second straight line segment that was traveled by the PSSA operator.

Software execution then transfers from symbol 403 of FIG. 15H to symbol 402 which calculates the geographic positions of all of the signal strength measurements that were taken during the last segment of travel from location L2 of FIG. 8 to location L3, and stores all of the geographically-located signal strength measurements in the data file specified by File field 227 of FIG. 28. Distance of the segment is calculated as in the previous segment S1 of FIG. 8. Control is then transferred from symbol 402 of FIG. 15H to symbol 401 which graphically displays the last segment traveled 276 on Route Track window 133 of FIG. 36 which is currently hidden under Update Position window 249 of FIG. 35, and then control is transferred to symbol 396 of FIG. 15H which checks for the selection of STOP button 252 of FIG. 35. Selecting STOP button 252 stops the coverage survey and transfers control from symbol 396 of FIG. 15H to symbol 397 which is a connection to symbol 300 of FIG. 15A.

Figure 37:
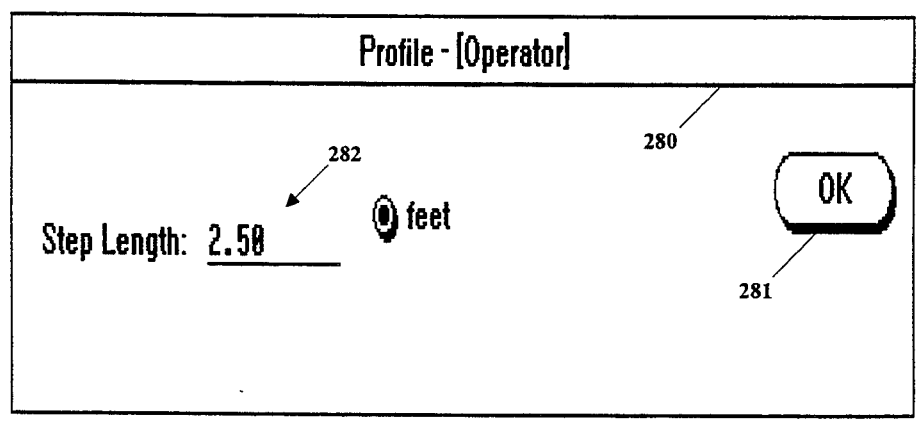
FIG. 37 contains a picture of the Profile Operator window which is shown on the pen-based computer display after the Profile Operator command was selected from the pull-down menu associated with the Actions command, which allows the step length of the PSSA operator to be defined, and which is used as a constant parameter in the paced mode of the dead-reckoning navigation algorithm when not using the laser rangefinder to calculate the distance traveled by the PSSA operator in a straight line segment by multiplying the constant step length by the number of paces walked to aid in the determination of the new location of the PSSA operator.

To start a test coverage survey using the PSSA in the paced mode of dead-reckoning navigation without utilizing laser rangefinder 4 of FIG. 1, the step length of the PSSA operator must first be input. Select Actions heading 132 of FIG. 16 and symbol 303 of FIG. 15A will detect that Actions heading 132 has been selected and software execution will go from symbol 303 to symbol 306 which is a connection to symbol 355 of FIG. 15E. Symbol 355 of FIG. 15E will display pull-down menu 138 of FIG. 17 associated with Actions heading 132, and then wait for pen 9 of FIG. 14 to select an area of the screen 137 of FIG. 17. Selecting Profile Operator command 144 will cause software execution to transfer from symbol 358 of FIG. 15E to symbol 364 which displays Profile Operator window 280 shown in FIG. 37 which consists of Step Length input field 282 and OK button 281. Software execution transfers from symbol 364 of FIG. 15E to symbol 370 which allows the input of the PSSA operator step length into Step Length input field 282 of FIG. 37. Selecting OK button transfers control from symbol 370 of FIG. 15E to symbol 371 which is a connection to symbol 300 of FIG. 15A.

To start the coverage survey using the paced mode of dead-reckoning navigation, select Actions heading 132 of FIG. 16 and symbol 303 of FIG. 15A will detect that Actions heading 132 has been selected and software execution will go from symbol 303 to symbol 306 which is a connection to symbol 355 of FIG. 15E. Symbol 355 of FIG. 15E will display pull-down menu 138 of FIG. 17 associated with Actions heading 132, and then wait for pen 9 of FIG. 14 to select an area of the screen 137 of FIG. 17. Selecting Start Test command 139 will cause software execution to transfer from symbol 361 of FIG. 15E to symbol 367 which is a connection to symbol 385 of FIG. 15G which displays Start Test window 223 shown in FIG. 38 which consists of Collection File box 225 containing File Name field 227 and Title field 228, Starting Location box 226 containing Floor Number field 229, Latitude field 230, Longitude field 231, and Description field 232, and OK button 224. Software execution transfers from symbol 385 of FIG. 15G to symbol 386 which accepts the entry of each of the aforementioned fields in Start Test window 223 of FIG. 38. Collection File box 225 contains fields that allow the PSSA operator to input parameters relating to the data file that will be used to store all of the geographically-positioned signal strength data, namely, File Name field 227 which is used to input the name of the data file that will be used to store all of the geographically-positioned signal strength data, and Title field 228 which is used to input a descriptive title for the coverage survey. Starting Location box 226 contains fields that allow the PSSA operator to input parameters relating to the known starting location of the coverage survey, namely, Floor Number field 229 which is used to input the number of the floor of the building on which the coverage survey will be conducted, Latitude field 230 which is used to input the latitude of the starting location, Longitude field 231 which is used to input the longitude of the starting location, and Description field 232 which is used to input additional information relating to the starting location, such as the starting location's locality to an object in the building.

After the aforementioned fields in Start Test window 223 are entered by the PSSA operator, selecting OK button 224 transfers software execution from symbol 386 of FIG. 15G to symbol 387 which displays Initial Route Direction window 235 shown in FIG. 39, which consists of Bearing box 238 containing compass rose 240 which is used to input the starting direction in radial increments of 45 degrees and bearing entry field 241 which is alternatively used to input the starting direction with a finer resolution of 1 degree units, Distance box 237 containing distance entry field 239 which is only used with laser rangefinder 4 of FIG. 1 to input the distance to a distant object in the direction of travel, and OK button 236. Software execution transfers from symbol 387 of FIG. 15G to symbol 388 which accepts input from the PSSA operator in initial bearing field 241. Referring to FIG. 9 concerning the method to navigate during a coverage survey using paced mode of navigation, the PSSA operator stands at the known starting location L1 defined by Starting Location box 226 of FIG. 38 and selects OK button 236 to transfer software execution from symbol 388 of FIG. 15G to symbol 389 which is a connection to symbol 390 of FIG. 15H which displays the main screen 137 shown in FIG. 30 with current PSSA operator location 244 illustrated in the center of Route Track window 133. The PSSA operator then begins to walk at a constant speed in the direction input by the PSSA operator in initial bearing field 241 of FIG. 39.

Control transfers from symbol 390 of FIG. 15H to symbol 391 which waits until the time period defined by Recording Interval 170 of FIG. 21 expires, at which time control will be transferred from symbol 391 of FIG. 15H to symbol 392. Symbol 392 sends a message to backpack system 2 of FIG. 2 requesting the most current signal strengths of the channels that are being scanned 190 of FIG. 23 by cellular receiver 32 of FIG. 2, and then receives a message from backpack system 2 of FIG. 2 containing the most current signal strengths of the scanned channels. Symbol 392 of FIG. 15H saves the measured signal strengths until they can be geographically-located in retrospect at the next location L2 of FIG. 8. Software execution continues through symbols 393 of FIG. 15H, 394, and 395 which check for the selection of Actions pull-down menu 138 of FIG. 17 Update Position command 140, Note command 141, and Marker command 142, respectively, and if neither of these commands were selected, software execution transfers back to symbol 390 of FIG. 15H. Due to the receipt of scanned channel signal strengths, symbol 390 now displays the signal strengths 245 of FIG. 30 in Scanner Signal Strength window 136 by plotting the measured signal strength associated with each scanned cellular channel listed along the y-axis 134 along the x-axis 135 in the display units selected from Units box 195 of FIG. 24. If dBm units 198 are selected, the measured RSSI signal strengths are first converted to dBm units using the calibration profile contained in the file named in field Profile 171 of FIG. 21 before being displayed. The signal strength measurement, storage and display process involving the cyclic execution of software represented by symbols 390 to 395 of FIG. 15H continues until the PSSA operator reaches the current destination location L2 of FIG. 9.

Figure 40:
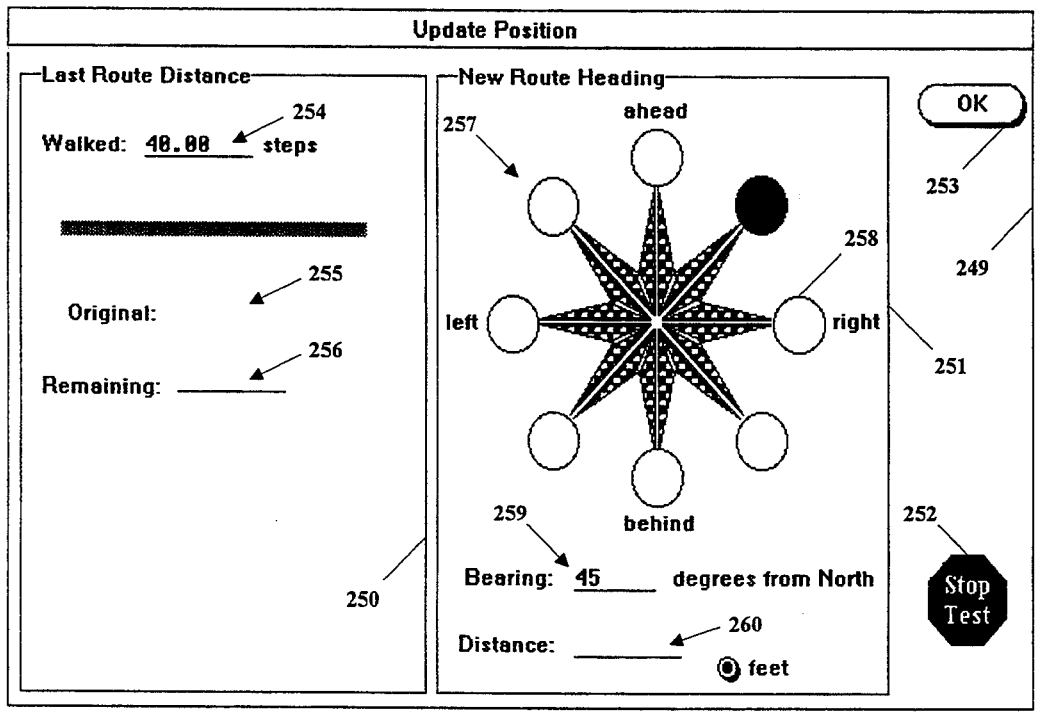
FIG. 40 contains a picture of the Update Position window which is shown on the pen-based computer display after the Update command was selected for the first time from the pull-down menu associated with the Actions command during a survey using the paced mode of dead-reckoning navigation (without the laser rangefinder), which is used in the dead-reckoning navigation algorithm at the end of the first traveled straight-line segment to enter the number of paces walked, shown to be 40 steps, to determine the distance traveled in the segment to calculate the new location of the PSSA operator and also to enter the new direction of travel, shown to be a soft right turn which is at a bearing of 45 degrees.

Upon arriving at destination location L2, the PSSA operator stops walking and selects Actions heading 132 of FIG. 17 followed by Update Position command 140, which is detected by symbol 393 of FIG. 15H which transfers control to symbol 398 which displays Update Position window 249 shown in FIG. 40. Update Position window 249 consists of Last Route Distance box 250 containing Walked field 254 which is used to input the number of paces walked during the last segment, Original distance field 255 used with the laser rangefinder, and Remaining distance field 256 also used with the laser rangefinder, New Route Heading box 251 of FIG. 31 containing compass rose 257 which is used to input the new direction of travel with a resolution of 45 degrees, new Bearing field 259 which is initially blank but could be used to input the bearing of the next segment that will be traveled to location L3 of FIG. 9, and Distance field 260 which is also initially blank and pertains to use with the laser rangefinder 4 of FIG. 1. Software execution transfers from symbol 398 of FIG. 15H to symbol 403, where the number of paces walked is entered. The PSSA operator stands at the new location L2 of FIG. 9 and inputs the number of paces N1 that were walked on the segment from L1 to L2 into Walked field 254 of FIG. 40.

Software execution then transfers from symbol 403 of FIG. 15H to symbol 402 which calculates the geographic positions of all of the signal strength measurements that were taken during the last segment of travel S1 of FIG. 9, and stores all of the geographically-located signal strength measurements in the data file specified by File field 227 of FIG. 28. Distance D3 of the segment is calculated as the number of paces walked N1 multiplied by the step length of the PSSA operator which was input into Step Length field 282 of FIG. 37, and using measured bearing B1, the geographic position of current location L2 is calculated. Since signal strength measurements were taken on segment S1 at constant Recording Interval 170 of FIG. 21, the distance between measured signal strengths is also a constant. Control is then transferred From symbol 402 of FIG. 15H to symbol 401 which graphically displays the last segment traveled S1 of FIG. 8 on Route Track window 133 of FIG. 32 which is currently hidden under Update Position window 249 of FIG. 40, and then control is transferred to symbol 396 of FIG. 15H which checks for the selection of STOP button 252 of FIG. 40. Selecting OK button 253 transfers control from symbol 396 of FIG. 15H to symbol 390 which displays the main screen shown in FIG. 32 with newly-added segment 262 and current location 263 in Route Track window 133.

Figure 41:
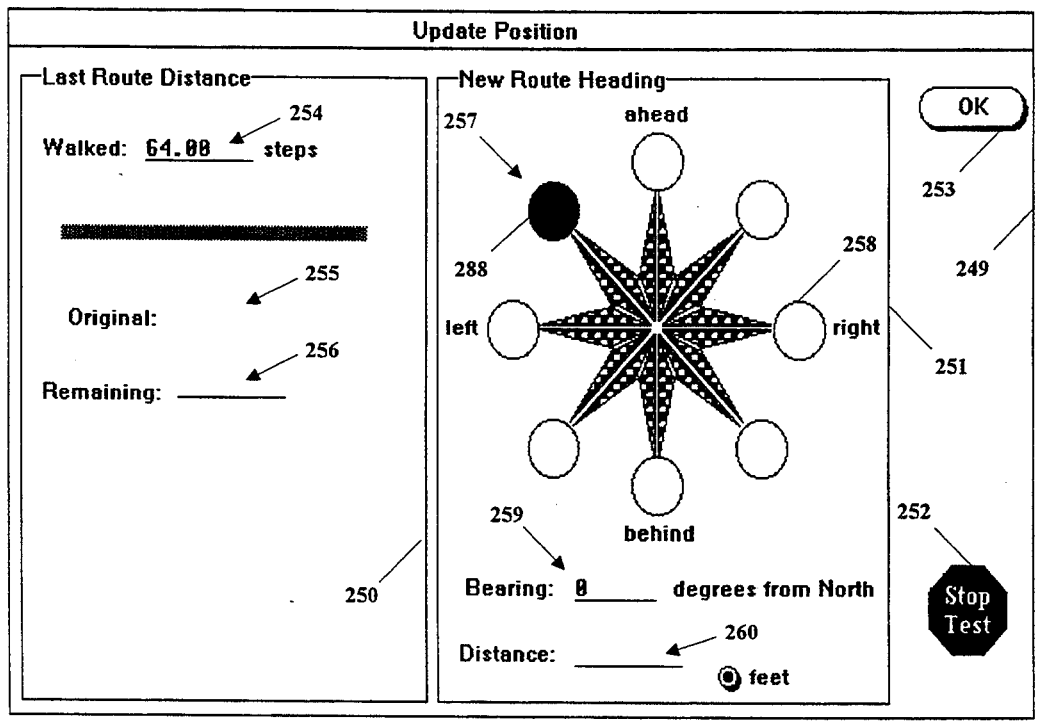
FIG. 41 contains a picture of the Update Position window which is shown on the pen-based computer display after the Update command was selected for the second time from the pull-down menu associated with the Actions command during a survey using the paced mode of dead-reckoning navigation (without the laser rangefinder), which is used in the dead-reckoning navigation algorithm at the end of the second traveled straight-line segment to enter the number of paces walked, shown to be 64 steps, to determine the distance traveled in the last segment to calculate the new location of the PSSA operator and also to enter the new direction of travel, shown to be a soft left turn which is at a bearing of 0 degrees.

Upon arriving at destination location L3, the PSSA operator stops walking and selects Actions heading 132 of FIG. 17 followed by Update Position command 140, which is detected by symbol 393 of FIG. 15H which transfers control to symbol 398 which displays Update Position window 249 shown in FIG. 41. Update Position window 249 consists of Last Route Distance box 250 containing Walked field 254 which is used to enter the number of paces walked from L2 to L3 of FIG. 9, Original distance field 255 which is used with laser rangefinder 4 of FIG. 1, and Remaining distance field 256 of FIG. 41 which is also used with laser rangefinder 4 of FIG. 1, New Route Heading box 251 of FIG. 35 containing compass rose 257, new Bearing field 259, and Distance field 260. Software execution transfers from symbol 398 of FIG. 15H to symbol 403, where the paces walked need to be entered. The PSSA operator stands at the new location L3 of FIG. 9 and inputs the number of paces walked on the segment from L2 to L3 into Walked field 254 of FIG. 41.

Software execution then transfers from symbol 403 of FIG. 15H to symbol 402 which calculates the geographic positions of all of the signal strength measurements that were taken during the last segment of travel from location L2 of FIG. 9 to location L3, and stores all of the geographically-located signal strength measurements in the data file specified by File field 227 of FIG. 28. Distance of the segment is calculated as in the previous segment S1 of FIG. 9. Control is then transferred from symbol 402 of FIG. 15H to symbol 401 which graphically displays the last segment traveled 276 on Route Track window 133 of FIG. 36 which is currently hidden under Update Position window 249 of FIG. 41, and then control is transferred to symbol 396 of FIG. 15H which checks for the selection of STOP button 252 of FIG. 41. Selecting STOP button 252 stops the coverage survey and transfers control from symbol 396 of FIG. 15H to symbol 397 which is a connection to symbol 300 of FIG. 15A.

Figure 42:
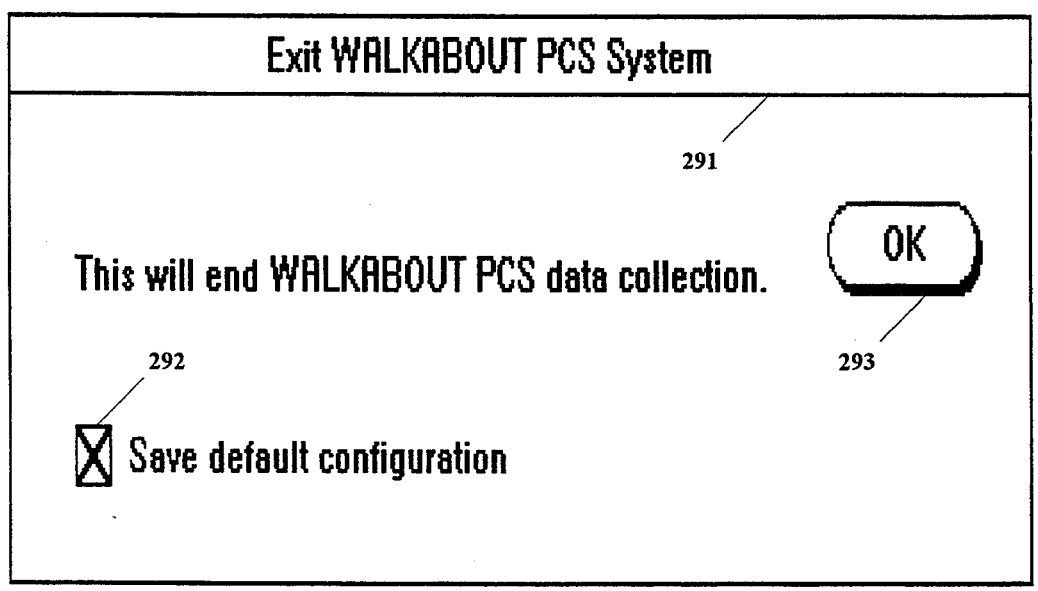
FIG. 42 contains a picture of the Exit window which is shown on the pen-based computer display after the Exit command was selected from the pull-down menu associated with the File command, allowing the application software to terminate.

To exit the application software, File heading 130 is selected causing symbol 301 of FIG. 15A to detect this event and transfer control to symbol 304 which is a connection to symbol 310 of FIG. 15B. Symbol 310 displays the pull-down menu 203 of FIG. 25 associated with the Files heading 130, and the selection of Exit command 206 is detected by symbol 313 of FIG. 15B which transfers control to symbol 317 which displays Exit window 291 which consists of Save Default Configuration box 292 and OK button 293. Software execution is then transferred from symbol 317 of FIG. 15B to symbol 320 which accepts changes to the state of Save Default Configuration box 292 resulting from the selection of box 292 which specifies whether or not to save the current configuration parameters in a default test plan file on hard disk 86 of FIG. 14 before exiting the software. Symbol 320 will modify the appearance of box 292 to reflect the current state by clearing box 292 if the configuration parameters will not be saved and filling box 292 as shown in FIG. 42 if the parameters will be saved. Selecting OK button 293 then exits the application software.

The above described preferred embodiment is merely illustrative of the principles of this invention. Structural and functional modifications can be made without departing from the scope of the invention.

What is claimed is:

1. A method of measuring and recording a plurality of geographically-located, downlink, cellular-communication-channel signal strengths in a pedestrian area using a signal-strength analyzer incorporated as part of a human-supported backpack with the analyzer having an antenna, a receiver, a controller, a timer, a computer, and a self-contained navigation system using a gun having an integral laser rangefinder and a fluxgate compass operating in a dead-reckoning mode with reference to a target point positioned in or adjacent the pedestrian area under analysis to report the respective geographic positions of a sequence of timed signal-strength measurements as the analyzer is moved throughout the pedestrian area in a straight-line path, in which the method comprises the steps of:

a) selecting a straight-line path segment having a starting point and an end point along which the analyzer is to be moved within the pedestrian area under analysis, b) inputting to the controller assigned values which establish an arbitrary or exact geographic position of the starting point, c) positioning the analyzer at the starting point which is at the beginning of the straight-line path segment, d) selecting a distant target point in or adjacent the pedestrian area in the direction of travel along the straight-line path segment which target point is beyond the end point of the straight-line path segment and in alignment with the segment, e) specifying a time interval by which successive and time-based, signal-strength measurements are to be taken by the signal-strength analyzer, f) aiming the gun at the distant target point to take a bearing measurement of the straight-line path segment, g) momentarily activating the gun to take a range measurement from the starting point to the distant target point, h) reporting the range and bearing measurements of the starting point to the backpack controller, i) moving the signal-strength analyzer at a uniform velocity by human-operator pacing along the straight-line path segment immediately upon the reporting of the range and bearing measurements of the starting point to the backpack controller, j) resetting the timer to zero and then starting the timer immediately upon starting movement of the signal-strength analyzer along the straight-line path segment, k) recording the time as timed by the timer required to move the analyzer along the straight-line path segment immediately upon arrival at the end point of the straight-line segment, l) aiming the gun at the distant target point upon arrival at the end point of the straight-line path segment to measure a lesser range to the distant target point, m) computing the distance traveled along the straight-line path segment by subtracting in the computer the range measurement for the end point of the straight-line path segment from the range measurement of the starting point of the straight-line path segment, n) taking cellular system signal-strength measurements using the antenna and receiver at each specified time interval as the signal-strength analyzer is moved at a uniform velocity along the straight-line path segment from the starting point to the end point, o) timestamping each signal strength measurement taken during movement of the signal-strength analyzer from the starting point to the end point of the straight-line path segment to position geographically each such measurement along the straight-line path segment, p) computing upon arrival at the end point the geographic location of each signal-strength measurement taken along the straight-line path segment, using the distance traveled as computed in the computer, the recorded time required to traverse the straight-line path segment, the reported bearing measurement and the specified time interval, q) and placing in the computer memory the geographic location and signal strength of each measurement taken on and along the straight-line path segment.

2. The method of claim 1 comprising repeating steps a) through q) with respect to a second straight-line path segment which starts at the end point of the first straight-line path segment and which has a bearing which differs from the bearing of the first straight-line path segment by using a second distant target point in or adjacent the pedestrian area in the direction of travel along the second straight-line path segment and which distant target point is beyond the end point of the second straight-line path segment and in alignment with the second segment.

3. A method of measuring and recording a plurality of geographically-located, downlink, cellular-communication-channel signal strengths in a pedestrian area using a signal-strength analyzer incorporated as part of a human-driven pack with the analyzer having an antenna, a receiver, a controller, a timer, a computer, and a self-contained navigation system using a rangefinder emitting an electromagnetic ray and a bearing-reporting compass operating in a dead-reckoning mode with reference to one or more target points positioned in or adjacent the pedestrian area under analysis to report the respective geographic positions of a sequence of timed signal-strength measurements as the analyzer is moved throughout the pedestrian area in a straight-line path segment, in which the method comprises the steps of:

a) selecting a straight-line path segment having a starting point and an end point along which the analyzer is to be moved within the pedestrian area under analysis, b) inputting to the controller assigned values which establish an arbitrary or exact geographic position of the starting point, c) positioning the analyzer at a starting point which is at the beginning of the straight-line path segment, d) selecting a first distant target point in or adjacent the pedestrian area in the direction of travel along the straight-line path segment which target point is beyond the end point of the segment and in alignment with the segment, e) specifying a time interval by which successive and time-based, signal-strength measurements are to be taken by the signal-strength analyzer, f) taking a bearing measurement of the straight-line path segment from the starting point, g) activating the rangefinder to take a range measurement from the starting point to the distant target point, h) reporting the range and bearing measurements of the starting point to the controller, i) moving the signal-strength analyzer at a uniform velocity by human-operator pacing along the straight-line path segment after the taking of the range and bearing measurements, j) initiating a time measurement immediately upon starting movement of the signal-strength analyzer along the straight-line path segment, k) concluding the time measurement immediately upon arrival at the end point of the straight-line segment, l) aiming the rangefinder at the target point after arrival at the end point of the straight-line path segment to measure a lesser range to the target point, m) computing the distance traveled along the straight-line segment by subtracting in the computer the range measurement for the end point of the straight-line path segment from the range measurement of the starting point of the straight-line path segment, n) taking cellular system signal-strength measurements using the antenna and receiver at each specified time interval as the signal-strength analyzer is moved at a uniform velocity along the straight-line path segment from the starting point to the end point, o) timestamping each signal strength measurement taken during movement of the signal-strength analyzer from the starting point to the end point of the straight-line path segment to position geographically each such measurement along the straight-line segment, p) computing after arrival at the end point the geographic location of each signal-strength measurement taken along the straight-line path segment q) and placing in the computer memory the geographic location and signal strength of each measurement taken along the straight-line path segment.

4. The method of claim 3 comprising repeating the steps a) through q) with respect to a second straight-line path segment which starts at the end point of the first straight-line path segment and which has a bearing which differs from the bearing of the first straight-line path segment by using a second target point in or adjacent the pedestrian area in the direction of travel along the second straight-line path segment which second target point is beyond the end point of the second straight-line path segment.

5. A method of measuring and recording a plurality of geographically-located, downlink, cellular-communication-channel signal strengths in a pedestrian area using a signal-strength analyzer incorporated as part of a portable pack with the analyzer having a self-contained navigation system using a gun having a rangefinder and a compass operating in a dead-reckoning mode with reference to a target point positioned in or adjacent the pedestrian area under analysis to report the respective geographic positions of a sequence of timed signal-strength measurements as the analyzer is moved throughout the pedestrian area in a straight-line path segment, in which the method comprises the steps of:

a) selecting a straight-line path segment along which the analyzer is to be moved within the pedestrian area under analysis, b) inputting to the analyzer assigned values which establish an arbitrary or exact geographic position of the starting point, c) positioning the analyzer at a starting point which is at the beginning of the straight-line segment, d) selecting a first distant target point in or adjacent the pedestrian area in the direction of travel along the straight-line path segment which target point is beyond the end point of the segment, e) specifying a time interval by which successive and time-based, signal-strength measurements are to be taken by the signal-strength analyzer, f) taking a bearing measurement of the straight-line path segment, g) taking a range measurement from the starting point to the first distant target point, h) reporting the bearing of the straight-line path segment to the analyzer and reporting the range measurement of the starting point to the analyzer, i) moving the signal-strength analyzer at a uniform velocity by human-operator pacing along the straight-line path segment upon the reporting of the range measurement of the first starting point to the analyzer, j) initiating a time measurement immediately upon starting movement of the signal-strength analyzer along the straight-line path segment, k) concluding the time measurement immediately upon arrival at the end point of the straight-line path segment, l) measuring a lesser range to the target point upon arrival at the end point of the straight-line path segment, m) computing the distance traveled along the first straight-line segment by subtracting in the analyzer the range measurement for the end point of the straight-line path segment from the range measurement of the starting point of the straight-line path segment, n) taking cellular system signal-strength measurements at each specified time interval as the signal-strength analyzer is moved at a uniform velocity along the straight-line path segment from the starting point to the end point, o) timestamping each signal strength measurement taken during movement of the signal-strength analyzer from the starting point to the end point of the first straight-line path segment to position geographically each such measurement along the first straight-line segment, p) and placing in the analyzer the geographic location and signal strength of each measurement taken along the straight-line path segment.

6. The method of claim 5 comprising repeating steps a) through p) with respect to a second straight-line path segment which starts at the end point of the first straight-line path segment and which has a bearing which differs from the bearing of the first straight-line path segment by using a second target point in or adjacent the pedestrian area in the direction of travel along the second straight-line path segment which target point is beyond the end point of the second straight-line path segment.

7. A manually-movable, portable, cellular-system signal-strength analyzer for measuring and recording geographically-located, downlink, cellular-communication-channel signal strengths in a pedestrian area, comprising a portable pack capable of human-driven movement throughout the pedestrian area, a downlink cellular-communication-channel scanning receiver carried by the pack for reporting information relating to signal strength measurements for selected cellular communication channels, a height adjustable antenna-supporting mast fixed to the pack, an antenna having an active receiving section of fixed length and electrical reception characteristics connected to the receiver and attached to the mast with the mast being capable of adjustment as to height relative to the pack to detect cellular system signals at, above, and below the usual heights at which pedestrians utilize portable cellular transceivers in the pedestrian areas, a controller carried by the pack and connected to the receiver to effect scanning of the selected communication channels and to extract signal-strength information reported to the controller by the receiver for the selected communication channels whose signal strengths are to be measured and recorded and also for receiving navigation information concerning the geographic locations for the signal strengths extracted by the controller, a laser rangefinder and a bearing-reporting fluxgate compass both of which generate an electrical output which is inputted to the controller to determine the positions of the portable pack by dead reckoning with reference to one or more laser-beam target objects positioned in or adjacent the pedestrian areas under analysis as the analyzer is moved in one or more straight-line path segments with each target object being located beyond an associated straight-line path segment and in extended alignment with that segment, and a computer connected to the controller for recording and displaying geographically-located signal strengths with respect to identified communication channels.

8. The signal strength analyzer of claim 7 comprising a timer which measures the elapsed time it takes to move the portable pack at a uniform velocity along each straight line path segment with each segment having a starting point and an end point and in which the timer also timestamps each of the signal-strength measurement information reported to the controller along each straight-line path segment.

9. The signal-strength analyzer of claim 8 including means for taking periodic signal-strength measurements at uniform predetermined time intervals as the analyzer is moved at a uniform velocity along each straight-line path segment.

10. The signal strength analyzer of claim 8 in which the portable pack is a back pack.

11. A manually-movable, portable, cellular-system signal strength analyzer for measuring and recording geographically-located, downlink, cellular-communication-channel signal strengths in pedestrian areas, comprising a portable pack capable of human-driven movement throughout the pedestrian areas, a downlink cellular-communication channel scanning receiver carried by the pack for reporting information relating to the signal strengths for selected cellular communication channels, a height adjustable antenna-supporting mast fixed to the pack, an antenna having an active receiving section of fixed length and electrical reception characteristics connected to the receiver and attached to the mast with the mast being capable of adjustment as to height relative to the pack to detect cellular system signals at the height at which pedestrians utilize portable cellular transceivers in the pedestrian areas, a controller carried by the pack and connected to the receiver to effect scanning of the selected communication channels and to extract signal-strength information reported to the controller by the receiver for the selected communication channels whose signal strengths are to be measured and recorded and also for receiving navigation information concerning the geographic locations for the signal strengths extracted by the controller, a rangefinder and a bearing-reporting compass both of which generate an electrical output which is inputted to the controller to determine the positions of the portable pack by dead reckoning with reference to one or more target objects positioned in or adjacent the pedestrian areas under analysis as the analyzer is moved in one or more straight-line path segments with each target object being located beyond an associated straight-line path segment and in extended alignment with that segment, and a computer connected to the controller for recording and displaying geographically-located signal strengths with respect to identified communication channels.

12. The signal strength analyzer for claim 11 comprising a timer which measures the elapsed time it takes to move the portable pack at a uniform velocity along each straight line path segment with each path segment having a starting point and an ending point which points are geographically located by the rangefinder and the compass and in which the timer also timestamps each of the signal-strength measurement information reported to the controller along each straight-line path segment.

13. The signal strength analyzer of claim 12 including means for taking periodic signal-strength measurements at uniform predetermined time intervals as the analyzer is moved at a uniform velocity along each straight-line path segment.

14. A method of measuring and recording a plurality of geographically-located, downlink, cellular-communication-channel signal strengths in a pedestrian area using a signal-strength analyzer incorporated as part of a human-operator-driven pack with the analyzer having an antenna, a receiver, a controller, and a computer, in which the method comprises the steps of:

selecting a straight-line path segment having a starting point and an end point along which the analyzer is to be moved within the pedestrian area under analysis, positioning the analyzer at the starting point at the beginning of the straight-line path segment, inputting the length of the human-operator's pace to the computer, reporting the bearing of the straight-line path segment to the controller, moving the signal-strength analyzer at a uniform velocity along the first straight-line path segment by having the human operator walk the distance of the straight-line path segment, counting the number of paces required to traverse the distance of the straight-line path segment, measuring and recording periodically signal-strength measurements taken during the course of the walk of the straight-line path segment, inputting the number of paces required to travel the distance of the straight-line path segment, computing the distance traveled along the straight-line path segment by multiplying the number of paces by the pace length inputted to the computer, geographically positioning each periodic signal strength measurement taken as the signal-strength analyzer was moved along the straight-line path segment, and reporting each such geographically-located signal-strength measurement to the computer.

15. A manually-movable, portable, cellular-system signal strength analyzer for measuring and recording geographically-located, downlink, cellular communication-channel signal strengths in pedestrian areas, comprising a portable pack capable of human driven movement throughout the pedestrian areas, a downlink cellular-communication channel scanning receiver carried by the pack for reporting information relating to the signal strengths for selected cellular communication channels, a mast, an antenna having an active receiving section of fixed length and electrical reception characteristics connected to the receiver and attached to the mast, a controller carried by the pack and connected to the receiver to effect scanning of the selected communication channels and to extract signal-strength information reported to the controller by the receiver for the selected communication channels whose signal strengths are to be measured and recorded and also for receiving navigation information concerning the geographic locations for the signal strengths extracted by the controller, means for effecting a dead-reckoning system to determine the positions of the portable pack within the pedestrian areas under analysis, and a computer connected to the controller for recording and displaying geographically-located signal strengths with respect to identified communication channels.

16. The signal strength analyzer of claim 15 in which the mast is capable of adjustment as to height relative to the pack to detect cellular system signals at the height at which pedestrians utilize portable cellular transceivers in the pedestrian areas.

17. The signal strength analyzer of claim 15 in which the means for effecting a dead-reckoning navigation system utilizes a rangefinder and a compass for measuring both of which generate an electrical output which is inputted to the controller to determine the positions of the portable pack by dead reckoning with reference to one or more target objects positioned in or adjacent the pedestrian areas under analysis.

18. The signal strength analyzer for claim 17 comprising a timer which measures the elapsed time it takes to move the portable pack at a uniform velocity along a straight line path having a starting point and an ending point which points are geographically located by the rangefinder and the compass, and in which the timer also timestamps each signal-strength measurement taken while the signal-strength analyzer is moved between the starting point and the end point.

19. The signal strength analyzer of claim 18 in which a laser rangefinder is utilized as the rangefinder.

20. The signal strength analyzer of claim 19 in which a fluxgate bearing-reporting compass is utilized as the bearing-reporting compass.

* * * * *